United States Patent
Rogers et al.

(10) Patent No.: US 12,120,134 B2
(45) Date of Patent: Oct. 15, 2024

(54) SYSTEM FOR AUTOMATICALLY DISCOVERING, ENRICHING AND REMEDIATING ENTITIES INTERACTING IN A COMPUTER NETWORK

(71) Applicant: Noetic Cyber Inc., Waltham, MA (US)

(72) Inventors: Kenneth Allen Rogers, Stow, MA (US); Allen D. Hadden, Stow, MA (US); Craig Roberts, London (GB); Hugh Pyle, Salem, MA (US)

(73) Assignee: Noetic Cyber Inc., Waltham, MA (US)

( * ) Notice: Subject to any disclaimer, the term of this patent is extended or adjusted under 35 U.S.C. 154(b) by 506 days.

(21) Appl. No.: 17/313,479

(22) Filed: May 6, 2021

(65) Prior Publication Data

US 2021/0352098 A1    Nov. 11, 2021

Related U.S. Application Data

(60) Provisional application No. 63/058,143, filed on Jul. 29, 2020, provisional application No. 63/051,300, (Continued)

(51) Int. Cl.
*H04L 29/06* (2006.01)
*G06F 16/245* (2019.01)
(Continued)

(52) U.S. Cl.
CPC ........ *H04L 63/1425* (2013.01); *G06F 16/245* (2019.01); *G06F 16/248* (2019.01);
(Continued)

(58) Field of Classification Search
CPC ............. H04L 63/1425; H04L 63/0263; H04L 63/1416; H04L 63/1433; H04L 63/20;
(Continued)

(56) References Cited

U.S. PATENT DOCUMENTS 10,069,849 B2 *  9/2018  Muddu ................ H04L 43/045
10,958,674 B2 *  3/2021  Tsironis ................ H04L 63/20
(Continued)

OTHER PUBLICATIONS

U.S. Appl. No. 17/313,485, filed May 6, 2021, Rogers et al.
U.S. Appl. No. 17/313,487, filed May 6, 2021, Rogers.
U.S. Appl. No. 17/724,968, filed Apr. 20, 2022, Hadden et al.

*Primary Examiner* — Joseph P Hirl
*Assistant Examiner* — Thomas A Gyorfi
(74) *Attorney, Agent, or Firm* — Wolf, Greenfield & Sacks, P.C.

(57) ABSTRACT

An entity tracking system and method for a computer network employs proactive data collection and enrichment driven by configurable rules and workflows responsive to the discovery of new entities, changes to existing entities, and specifics about the entities' attributes. The data collection is used in conjunction with graph technologies to map interactions and relationships between various entities interacting in the computer environment and deduce interactions and relationships between the entities. Machine learning techniques further identify, group or categorize entities and identify patterns which are indicative of anomalies that might be due to nefarious actions or compromised security.

23 Claims, 47 Drawing Sheets

Related U.S. Application Data filed on Jul. 13, 2020, provisional application No. 63/020,586, filed on May 6, 2020.

(51) Int. Cl.

| | |
|---|---|
| *G06F 16/248* | (2019.01) |
| *G06F 16/25* | (2019.01) |
| *G06F 16/28* | (2019.01) |
| *G06F 16/901* | (2019.01) |
| *G06F 18/214* | (2023.01) |
| *G06K 9/62* | (2022.01) |
| *G06N 20/00* | (2019.01) |
| *H04L 9/40* | (2022.01) |

(52) U.S. Cl.
CPC .......... *G06F 16/252* (2019.01); *G06F 16/288* (2019.01); *G06F 16/9024* (2019.01); *G06F 18/214* (2023.01); *G06N 20/00* (2019.01); *H04L 63/0263* (2013.01); *H04L 63/1416* (2013.01); *H04L 63/1433* (2013.01); *H04L 63/20* (2013.01)

(58) Field of Classification Search
CPC .... G06F 16/245; G06F 16/248; G06F 16/252; G06F 16/288; G06F 16/9024; G06F 18/214; G06N 20/00
See application file for complete search history.

(56) References Cited

U.S. PATENT DOCUMENTS

| | | |
|---|---|---|
| 11,503,054 B2 * | 11/2022 | Furtak ..................... G06F 18/29 |
| 11,729,204 B1 | 8/2023 | Coull et al. |
| 2014/0372956 A1 | 12/2014 | Bisca et al. |
| 2015/0237062 A1 | 8/2015 | Roytman et al. |
| 2015/0249669 A1 | 9/2015 | Gamage et al. |
| 2016/0224911 A1 | 8/2016 | Rush et al. |
| 2017/0017708 A1 | 1/2017 | Fuchs et al. |
| 2017/0063894 A1 | 3/2017 | Muddu et al. |
| 2017/0236079 A1 | 8/2017 | Venna et al. |
| 2018/0027004 A1 | 1/2018 | Huang et al. |
| 2019/0158309 A1 | 5/2019 | Park et al. |
| 2019/0158524 A1 * | 5/2019 | Zadeh .................. H04L 43/045 |
| 2019/0278777 A1 | 9/2019 | Malik et al. |
| 2020/0226156 A1 | 7/2020 | Borra et al. |
| 2020/0272972 A1 | 8/2020 | Harry et al. |
| 2021/0352099 A1 | 11/2021 | Rogers |
| 2022/0004546 A1 | 1/2022 | Rogers et al. |
| 2022/0337620 A1 | 10/2022 | Hadden et al. |
| 2023/0275912 A1 | 8/2023 | Shahul Hameed et al. |

* cited by examiner

```
x-samos-type-name: machine
x-samos-namespace: core.components
title: Machine Component
description: A machine component.
type: object
x-samos-abstract: true
x-samos-correlatable: true
x-samos-extends-types:
  - type-name: core.component
  - type-name: core.managed.asset
  - type-name: core.managed.endpoint
  - type-name: sys.correlatable x-samos-table:
  - name: name
  - name: operating_system
  - name: virtual
  - name: public
  - name: active
  - name: asset_type
  - name: endpoint_protection_active properties:
  cpus:
    title: CPUs
    description: CPU count
    type: integer
  dns_name:
    title: DNS Name(s)
    description: DNS name(s) for this machine
    type: array
    items:
      type: string
      x-samos-ref-types:
        - type-name: DomainName
  network_interfaces:
    title: Network Interfaces
    type: array
    items:
      type: string
      x-samos-ref-types:
        - type-name: NetworkInterface
  vulnerabilities:
    title: Vulnerabilities
    type: array
    description: All known vulnerabilities associated with this machine.
    items:
      type: string
      x-samos-ref-types:
        - type-name: Vulnerability
  storage:
    title: Storage Volumes
    type: array
    items:
      type: string
      x-samos-ref-types:
        - type-name: Storage
  operating_system:
    title: Operating System
```

FIG. 8

```
x-samos-type-name: amazonaws.ec2.subnet
title: EC2 Subnet
$ref: 'https://raw.githubusercontent.com/APIs-guru/openapi-directory/master/APIs/amazonaws.com/ec2/2016-11-15/openapi.yaml#/components/schemas/Subnet'
x-samos-extends-types:
- core.components.network
x-samos-key: SubnetId
x-samos-derived-properties:
  id:
    type: jsonpath
    value: '$.SubnetId'
properties:
  SubnetId:
    x-samos-immutable: true
  AvailabilityZoneId:
    x-samos-ref-types:
    - amazonaws.ec2.availability-zone
  VpcId:
    x-samos-ref-types:
    - amazonaws.ec2.vpc
  OwnerId:
    x-samos-ref-types:
    - amazonaws.account
```

FIG. 11

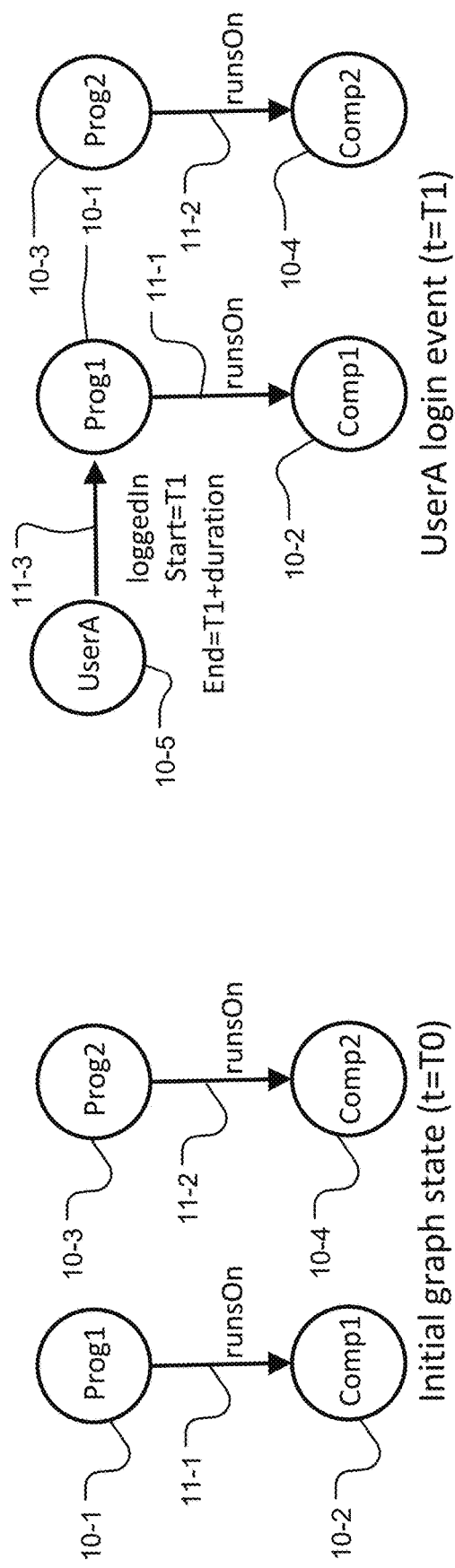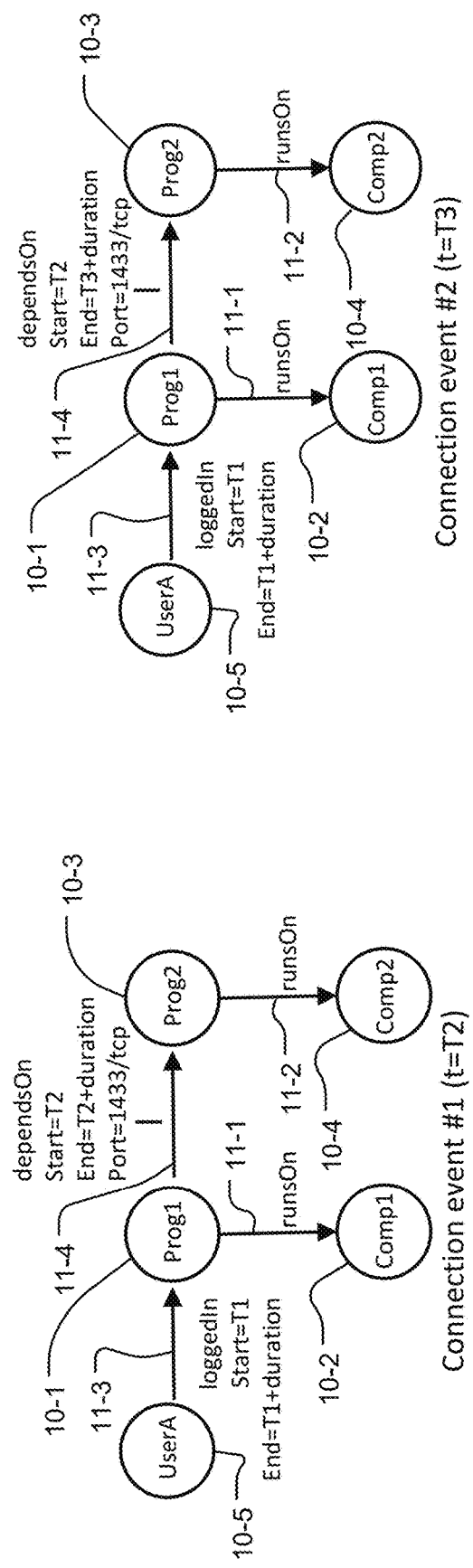
FIG. 26

```
25  properties:
26    cpus:
27      title: CPUs
28      description: CPU count
29      type: integer
30    dns_name:
31      title: DNS Name(s)
32      description: DNS name(s) for this machine
33      type: array
34      items:
35        type: string
36        x-samos-ref-types:
37          - type-name: DomainName
38            x-samos-dependency: true
39            x-samos-dependency-duration: 10 days
40    network_interfaces:
```

FIG. 27

SYSTEM FOR AUTOMATICALLY DISCOVERING, ENRICHING AND REMEDIATING ENTITIES INTERACTING IN A COMPUTER NETWORK

RELATED APPLICATIONS

This application claims the benefit under 35 USC 119(e) of U.S. Provisional Application No. 63/020,586, filed on May 6, 2020, U.S. Provisional Application No. 63/051,300, filed on Jul. 13, 2020, and U.S. Provisional Application No. 63/058,143, filed on Jul. 29, 2020, all of which are incorporated herein by reference in their entirety.

BACKGROUND OF THE INVENTION

Computer networks and systems have become increasingly complex over time. This process has accelerated more recently due to the adoption of technological trends such as bring-your-own-device (BYOD), Internet-of-things (IoT), cloud infrastructure, containerization, and microservices architectures, to list a few examples. Modern computer systems can comprise tens, hundreds, or even thousands of interacting independent systems and services. These systems can be transient, frequently appearing and then disappearing from a computer network based on fluctuating demand, ongoing changes/enhancements to software, and hardware or software faults. These interacting services can be spread across multiple geographic locations and computing environments and might include traditional on-premise infrastructure at multiple different sites working in conjunction with private cloud environments and possibly multiple different public cloud environments.

SUMMARY OF THE INVENTION

The technological trends driving the increasing complexity of computer networks offer significant advantages such as better redundancy and fault tolerance, scalability and burst-ability, and cost efficiency, to name a few.

At the same time, teams responsible for information technology (IT) management, cybersecurity, data privacy and compliance face significant new challenges.

The dynamic nature of modern computer environments makes it extremely challenging for organizations to maintain accurate catalogues of all entities present or interacting in their computer environments. It is not feasible to depend on human users to be responsible for maintaining an accurate catalogue of computer assets and other entities. While humans can play a role in the process, organizations increasingly face a need to adopt techniques which automate the process of maintaining, or being able to quickly generate, a list of current entities in the environment along with their significant attributes. Many IT and cybersecurity use cases can be aided by an accurate catalogue of entities in the computer environment that is always accurate and up to date, accessible via application programming interfaces (APIs), includes a high degree of detailed attribute information about each entity, and also captures information about how the many entities relate to, or interact with, each other.

Additionally, traditional approaches focused primarily on the existence of physical computers and the specific operating systems and software (and versions thereof) that were running on them. This limited perspective has become inadequate. Physical computers, perhaps with the exception of individual, dedicated, personal-use computers such as laptops, have been virtualized away. Increasingly, physical computer servers are organized in clusters that are responsible for running large numbers of virtual servers simultaneously. A mass adoption of new virtualization approaches including containerization has been driven by and is itself a driver of an accelerated adoption of microservices architectures, in which large monolithic business applications are broken down into many smaller and autonomous service applications that interact with each other. As a result, in modern computer environments, instead of worrying about a single monolithic software application running on a single dedicated physical computer, IT and cybersecurity professionals now need to worry about hundreds or thousands of microservices which are dynamically added and removed, scattered across multiple environments and interconnected networks, and interacting in complex patterns that constitute each logical business application. Considering that a large enterprise typically has hundreds of distinct business applications, the challenges of understanding, maintaining, and securing such an expansive and dynamic environment become obvious.

While the complexity of modern computer environments has increased dramatically, the number of skilled and qualified individuals to monitor, maintain and secure these environments has not kept up with demand. As of the end of 2019, there was an estimated shortfall of over four million unfilled cybersecurity positions worldwide, and that number is increasing dramatically. Thus, there is a critical need for organizations to find ways to move work from, and increase the efficiency of, the limited number of IT and security professionals they have on staff to ensure that those limited resources are focused on the most critical tasks that only they can do.

One of the key challenges IT and security teams face is establishing and maintaining a continuously accurate registry of all computer and network assets, along with other technical and nontechnical entities, interacting on their computer networks. Without this information, teams struggle to assess cyber risks or identify nefarious activity and therefore struggle to protect their environment from cyber-attack.

The problem of maintaining an accurate list of computer assets is not a new one. It has existed since the early days of networked computers. There are many products which have been developed over time to assist in dealing with the challenge. Entire product categories were established in the areas of IT Asset Management (ITAM) and Change Management Databases (CMDB). However, traditional approaches tended to require a high degree of manual interaction to keep them accurate as systems were added, removed and modified, and the process was error prone. This problem has been exacerbated by an explosion in the number of connected devices due to the adoption of BYOD, IoT, cloud infrastructure, microservices architectures, containerization, and other technologies. Increasingly, products aiming to address this issue have begun to adopt automatic collection of information passively from various sources and some degree of proactive scanning to populate and maintain an asset registry. However, the results are often flawed, resulting in stakeholders doubting the accuracy of the data and opting not to use it.

With the increasing scale and dynamic nature of IT infrastructure, existing static tools to track individual systems are no longer adequate. Instead, asset managers must be able to analyze arbitrarily dynamic groupings of fast-moving entities in the computer environment without losing the ability to understand the big picture.

Organizations have invested large sums of money and effort to purchase, deploy, and maintain a variety of technologies that focus on various aspects of the IT management and cybersecurity problem spaces. Each of those technologies generates a great deal of valuable information which paint small pieces of the overall picture of the computer environment. However, the data tends to be siloed and uncorrelated, making it difficult to see the "big picture." Security information and event management (STEM) technologies were created to pull together and correlate this information but have been only partially successful due to the massive amounts of data which they attempt to consume, the cost and effort required to keep them properly tuned, and the large volume of false positives which they tend to generate.

What is needed by IT and security teams is a solution that effectively discovers and tracks new entities arriving on a computer network, previously known entities leaving the network, changes to important attributes of each entity, and the interactions or relationships between entities. This insight, if available and reliable, would enable or augment a broad set of IT and cybersecurity use cases including cyber risk assessment, cybersecurity incident response, policy compliance and audit, vulnerability management, and many others.

The presently disclosed invention concerns methods and systems for entity discovery, attribute resolution, and tracking in a computer network. In one example, the presently disclosed system automates the discovery of entities, both transiently or permanently present, in an organization's computer networks, the collection of important details and attributes about each entity, and the tracking of interactions and relationships between the various entities. Additionally, based on the information discovered, collected and tracked, the presently disclosed system can execute automated actions driven by configurable rules to proactively collect further details about the entities or their relationships and/or to bring the entities into compliance with some desired configuration or state.

More specifically, the presently disclosed system and method concern passive data collection from a multitude of existing data sources and technologies already in use in a computer environment. Examples of such data collection include monitoring log files, listening on event queues for events generated by various technologies and data sources, or pulling information from existing systems in the computer environment that are already aggregating data from multiple sources.

Additionally, the presently disclosed system and method concern proactive data collection and enrichment driven by configurable rules and workflows that are responsive to the discovery of new entities, changes to existing entities, and specifics about the entities' attributes. Proactive data collection can also be triggered by timers or manual invocation by users. Often, the purpose of proactive data collection is to automatically explore and search for additional information which is not directly available via passive collection.

In another example, the presently disclosed system and method employ graph technologies to map interactions and relationships between various entities interacting in the computer environment. Using the collected data, the system can deduce interactions and relationships between the entities, which can be significant in a large number of IT or cybersecurity use cases.

The present system also uses machine learning techniques and learned attribute sets and interaction patterns to help identify, group or categorize entities or to identify patterns which are indicative of anomalies that might be due to nefarious actions or compromised security.

In yet another example, the presently disclosed system includes proactive orchestration and automation capabilities to automatically remediate errant entities or bring them into compliance with policy. The orchestration and automation components of the system are completely configurable and extensible to support organizationally specific technologies, situations, or policies.

By combining these capabilities, the presently disclosed system and method are capable of providing information technology and cybersecurity teams with helpful but heretofore unavailable insights and of expediting the discovery and remediation of cybersecurity issues or compliance gaps through adaptive use of computer automation.

In general, according to one aspect, the invention features a method for managing a computer environment. Event data for the computer environment is collected from a plurality of different data sources by connecting to each data source and retrieving the event data available from that data source. Entity relationship information is generated, indicating entities and relationships between entities that are relevant to security of the computer environment based on the collected event data from the different data sources. The computer environment is then managed based on the entity relationship information.

In embodiments, relevant changes to the computer environment are detected in the event data from the different data sources, including a presence in the computer environment of new entities that were previously unknown, changes to properties of entities that were previously identified as being present in the computer environment, or disappearances from the computer environment of entities that were previously identified as being present in the computer environment. Existing entity relationship information is only modified to reflect the relevant changes in the computer environment in response to determining that the relevant changes are not already represented in the existing entity relationship information. In one example, the event data is selectively retrieved, with only the event data indicating the relevant changes to the computer environment being collected by periodically polling a data source for new event data reflecting the relevant changes. In another example, the event data is selectively retrieved in that only event data indicating the relevant changes to the computer environment in response to alerts transmitted by a data source.

A rules engine is configured with user-specified rules for detecting specified conditions of the entities, properties of entities, and relationships between entities indicated by the entity relationship information. In response to detection of the specified conditions, the rules engine performs specified actions in response to detecting the specified conditions, the rules engine performs specified actions, which can include executing user-defined operations with respect to the computer environment or having user-configurable software programs execute the user-defined operations. In another example, user-configurable workflows provided by a workflow engine execute the user-defined operations. These workflows are also configurable to invoke other workflows or software programs. The rules engine identifies which rules can potentially be triggered by detected changes in conditions indicated by the entity relationship information. The rules engine then selectively evaluates the changed conditions against the specified conditions only with respect to the rules that were identified as potentially being triggered by the detected changes in the conditions.

The entity relationship information is generated based on type definitions formatted according to a declarative schema definition language, the type definitions including markup specifying particular properties and relationships for different entity types. Special entity types specific to particular data sources inherit and/or extend the properties and relationships of other entity types according to a specified entity type hierarchy. These special entity types specify additional properties and relationships specific to the particular data sources.

In one embodiment, the entity relationship information is generated as an entity relationship graph representing the entities, properties of the entities, and relationships between the entities. The graph is stored in a graph database.

A graphical user interface rendered on a display of a user device comprises a query builder that generates graph-based queries based on input from a user via an input mechanism of the user device. The query builder transmits the graph-based queries for execution against the entity relationship graph, and displays results of the graph-based queries. In one example, the query builder limits selections by the user for the graph-based queries to valid combinations of entity types, relationships, and properties based on type definitions specifying particular properties and relationships for each entity type in the entity relationship information. In another example, the query builder detects gestures input by the user indicating selection of entity types and dragging of graphical elements representing the selected entity types into the query pane. The query builder then automatically determines and displays valid relationship paths between the graphical elements representing the selected entity types. The query builder also receives input from the user indicating selection of which of the displayed valid relationship paths to be referenced in the graph-based query and selection of specific valid properties for each displayed graphical element representing the selected entity types and further quantifies or limits graph patterns targeted via the graph-based query.

In one embodiment, the entities in the entity relationship graph are represented as a plurality of nodes, including an identity node representing an immutable identity for the entity, one or more state nodes representing mutable properties of the entity, and state edges connecting the identity node and each of the one or more state nodes associated with the identity node. These state edges are configured with start and end timestamp properties that define a period of time between the start and end timestamps during which the state node is considered to represent a valid property for the identity node. Values assigned to the properties of the entities in the entity relationship graph are updated by creating new state nodes with the updated values for the properties and new state edges between the identity nodes and the new state nodes. A start timestamp value indicating a creation time for the new state node is assigned to each state edge along with an end timestamp value indicating that the new state node is currently valid. Similarly, an updated end timestamp value indicating the creation time for the new state node is then assigned to each state edge for the state nodes representing the previous values of the property being updated. Input is received via an input mechanism of a user device indicating time values associated with queries submitted for execution against the entity relationship graph. Submitted queries are then modified based on the time values associated with the queries such that results of the modified queries include only state nodes with start timestamp values indicating start times before the specified times for the queries and end timestamp values either of zero or indicating end times after the specified times for the queries.

Machine learning models for identifying patterns in the entity relationship graph are also developed, and a machine learning model training screen of a graphical user interface rendered on a display of a user device detects selection by a user of pre-classified data elements from the entity relationship graph based on input received from the user via an input mechanism of the user device, and the machine learning models are trained using the selected pre-classified data elements. Also, future or existing unclassified data elements from the entity relationship graph are classified. In another example, patterns in the entity relationship graph indicating abnormal conditions of the computer environment are identified using the trained machine learning models. Changes in the entity relationship graph are also detected and submitted to be processed by particular machine learning models in response to determining that the detected changes pertain to the particular machine learning models. The pertinent machine learning models are also used to determine whether the detected changes in the entity relationship graph indicate abnormal conditions of the computer environment.

In general, according to another aspect, the invention features a system for managing a computer environment. The system comprises a workstation system and a server system. The workstation system executes one or more entity event collectors. The collectors collect event data for the computer environment from a plurality of different data sources by connecting to each data source and retrieving the event data available from that data source. The server system executes a database system, which generates entity relationship information indicating entities and relationships between entities that are relevant to security of the computer environment based on the collected event data from the different data sources. The server system then manages the computer environment based on the entity relationship information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 8 is an illustration of an exemplary type definition according to an embodiment of the present invention;

FIG. 11 is an illustration of an exemplary type definition according to an embodiment of the present invention;

FIG. 26 is an illustration of an exemplary portion of the entity relationship graph according to an embodiment of the present invention;

FIG. 27 is an illustration of an exemplary type definition screen of the GUI;

DETAILED DESCRIPTION OF THE PREFERRED EMBODIMENTS

Figure 1A:
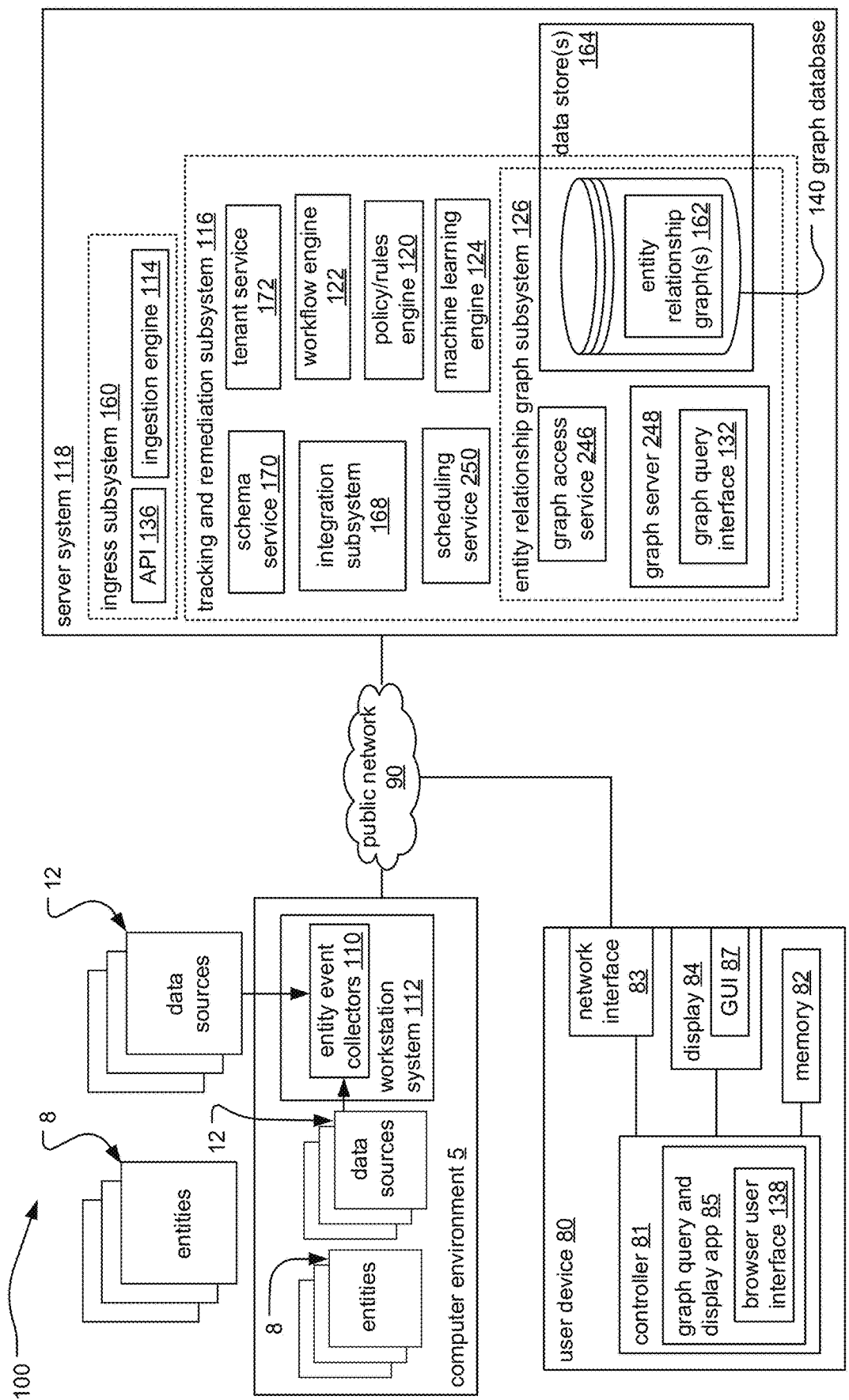
FIG. 1A is a schematic diagram of an exemplary entity discovery, resolution, tracking, and remediation system according to an embodiment of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

One objective of the presently disclosed system and method is to establish a comprehensive accounting and thus understanding of an organization's computer environment(s) 5 such as its computing devices and networks, including all of the entities 8 interacting within or related to those devices and networks, in order to aid in managing the computer environment 5. A further objective is to use that understanding of the computer environment 5 to derive further insights that enable or support numerous information technology (IT) and cybersecurity use cases. In this description the term "entities" should be interpreted as quite broadly encompassing anything, physical, virtual or conceptual, interacting in the business environment and present on its networks either directly or indirectly. Common examples would be physical computers and network infrastructure components, virtual computing systems (e.g. VMWare or Amazon Web services (AWS) instances), computer operating systems, software programs/services, related software or hardware vulnerabilities, users, security policies and access privileges, data sets, physical locations, threats, threat actors, etc. The present system and method are intended to be configurable and extensible such that each instance can be configured based on which types of entities 8 are of interest for that particular organization or set of use case and should therefore be tracked. The present system and method can be further extended to incorporate new types of entities 8 not previously conceived of or provided out of the box.

FIG. 1A is a schematic diagram of an exemplary entity discovery, resolution, tracking, and remediation system 100 according to one embodiment of the present invention.

The entity discovery, resolution, tracking, and remediation system 100 comprises a server system 118, a workstation system, and one or more user devices 80.

The server system 118 is typically implemented as a cloud system. In some embodiments, the entity event collectors 110 may also be implemented as a cloud system. In some cases, the server system 118 is one or more dedicated servers. In other examples, they are virtual servers. Similarly, the workstation system 112 could run on an actual or virtual workstation. The server system 118 and/or workstation system 112 may run on a proprietary pr public cloud system, implemented on one of the popular cloud systems operated by vendors such as Alphabet Inc., Amazon, Inc. (AWS), or Microsoft Corporation, or any cloud data storage and compute platforms or data centers, in examples. In the public cloud implementation, the underlying physical computing resource is abstracted away from the users of the system. The server system 118 and entity event collectors 110 may also be implemented as a container-based system running containers, i.e., software units comprising a subject application packaged together with relevant libraries and dependencies, on clusters of physical and/or virtual machines (e.g., as a Kubernetes cluster or analogous implementation using any suitable containerization platform).

In the illustrated example, the computer environment 5, the server system 118, and the user device 80 are all connected to a public network 90, which is typically a wide area network such as the internet.

The computer environment 5 comprises a plurality of entities 8 as well as data sources 12 pertaining to those entities, as discussed above, and typically the workstation system 112. Data sources 12 are deployed throughout the environment 5 and are typically existing devices, components, systems, datasets, or applications already present and connected to the computer network or environment 5 in which the present system and method are operating. In the illustrated example, some entities 8 and data sources 12 are also depicted outside of the computer environment 5. These might include data sources 12 and/or entities 8 that are not technically within the computer environment 5 but are related or pertinent to the computer environment 5, providing, for example, supplemental information or event data that can be correlated with that provided about internal entities 8 that are within the computer environment 5. This depiction is intended to elucidate the expansive nature of the event data collected by the entity event collectors 110, but the computer environment 5 could also be understood to encompass all possible entities 8 for which event data can be collected and all possible data sources 12 from which the event data can be accessed and retrieved.

Executing on the workstation system 112 (e.g., on a processor 52 of the workstation) are one or more entity event collectors 110, which, in general, collect event data pertaining to the computer environment 5 from a plurality of data sources 12. The workstation system 112 executes the entity event collectors 110 and monitors them to ensure they are functioning properly.

Generally, the entity event collectors 110 collect the event data by connecting to each data source 12 and retrieving the event data available from that source 12. In one example, an entity event collector 110 connects to the intended data source 12, typically via an application programing interface (API) 13 implemented by the data source 12. The user of the system provides any credentials necessary to access the APIs 13 of the data sources 12, which are passed to the entity event collectors 110 when they are configured to run on the workstation system 112 and are used by the entity event collectors 110 to access the API 13 of the data sources 12.

In embodiments, the entity event collectors 110 may include or consist of one or more software apps that are written in an interpreted programming language such as Python. The collector app is transferred to a workstation system 112, which is preferably designed to manage the execution of a multitude of entity event collectors 110 simultaneously.

The entity event collectors 110 look for any event data that provides interesting details, attributes, or properties about the entities 8 or event data that indicates interactions or relationships between the different entities 8 and collect a breadth of event data about all entities 8 of interest from the configured data sources 12. In one example, the entity event collectors 110 periodically make calls to the APIs 13 of the data sources 12 to determine if any new entity event information is available. In another example, they receive alerts from the data sources 12 indicating that new event data is available.

In one embodiment, the entity event collectors 110 specifically detect relevant changes to the computer environment 5 and/or look for event data indicating the relevant changes, including a presence in the computer environment 5 of new entities 8 that were previously unknown, disappearances from the computer environment 5 of entities 8 that were previously identified as being present in the computer environment 5, and/or changes to properties of entities 8 that were previously identified as being present in the computer environment 5.

In one example, when the system 100 detects and/or retrieves the event data indicating the relevant changes, generating the entity relationship information may comprise only modifying existing entity relationship information to reflect the relevant changes in the computer environment 5 in response to determining that the relevant changes are not already represented in the existing entity relationship information. In another example, collecting the event data from the different data sources 12 comprises selectively retrieving only event data indicating the relevant changes to the computer environment 5 by periodically polling a data source for new event data reflecting the relevant changes. In yet another example, collecting the event data from the different data sources 12 comprises selectively retrieving only event data indicating the relevant changes to the computer environment 5 in response to alerts transmitted by a data source 12.

The server system 118 executes (e.g., on one or more processors 52 of the server system 118) various modules, processes, services, engines, and/or subsystems, including an ingress subsystem 160, which comprises an API 136 and an ingestion engine 114, the tracking and remediation subsystem 116, which comprises a schema service 170, a scheduling service 250, a tenant service 172, a workflow engine 122, a policy/rules engine 120, a machine learning (ML) engine 124, as well as an integration subsystem 168 and an entity relationship graph subsystem 126. The entity relationship graph subsystem 126 comprises the graph database 140, which stores one or more entity relationship graphs 162, for example, for different organizations. The entity relationship graph subsystem 126 further comprises a graph access service 246 and a graph server 248, the latter of which in turn comprises a graph query interface 132. The server system 118 also comprises one or more data stores 164 for persistently storing and managing collections of data, including databases such as a graph database 140, in one or more memory components 54, 56, 58 (for example). These various modules, processes, services, engines, and/or subsystems, which will be described in further detail below with respect to the current and/or subsequent figures, are generally each associated with separate tasks. In some cases, they are discrete modules. or they are combined with other modules into a unified code base. They can be running on the same server or different servers, virtualized server system, or a distributed computing system.

In general, the event data collected by the entity event collectors 110 is used (e.g., by the server system 118) to generate entity relationship information indicating entities 8 and relationships between entities 8 that are relevant to management or security of the computer environment 5 based on the collected event data. In one example, the entity relationship information includes an entity relationship graph 162.

The entity event collectors 110 provide the collected event data to the ingestion engine 114 of the server system 118.

The ingestion engine 114 receives the collected event data from the entity event collectors 110 and generates aggregated, cleaned correlated, normalized and confirmed entity relationship information and/or event data based on the collected event data and provides the aggregated, cleaned correlated, normalized and confirmed entity relationship information and/or event data to the tracking and remediation subsystem 116.

In general, the tracking and remediation subsystem 116 stores the aggregated, cleaned correlated, normalized and confirmed entity relationship information in the data store(s) 164, such as in a database. The tracking and remediation subsystem 116 also induces various enrichment and/or remediation processes with respect to the entity relationship information and the computer environment 5 (e.g., supplementing, correcting, or updating the entity relationship information, effecting changes to the computer environment 5, effecting changes in other external environments) via the entity event collectors 110, interaction with systems within the computer environment 5, and/or interaction with other external systems and technologies. The tracking and remediation subsystem 116 also provides access to the entity relationship information for the one or more user devices 80 via the API 136.

In embodiments, the tracking and remediation subsystem 116 receives and stores the aggregated, cleaned correlated, normalized and confirmed entity relationship information from the ingestion engine 114 and/or receives the aggregated, cleaned correlated, normalized and confirmed event data from the ingestion engine 114 and generates the entity relationship information based on the aggregated, cleaned correlated, normalized and confirmed event data, and stores the generated entity relationship information.

In one embodiment, the tracking and remediation subsystem 116 generates the entity relationship information by generating a temporal entity relationship graph 162 based on the information from the ingestion engine 114 and/or other sources. The entity relationship graph 162 represents the entities 8, properties of the entities, and relationships between the entities. The tracking and remediation subsystem 116 stores the entity relationship graph 162 in in a temporal entity relationship data structure such as the graph database 140.

The user device 80 is generally a computing device operated by a user of the entity discovery, resolution, tracking, and remediation system 100. For the sake of clarity, a single user device 80 is depicted, but it will be understood that the system 100 can accommodate a plurality of user devices 80 operated by different users at different times or simultaneously. In the illustrated example, the user device 80 includes a controller 81, memory 82, a network interface 83 for connecting to the public network 90, and a display 84. Executing on the controller 81 is a graph query and display app 85, which generally receives user input (e.g., via input mechanisms 66 such as a keyboard, mouse, and/or touchscreen, among other examples) indicating configuration information for the system 100 and/or queries and sends the configuration information and/or queries to the server system 118. The graph query and display app 85 also receives from the server system 118 information such as graph information for rendering depictions of portions of the entity relationship graphs 162 on the display 84 based on the graph information, via a graphical user interface 87, which the graph query and display app 85 renders on the display 84 for receiving and displaying the configuration, graph query, and graph information. In one example, the graph query and display app 85 executes within a software program executing on the controller 81, such as a web browser, and renders specifically a browser user interface 138 within a larger GUI 87 serving the graph query and display app 85, web browser, and other applications and services executing on the controller 81 of the user device 80.

In one typical example, as the event data is collected from the data sources 12, it is used to generate the entity relationship graph 162 of all entities 8 of interest. This temporal entity relationship graph 162 is typically displayed to IT and security team users that access the server system 118 via a browser executing on their own user device 80. This browser user interface 138 displays a graphical user interface (GUI) that presents graphs generated by the graph subsystem 126. The server system 118, via the API 136, allows the users to query the graph subsystem 126 for graph patterns of interest.

In general, in the stored and/or presented graphs 162, individual entities 8 are modeled or represented as vertices, or entity nodes 10. Attributes about the entities 8 can be stored and/or presented as attributes on the entity nodes 10. Relationships between entities 8 are modeled or represented as edges 11 between the entity nodes 10. The edges 11 can also have attributes or properties associated with them. The stored graphs, presented graphs, entity nodes 10, and edges 11 will be described in further detail below with respect to subsequent figures.

Figure 1B:
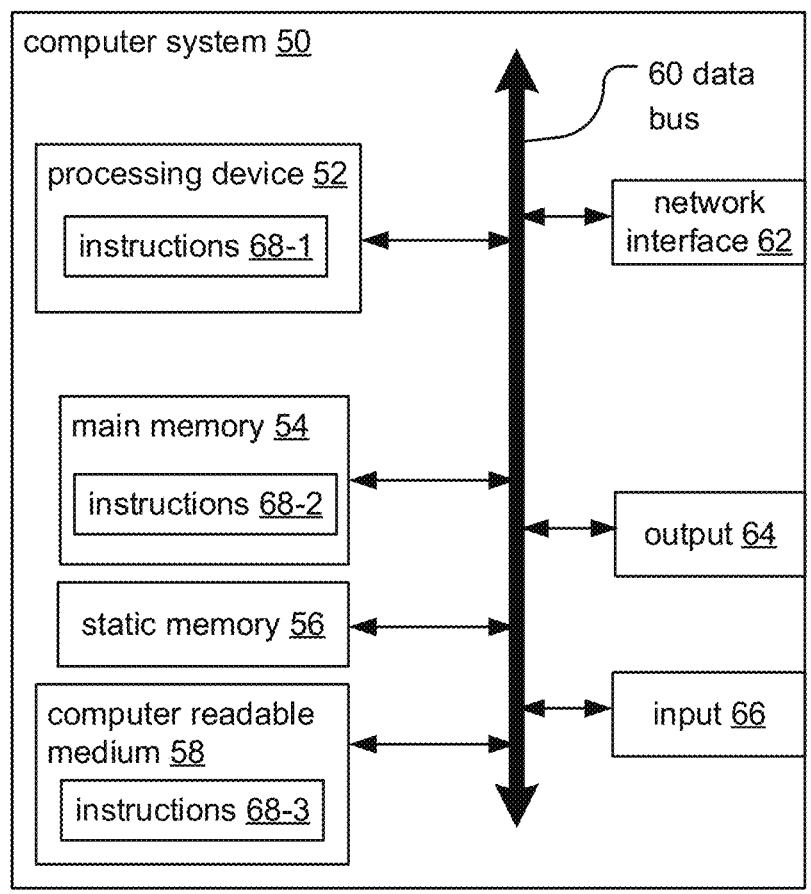
FIG. 1B is a schematic diagram showing an exemplary computer system for implementing the presently disclosed workstation system, server system and/or user device.

FIG. 1B is a schematic diagram showing an exemplary computer system 50 for implementing any of the workstation system 112, the server system 118, and/or the user device 80 illustrated in FIG. 1B.

The computer system 50 comprises a processing device 52, main memory 54 (e.g., read-only memory (ROM), flash memory, dynamic random access memory (DRAM) such as synchronous DRAM (SDRAM), etc.), and a static memory 56 (e.g., flash memory, static random access memory (SRAM), etc.), which may communicate with each other via a data bus 60. Alternatively, the processing device 52 may be connected to the main memory 54 and/or static memory 56 directly or via some other connectivity means. The processing device 52 may be a controller or used to implement a controller (such as the controller 81 of the user device 80 or any controllers of the workstation system 112 or the server system 118), and the main memory 54 or static memory 56 may be any type of memory or may be used to implement any type of memory systems (such as the memory 82 of the user device 80, the data store(s) 164 of the server system 118, or any memory systems of the workstation system 112).

The processing device 52 represents one or more general-purpose processing devices such as a microprocessor, central processing unit, or the like. More particularly, the processing device 52 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 52 is configured to execute processing logic in instructions 68 (e.g., stored in the main memory 54, or in the processing device 52 itself, or provided via the computer readable medium 58) for performing the operations and steps discussed herein.

The computer system 50 may or may not include a data storage device that includes instructions 68-3 stored in a computer-readable medium 58. As previously mentioned, the instructions 68 may also reside, completely or at least partially, within the main memory 54 and/or within the processing device 52 during execution thereof by the computer system 50, the main memory 54 and the processing device 52 also constituting computer-readable medium. The instructions 68 may further be transmitted or received over a network such as the public network 90 via a network interface 62 (e.g., the network interface 83 of the user device 80, or any network interfaces of the workstation system 112 or the server system 118) of the computer system 50.

While the computer-readable medium 58 is shown in an exemplary embodiment to be a single medium, the term "computer-readable medium" should be taken to include a single medium or multiple media (e.g., a centralized or distributed database, and/or associated caches and servers) that store the one or more sets of instructions 68. The term "computer-readable medium" shall also be taken to include any medium that is capable of storing, encoding, or carrying a set of instructions for execution by the processing device 52 and that cause the processing device 52 to perform any of one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps (to be described). The steps of the embodiments disclosed herein may be performed by hardware components or may be embodied in machine-executable instructions 68, which may be used to cause a general-purpose or special-purpose processing device 52 programmed with the instructions 68 to perform the steps. Alternatively, the steps may be performed by a combination of hardware and software.

Those of skill in the art would further appreciate that the various illustrative logical blocks, modules, circuits, algorithms, apps, subsystems, services, engines and/or servers described in connection with the embodiments disclosed herein may be implemented as electronic hardware, instructions 68 stored in memory 54 or in another computer-readable medium 58 and executed by a processor or processing device 52, or combinations of both. Memory disclosed herein may be any type and size of memory and may be configured to store any type of information desired. To clearly illustrate this interchangeability, various illustrative components, blocks, modules, circuits, and steps have been or will be described generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, circuits, algorithms, apps, subsystems, services, engines and/or servers described in connection with the embodiments disclosed herein may be implemented or performed with a processing device 52, processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processing device 52. A processing device may be a microprocessor, but in the alternative, the processing device may be any conventional processor, controller, microcontroller, or state machine. A processing device 52 may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one skilled in the art. Those of skill in the art would also understand that information may be represented using any of a variety of different technologies and techniques. For example, data, instructions, commands, information, bits, symbols, and chips that may be referenced throughout the preceding or following description may be represented by voltages, currents, electromagnetic waves, magnetic fields or particles, optical fields or particles, or any combination thereof.

Architecture

Figure 1C:
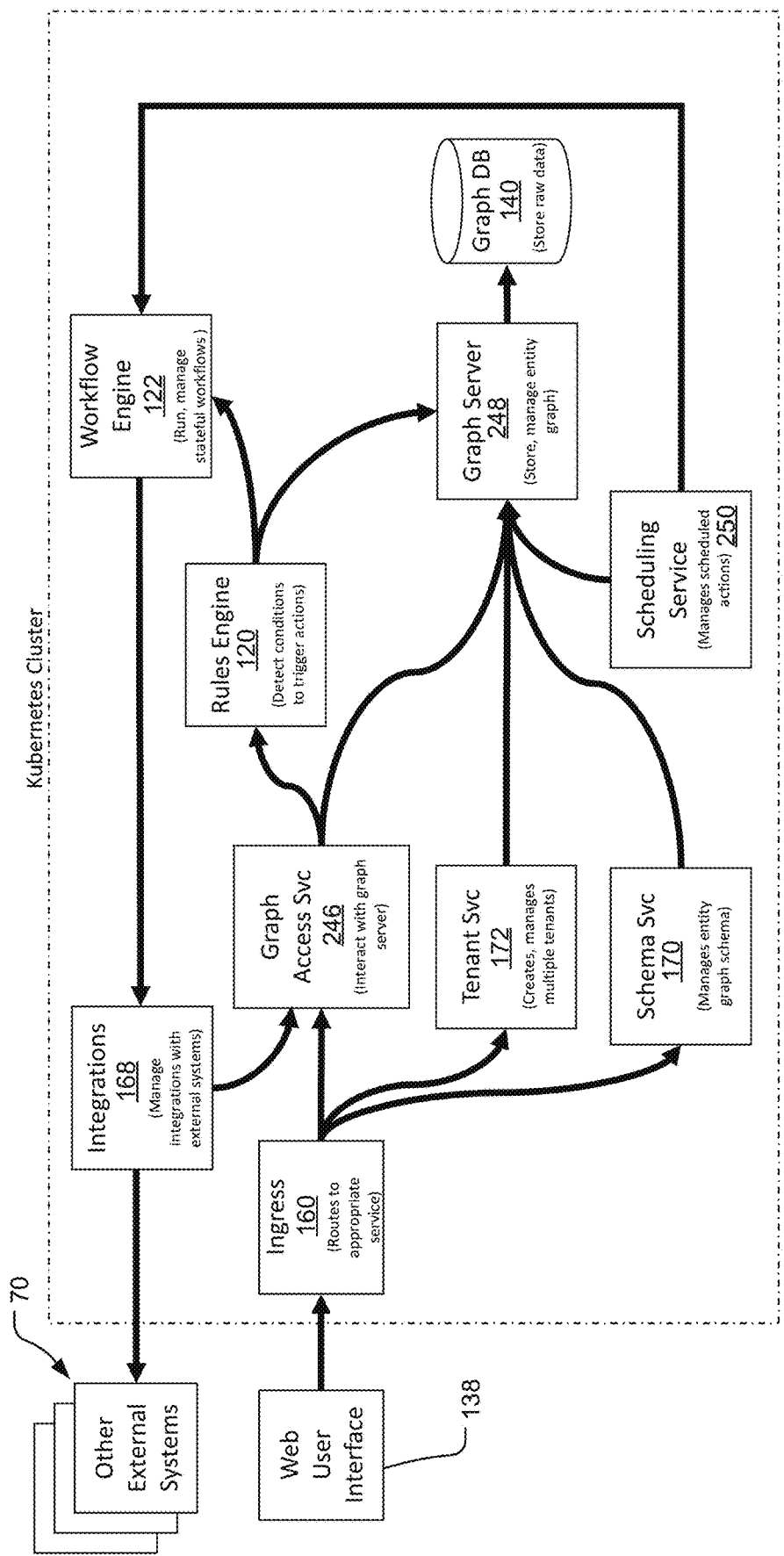
FIG. 1C is a schematic diagram of the exemplary entity discovery, resolution, tracking, and remediation system showing a more detailed view of how data flows through the system.

FIG. 1C is a schematic diagram of the exemplary entity discovery, resolution, tracking, and remediation system 100 according to one embodiment of the present invention, showing additional details about how data flows through various components of the system.

In the illustrated example, the integration subsystem 168, ingress subsystem 160, graph access service 246, tenant service 172, schema service 170, rules engine 120, scheduling service 250, workflow engine 122, graph server 248, and graph database 140 of the server system 118 are depicted as part of a container-based system, specifically a Kubernetes cluster.

The graph server 248 maintains the entity relationship graph 162 and any updates to it, or queries against it. It uses a highly scalable graph database 140 as its backing store.

The graph access service 246 runs on the server system 118 and is the primary way that other systems or components, both internal and external (e.g. a user interacting with the web-based user interface 138 or a remote program accessing the graph 162 via the API 136) gain access to the graph server 248 for the purposes of updating or querying the graph 162.

The tenant service 172 runs on the server system 118 and is responsible for managing, creating, updating, deleting and providing information about separate tenants in a multi-tenant version of the system 100.

The rules engine 120 is responsible for responding to changes in the graph 162 which, based on configuration, should trigger some action, such as executing a workflow. It receives information about changes in the graph 162 from the graph access service 246. When a change triggers a rule it then executes the associated action(s) such as interacting with the workflow engine 122 to invoke the appropriate workflow. The rules engine is also capable of executing user-defined or system-defined scripts written in a scripting language such as Javascript or Python. In some cases, the rules engine 120 may access the graph server 248 directly to collect more information.

The workflow engine 122 runs on the server system 118 and is responsible for running and managing stateful workflows which are provided with the system and/or created by users of the system. The workflow engine 122 interacts with the integrations subsystem 168 to invoke interactions with external systems 70 pertaining to the computer environment 5 for the purpose of collecting or enriching event data or invoking remediation actions and making changes to the environment 5, to name a few examples.

The scheduling service 250 is responsible for managing and executing a variety of recurring scheduled tasks. Generally, a recurring scheduled task will entail a query to identify a set of entities 8 represented in the entity relationship graph 162 that require some action and the specific action to take. One example of a recurring scheduled task would be the periodic execution of a query against the graph 162 to identify entities 8 that are out of compliance with some policy. The action might be to execute a workflow on the entities 8 returned by the query, where the workflow notifies some person(s) to take some action, or the workflow executes some automated action by calls to APIs of other software programs within or related to the computer environment 5 to remediate the policy violation. The scheduling service 250 interacts with the graph server 248, either directly or via the graph access service 246, to access the schedule configuration data. The scheduling service 250 also interacts with the workflow service, and possibly other components, to execute the configured actions.

Figure 2:
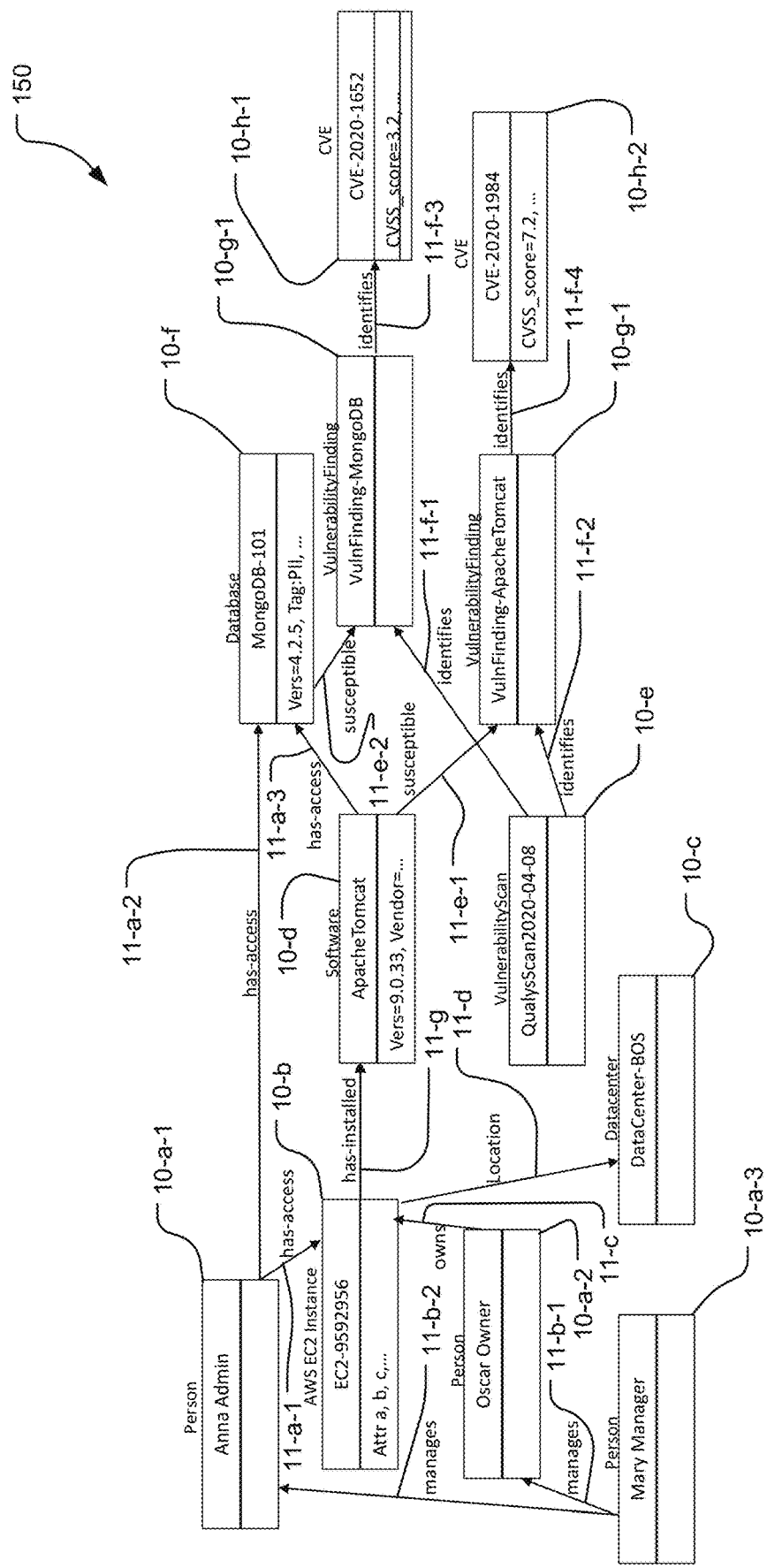
FIG. 2 is an illustration of an exemplary graph segment displayed by the user device as part of a graphical user interface.

FIG. 2 is an illustration of an exemplary graph segment 150 that would be presented to IT personnel, for example, as part of the GUI 87 and/or browser user interface 138 rendered on the display 84 of the user device 80. Additionally, the illustrated example also shows generally how the entity relationship graph 162 stored in the graph database 140 is logically organized (e.g., with nodes 10 representing entities 8 of the computer environment, edges 11 between the nodes 10 representing relationships between the entities 8 represented by the nodes 10), and additional properties and attributes associated with both the nodes 10 and the edges 11. The nodes are displayed as boxes including name in an upper portion of the box and characteristics of the entity in a lower portion of the box. The edges are lines between boxes.

In general, different types of nodes 10 are depicted, including person nodes 10-a representing individuals such as users that are considered entities 8 in the computer environment, AWS instance nodes 10-b, representing AWS server instances in the computer environment, datacenter nodes 10-c representing a data center in the computer environment 5, software nodes 10-d representing software executing within the computer environment 5, vulnerability scan nodes 10-e representing particular scans for vulnerabilities performed with respect to the computer environment 5 (e.g., at a particular point in time), database nodes 10-f representing databases within the computer environment 5, vulnerability finding nodes 10-g representing results of the vulnerability scans, and CVE nodes 10-h representing publicly available security flaws that pertain to the computer environment 5.

Similarly, different types of edges are depicted, including has-access edges 11-a indicating that certain entities such as users have access to other entities such as the AWS instances, manages edges 11-b indicating that certain individuals that are considered entities 8 in the computer environment 5 are managers for other individuals, owns edges 11-*c* indicating that certain people who are considered entities 8 within the computer environment are owners of other entities 8, location edges 11-*d* indicating where certain entities 8 are physically or geographically located with respect to another entity 8, susceptible edges 11-*e* indicating that certain entities 8 are susceptible or vulnerable with respect to other entities 8 representing security vulnerabilities withing the computer environment 5, identifies edges 11-*f* indicating that certain entities 8 provide identification information with respect to other entities 8, and has-installed edges 11-*g* indicating that certain entities 8 such as an AWS instance has another entity 8 installed on it.

In a display context, each of the nodes 10 and edges 11 of the graph segment 150 would be represented by graphical elements (e.g., icons or shapes) displayed as part of the GUI 87. In one example, visual characteristics of the graphical elements representing the nodes 10 and the edges 11 correspond to the visual characteristics of the nodes 10 and edges 11, respectively, as they are depicted in the illustrated example, with graphical elements representing the nodes 10 being displayed as rectangular shapes enclosing textual information indicating values assigned to properties of the nodes, and graphical elements representing the edges 11 being displayed as arrows connecting the graphical elements representing the nodes 10 with textual information adjacent to the arrows indicating values assigned to properties of the edges 11.

In the illustrated example, the graph segment 150 presents a situation of a computer entity 8 represented as node 10-*b* in the graph segment 150. The computer node 10-*b* could have attributes recording information such as the make/model of the computer, its operating system (e.g., represented by node 10-*d*), the time of its last restart, etc. There may also be users (e.g., represented by nodes 10-*a*-1, 10-*a*-2, and 10-*a*-3) interacting on the computer network. Each user is represented as a node 10-*a* in the graph segment 150, for example, with attributes such as their user id, email address, phone number, etc. If a user logs into the computer over the network this can be represented in the graph segment 150 as an edge of type logged_into from the user node to the computer node (not illustrated). This is a very simplistic example relative to normal operating conditions to be expected for the presently disclosed system 100. For example, in a normal situation there will typically be many different entities 8 of interest with long sequences of relationships represented by long sequences of nodes 10 and edges 11.

It could be the case that there are several data sources 12 that have information about the same entity 8. Some examples of the data sources 12 include, but are not limited to, public cloud infrastructure, identity and access management products, vulnerability scanning products, endpoint management products, SIEM products, ticketing systems, networking infrastructure, network firewalls, etc. In some cases, that information from different data sources 12 about the same entities 8 will be non-overlapping and additive. In some cases, the information might be conflicting.

In one embodiment, the ingestion engine 114 operates according to configurable rules for dealing with joining the event data from different data sources 12 and/or resolving conflicting information from different sources 12 as collected by the entity event collectors 110 and then storing the result in the entity relationship graph 162 and underlying relational database 140 of the graph subsystem 126. In another embodiment of the present system and method, the information from each data source 12 can be stored independently, and any combining or conflict resolution is invoked at run time as the information is being queried.

Figure 3:
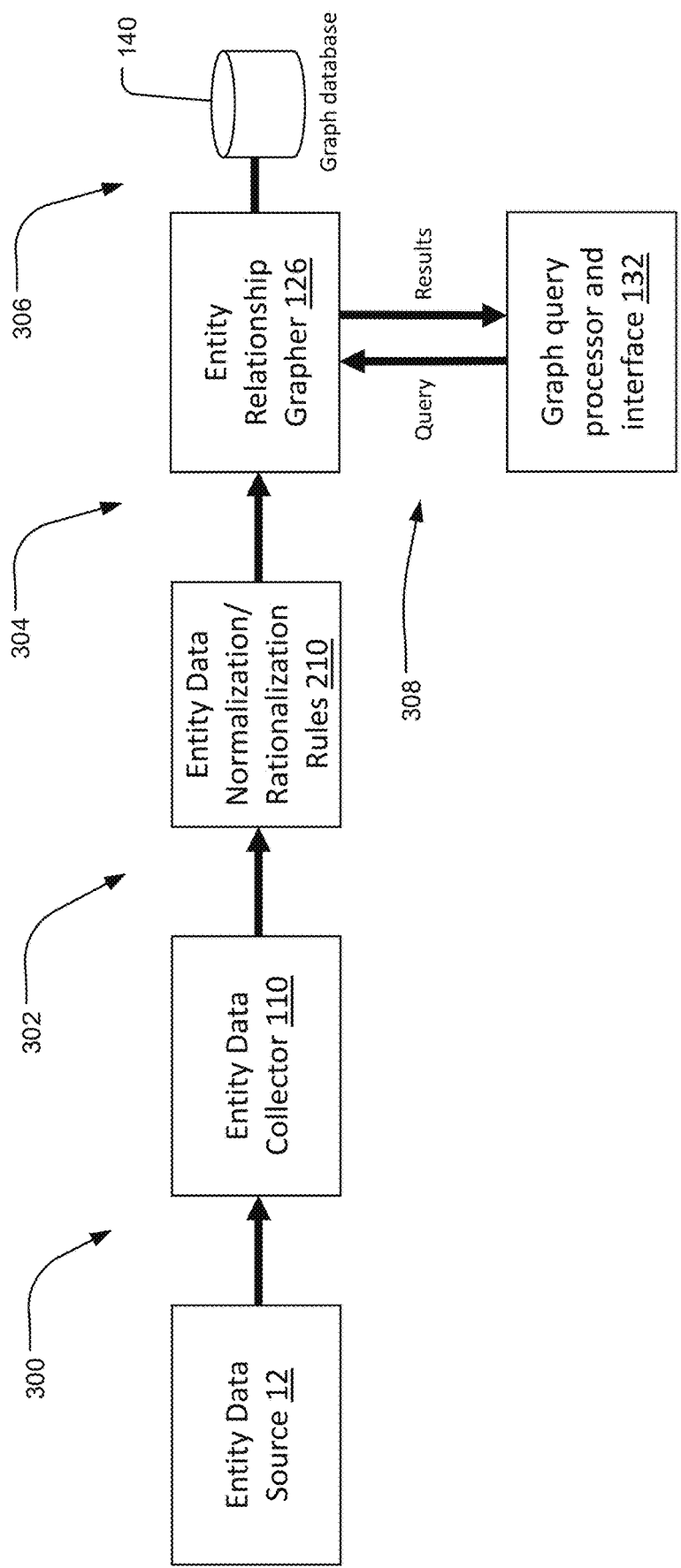
FIG. 3 is a schematic diagram showing a possible configuration for collection, normalization, and rationalization of data, with reference to steps of a data collection, normalization, and rationalization process performed by the depicted configuration.

FIG. 3 is a schematic diagram showing a possible configuration for collection, normalization, and rationalization of data, with reference to steps of a data collection, normalization, and rationalization process performed by the depicted configuration, according to an embodiment of the present invention. Specifically, in step 300, the data sources 12 are interrogated by the entity data collectors 110 for event data. In step 302, the event data is received by the ingestion engine 114 which then performs entity data normalization and rationalization by applying a set of programmed rules 210, which, in one example, are configured based on input from the user received via the GUI 87 of the user device 80 and stored in the data store(s) of the server system 118. The normalized and rationalized event data is then sent to the entity relationship graph subsystem 126 in step 304 and stored by the entity relationship graph subsystem 126 in the underlying relational database 140 in step 306. Finally, in step 308, the entity relationship graph 162 stored in the graph database 140 is then accessed by the graph query processor and interface 132, for example, in response to queries generated and transmitted to the server system 118 by the user device 80.

Figure 4:
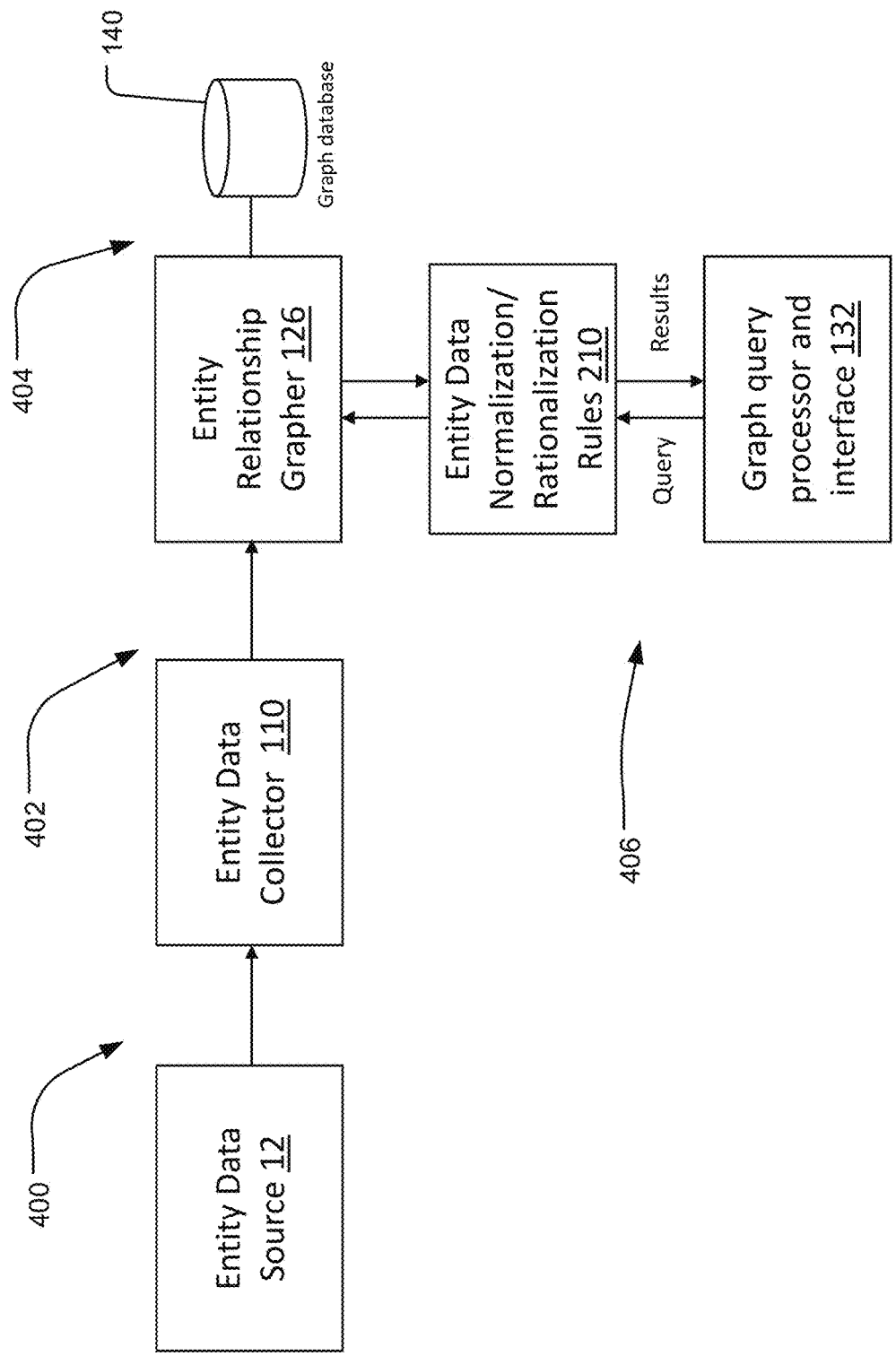
FIG. 4 is a schematic diagram showing a possible configuration for collection, normalization, and rationalization of data, with reference to steps of a data collection, normalization, and rationalization process performed by the depicted configuration.

FIG. 4 is a schematic diagram showing a possible configuration for collection, normalization, and rationalization of data, with reference to steps of a data collection, normalization, and rationalization process performed by the depicted configuration, according to an embodiment of the present invention. Specifically, in step 400, entity data collectors 110 receive the event data from the data sources 12 and, in step 402, provide the event data to the entity relationship graph subsystem 126 to be maintained by the entity relationship graph subsystem 126 as the entity relationship graph 162 stored in the graph database 140 in step 404. In step 406, the graph query processor and interface 132 applies the entity data normalization and rationalization rules 210 to the data generated by the various entity data collectors 110 and/or stored in the graph database 140 in order to provide an aggregated result view, which is displayed, for example, on the GUI 87 of the user device 80.

The disadvantage of storing the event data from each data source 12 separately (as described above with respect to the embodiment illustrated in FIG. 4) is that it involves storing much more data and, depending on the graph implementation, more nodes in the entity relationship graph 162. On the other hand, the advantage is that if the efficacy, credibility or applicability of any of the data originating from particular data sources 12 changes, these efficacy, credibility, and/or applicability changes can be accounted for by configuring or re-configuring the logic (e.g., normalization and rationalization rules 210) used to normalize and rationalize the data. Such configuration changes become effective immediately for all entities 8 including those added to the graph 162 in the past. It also enables the user of the system to build an understand of why entities 8 and their attributes are what they are and assess the efficacy and value of each source 12 in identifying and quantifying entities and their relationship.

In embodiments, there is typically a separate entity event collector 110 for each source 12 of event data. However, one entity event collector 110 can also work with several sources 12 to further enrich, validate, correlate and refine the information before using it to update the graph 162. An entity event collector 110 can be configured operate in any of several ways depending on the nature and capabilities of the source(s) 12 it is collecting the event data from.

Figure 5:
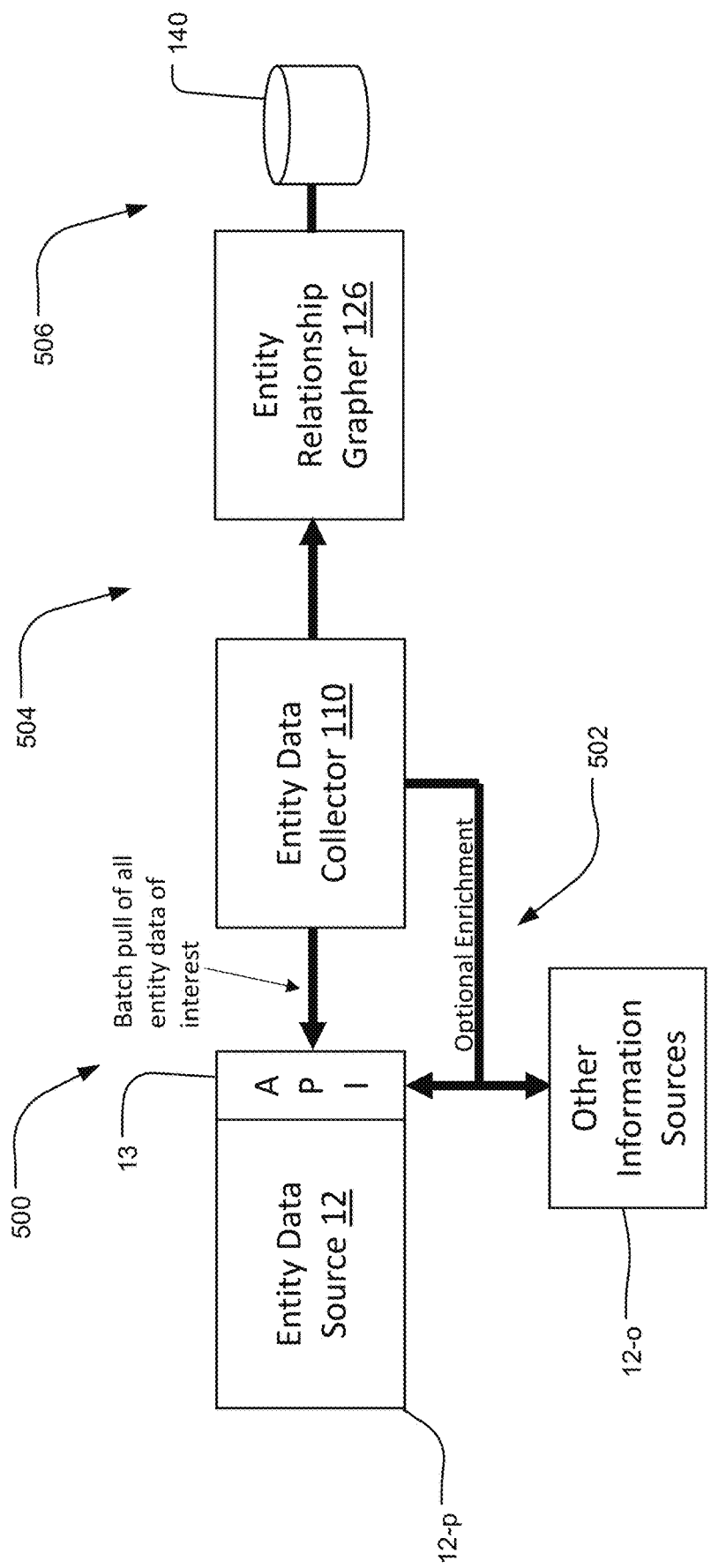
FIG. 5 is a schematic diagram showing a possible configuration for collection of data, with reference to steps of a data collection process performed by the depicted configuration.

FIG. 5 is a schematic diagram showing a possible configuration for collection of data, with reference to steps of a data collection process performed by the depicted configuration. In the exemplary mode of operation illustrated, the entity event collector 110 performs the batch load operation in step 500, which, for example, would be very typical when the data source 12 is first being accessed, and the system 100 needs to complete an initial collection of all existing event data from the source. This batch load would typically be accomplished by the entity collector using the APIs 13 of the data source 12 system. These APIs 13 could be any programmable interfaces appropriate for collecting metadata that describes conditions within the computer environment 5, and might include REST APIs, programmatic access to logging information, and database interfaces (e.g. SQL), among other examples. In some cases, the entity event collector 110 retrieves from a primary data source 12-*p* all of the contextual event data needed to effectively update the entity relationship graph 162 in steps 504 and 506. In other cases, the entity event collector 110 determines a need to perform enrichment of the event data collected from the primary data source 12-*p* by proactively acquiring additional event data and, in response, acquires the additional event data in step 502 by further querying the primary data source 12-*p* and/or some other data sources 12-*o*, via the respective APIs of the data sources 12.

Figure 6:
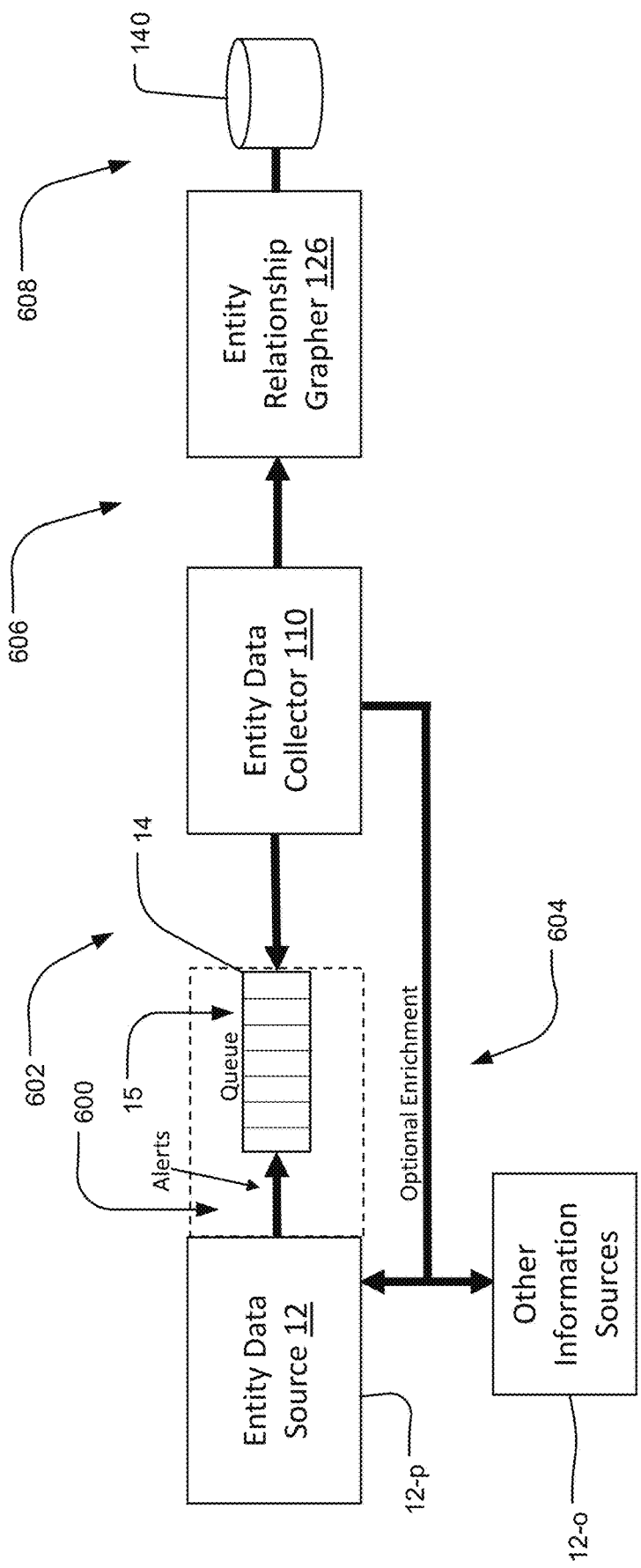
FIG. 6 is a schematic diagram showing a possible configuration for collection of data, with reference to steps of a data collection process performed by the depicted configuration.

FIG. 6 is a schematic diagram showing a possible configuration for collection of data, with reference to steps of a data collection process performed by the depicted configuration. Generally, the illustrated example shows how collecting the event data from the different data sources 12 comprises selectively retrieving only event data indicating the relevant changes to the computer environment 5 in response to alerts 14 transmitted by the data source 12, according to another embodiment of the present invention. More specifically, the illustration shows steps performed with respect to collecting the event data in response to alerts issued by the data source(s) 12, with reference to the hardware and/or software components relevant to each step. The data source 12 generates alerts 14 in step 600 in response to new event data of interest becoming available and sends the alerts 14 to an alert queue 15. In step 602, the entity event collector 110 monitors the alert queue 15, which, in one example, is a built-in component and/or capability of the data source 12 or, alternatively, an independent queue system including systems such as notification services and/or email or chat technologies. Regardless of the queueing mechanism, the entity event collector 110 retrieves the alerts 14 from the alert queue 15 and then processes the alerts 14. As before, in some cases, the alerts 14 include all of the contextual event data needed for the entity event collector 110 to effectively update the entity relationship graph 162 in steps 606 and 608. In other cases, the entity event collector 110 determines a need to perform enrichment of the event data collected from the primary data source 12-*p* by proactively acquiring additional event data and, in response, acquires the additional event data in step 604 by further querying the primary data source 12-*p* and/or some other data sources 12-*o*, via the respective APIs of the data sources 12.

Figure 7:
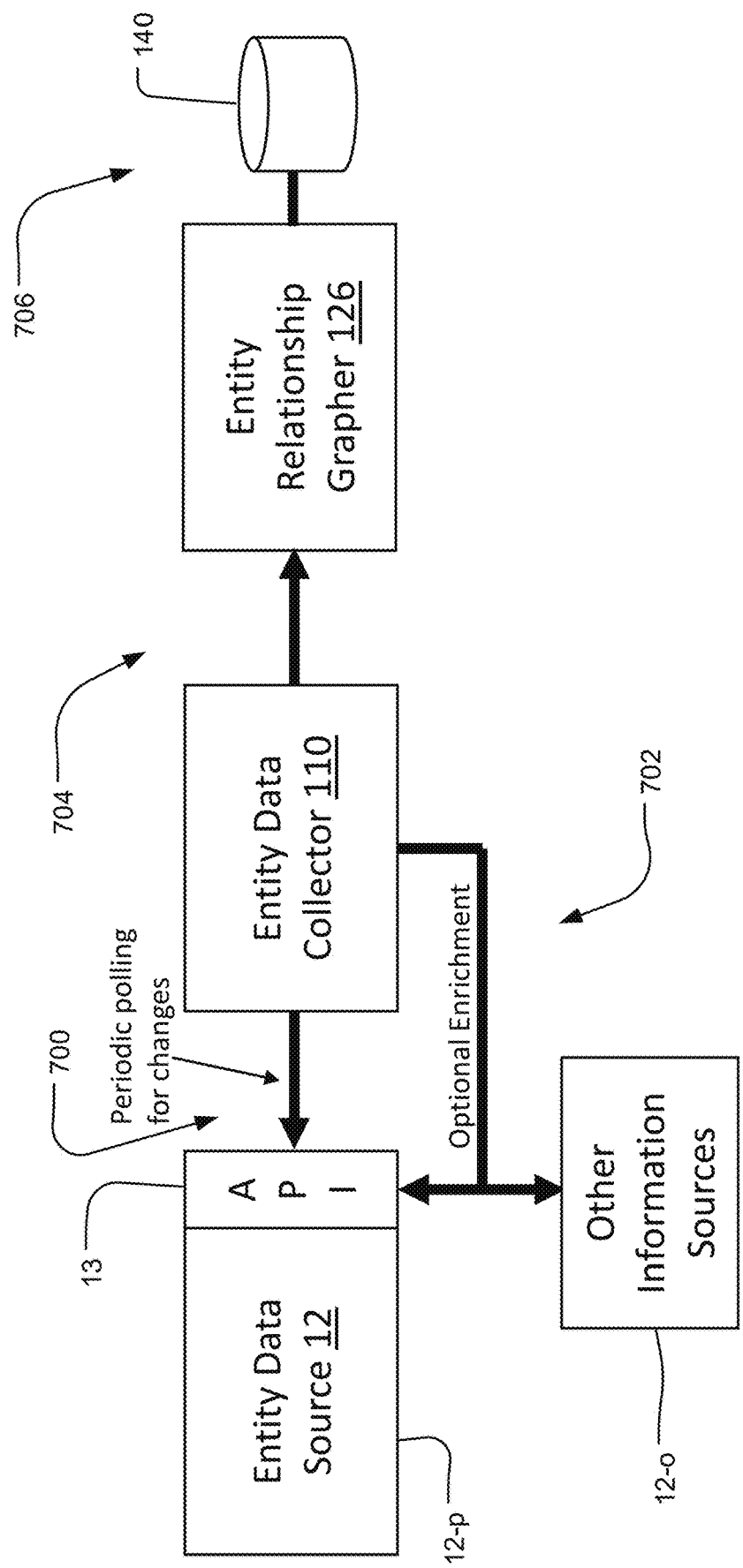
FIG. 7 is a schematic diagram showing a possible configuration for collection of data, with reference to steps of a data collection process performed by the depicted configuration.

FIG. 7 is a schematic diagram showing a possible configuration for collection of data, with reference to steps of a data collection process performed by the depicted configuration. Generally, the illustrated example shows how collecting the event data from the different data sources 12 comprises selectively retrieving only event data indicating the relevant changes to the computer environment 5 by periodically polling a data source 12 for new event data reflecting the relevant changes, according to another embodiment of the present invention. More specifically, the illustration shows steps performed to periodically poll the data source(s) 12, with reference to the hardware and/or software components relevant to each step. In this third illustrated mode of operation, the entity event collector 110 periodically polls the source 12 in step 700, typically via the API 13, looking for new event data indicating relevant changes. The polling frequency is adjusted based on the characteristics of the data source 12 and the nature of the event data available from that data source 12. As in the other modes, the collector 110 may receive all of the contextual information needed for the entity event collector 110 to effectively update the entity relationship graph 162 in steps 704 and 706. In other cases, the entity event collector 110 determines a need to perform enrichment of the event data collected from the primary data source 12-*p* by proactively acquiring additional event data and, in response, acquiring the additional event data in step 702 by further querying the primary data source 12-*p* and/or some other data sources 12-*o*, via the respective APIs of the data sources 12.

Schema Definition and Schema Service

The presently disclosed system and method is configured to consume user-specified type definitions, for example, according to a computer-readable schema definition language and format built on and extending standards such as JSONSchema and OpenAPI (for example). This schema definition language supports the definition of details about each entity type including, among other things, what attributes the entity type can, or must, include and what other entity types it can, or must, have relationships to.

Accordingly, the entity event collectors 110, ingestion engine 114, and/or the entity relationship graph subsystem 126, in conjunction with the schema service 170 generate the entity relationship information, including the entity relationship graph 162, based on predetermined and/or user-specified type definitions formatted according to the declarative schema definition language, the type definitions including markup specifying particular properties and relationships for different entity types such as those described above.

In this way, the graph segments 150 displayed as part of the GUI 87 and/or browser user interface 138 reflect the properties and relationships defined via the type definitions, as do the query building features provided via the graph query and display app 85, which will be described below in additional detail with respect to subsequent figures.

FIG. 8 is an illustration of an exemplary type definition screen of the GUI 87 rendered on the display 84 of the user device 80 showing an exemplary type definition for an entity type according to one embodiment of the present invention. In general, the type definition comprises a series of attribute fields nested at various levels with respect to each other, with each attribute comprising a textual label and a value indicating a data type expected to be associated with the label in instances of nodes 10 representing actual entities 8 having the entity type defined by the type definition.

In the illustrated example, the type definition is for an entity type with a name of "machine," indicating that the entity type is associated with machines within the computer environment 5.

Additionally, the illustrated example shows the type definition as it might be displayed in an integrated development environment (IDE) or text editor software application enabling the user of the user device 80 to create and edit the type definitions via the input mechanisms 66 of the user device 80 such as a keyboard or touchscreen display. In this way, the type definitions enable customization by the user of entity types specific to the computer environment 5 and/or organization managing the computer environment 5.

The entity types, and the schema definition language, support a multiple-inheritance model such that an entity type can inherit from, or implement the fields from, another entity type and then include additional attributes or valid cross-entity relationships. Every entity type is described using this schema definition language.

Figure 9:
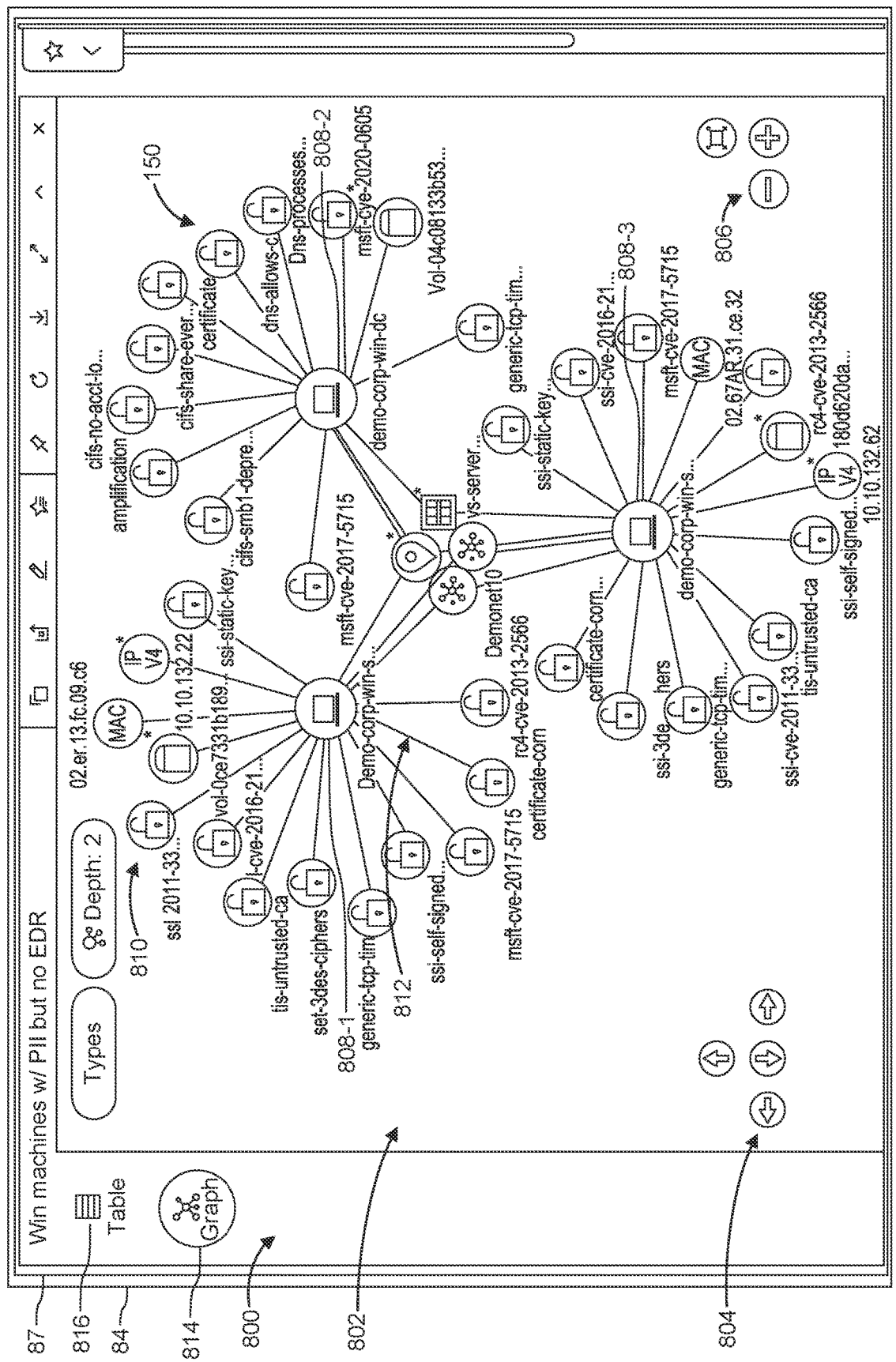
FIG. 9 is an illustration of an exemplary graph display screen of a graphical user interface (GUI) rendered on a display of the user device.

FIG. 9 is an illustration of an exemplary graph display screen 800 of the GUI 87 rendered on the display 84 of the user device 80, showing how graph segments 150 resulting from queries executed against the entity relationship graph 162 are presented to the user of the user device 80. More particularly, the graph segment 150 depicted in the illustrated example corresponds to the type definition depicted in FIG. 8.

In general, the GUI 87 comprises various screens that communicate information to the user via graphical elements such as textual information and/or recognizable icons arranged in different positions with respect to each other and the various panes and windows of the GUI 87 containing the graphical elements in such a way as to convey meaningful information based on the particular spatial arrangement and/or indicated text or symbols. Other graphical elements provided in the various screens of the GUI 87 enable the user to input information by interacting with the graphical elements displayed as part of the GUI 87 in various ways (e.g., using input devices 66 such as a keyboard, pointing device or mouse. and/or interactive virtual buttons or keys rendered on a touchscreen display to input text, manipulate a cursor for pointing at graphical elements, indicate selections of graphical elements via buttons of the pointing device such as the mouse, and indicate gestures such as highlighting or dragging and dropping graphical elements such as icons or characters contained within a selection region and/or indicated by the cursor, among other examples). The graphical elements include virtual buttons, which are generally displayed in the screens as shapes or oblongs, sometimes with recognizable symbols or text indicating the functions of the virtual buttons.

More specifically, the graph display screen 800 comprises a graph pane 802 for displaying a graph segment 150, which commonly would be generated by the entity relationship graph subsystem 126 based on and in response to queries received via input from the user received by the user device 80 via the input devices 66 and returned to the user device 80 for display. The graph pane 802 displays the graph segment 150 as a series of graphical elements 808, 810, 812 representing various entities 8 and relationships between the entities. The graphical elements 808, 810, 812 have different visual characteristics based on and indicating whether they represent nodes 10 of the graph 162 (and thus entities 8 of the computer environment) or edges 11 of the graph 162 (and thus relationships between the entities 8). For example, the node elements 808, 810 represent the nodes 10 (and/or entities 8), while the edge elements 812 represent the relationships between the nodes 10 (and/or entities 8). Additionally, the node elements 808, 810 have visual characteristics based on and indicating distinct node types. These node types can correspond to entity types defined via the type definitions and/or logical roles of the nodes 10 represented by the node element 808, 810 in the context of the entity relationship graph 162 or even simply in a display context pertaining to operation of the graph query and display app 85. For example, node elements 808, 810 might contain different symbols (e.g., centered within the circular shapes defined by the graphical elements), be displayed in different hues, and/or be displayed having different shapes or sizes based on different entity types defined via the type definitions, arguments provided as part of the query that originated the graph segment 150 for targeting particular results, and/or viewing preferences specified locally within the graph query and display app 85.

Generally, however, the graph segment 150 is displayed as circular node elements 808, 810 connected to each other by the edge elements 812, which are displayed as line segments with one end contacting a point on a perimeter of one node element 808, 810 and the other end contacting a point on the perimeter of another node element 808, 810.

The resulting graph segment 150 in the illustrated example comprises three relatively prominently featured primary node elements 808-1, 808-2, 808-3 representing nodes 10 and/or entities 8 having the entity type defined in the type definition depicted in FIG. 8, each connected via a plurality of edge elements 812 to a plurality of relatively less prominently featured secondary node elements 810 representing nodes 10 and/or entities 8 having different entity types such as those defined as indicating attributes or properties of the more prominent nodes 808 or as representing types of entities 8 having only a secondary relevance to the security of the computer environment 5.

Some of the secondary node elements 810 have mutual connections to more than one of the primary node elements 808, forming relationship sequences connecting the primary node elements 808 to each other via the secondary node elements 810 and the intervening edges 812.

The graph pane 802 further comprises a series of directional buttons 804 for panning a view of the graph segment 150 in different directions to reveal different portions of the graph segment 150 that are not shown in the graph pane 802 and are depicted as being positioned and/or moving outside of the viewable region contained within the graph pane 802.

Similarly, the graph pane 802 further comprises a series of zoom buttons 806 for zooming the view of the graph segment 150 in and out, bringing into focus particular regions of the graph segment 150 resulting in other regions not being shown in the graph pane 802 and being depicted as being positioned and/or moving outside of the viewable region contained within the graph pane 802.

The graph display screen 800 further comprises a graph view button 814 and a table view button 816. In response to selection of the graph view button 814, the GUI 87 displays the graph segment 150 graphically as depicted in the illustrated example, via the previously described node elements 808, 810 and edge elements 812. In response to selection of the table view button 816, the GUI 87 displays underlying entity relationship information on which the graph segment 150 is based in a table format (not illustrated).

Figure 10:
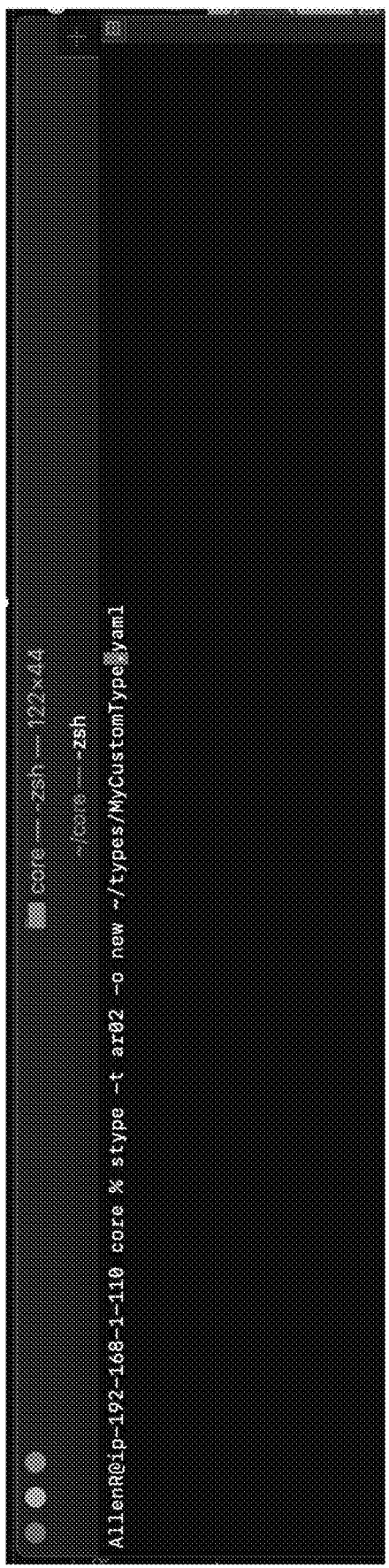
FIG. 10 is an illustration of an exemplary command line interface of the GUI.

FIG. 10 is an illustration of an exemplary command line interface of the GUI 87 rendered on the display 84 of the user device 80 showing an exemplary command line utility configuring the presently disclosed system 100 by importing new or edited entity type definitions determining how the system collects and/or enriches the event data, generates the entity relationship information and/or graph 162, constructs queries, and/or displays query results, among other examples. In the illustrated example, the system 100 is a multi-tenant system, and a new type having a type definition in a file on the filesystem "~/types/MyCustomType.yaml" is being loaded into a tenant called "ar02".

In existing schema definition languages, it is common to declare the structure and constraints of a datatype. In the context of the presently disclosed system and method, however, additional concerns include how to relate data from multiple systems and applications from independent vendors and how to describe relationships between data elements in a way that supports graph-based query and display techniques. Consequently, the schema definition language includes explicit markup fields that define relations to external types. This allows data corresponding to this schema to be automatically transformed from an object representation into a graph representation.

Commonly, descriptions of existing enterprise application data and interfaces are available in JSONschema or OpenAPI format. This schema language allows definition of graph-specific markup, including relationships, constraints and derived properties, using the same schema language.

FIG. 11 is an illustration of an exemplary type definition according to one embodiment of the present invention, showing how a publicly available reference schema has been extended according to the presently disclosed system and method.

Figure 12:
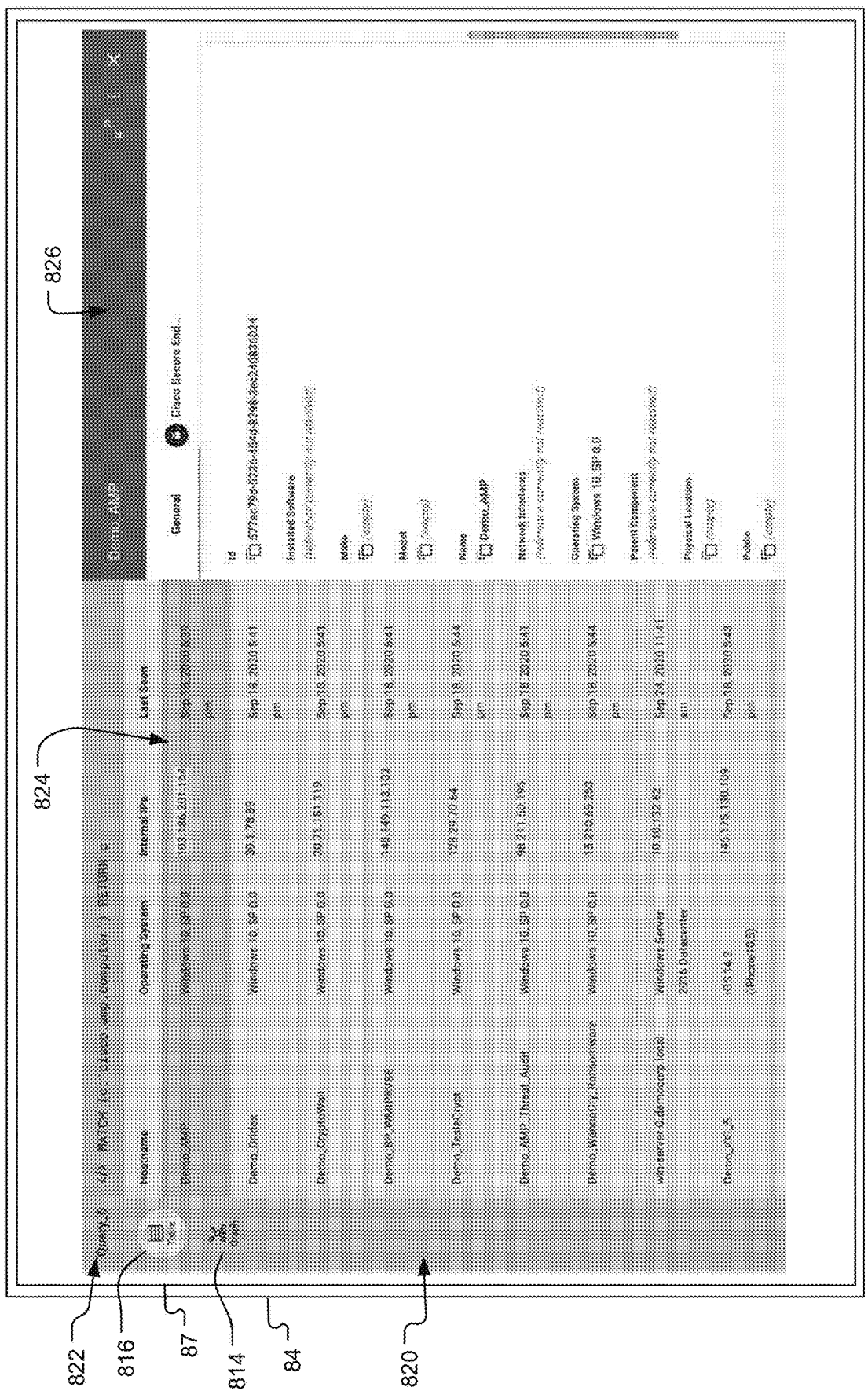
FIG. 12 is an illustration of an exemplary table display screen of the GUI.

FIG. 12 is an illustration of an exemplary table display screen 820 of the GUI 87 rendered on the display 84 of the user device 80, showing how entity relationship information resulting from queries executed against the entity relationship graph 162 are presented to the user of the user device 80 specifically in a table format. The GUI 87 displays the table display screen 820 in response to selection by the user of the table view button 816 of the graph display screen 800. Conversely, the graph display screen 800 is displayed in response to selection of the graph view button 814 on the table display screen 820. The table display screen 820 comprises a query pane 822, a table pane 824, and a details pane 826. The query pane 822 includes a textual representation of the query that was executed against the entity relationship graph 162 to generate the entity relationship information displayed in the table pane 824. The table pane 824 comprises a series of graphical elements representing lines in a table, each of which represents a different entity 8. Column headers of the table pane 824 indicate attribute labels for a series of columns, with textual information on each line of the table, within the graphical element representing the line in the table, indicating values assigned to each of the attributes. In response to selection of any of the graphical elements for each of the lines of the table, the GUI 87 displays in the details pane 826 additional, detailed attribute information.

In the illustrated example, the query pane 822 indicates that the query targeted entities of type "cisco.amp.computer." This entity type does not define a property called "Id" but instead inherits the property from the entity type "Machine," which the "cisco.amp.computer" entity type extends.

Figure 13:
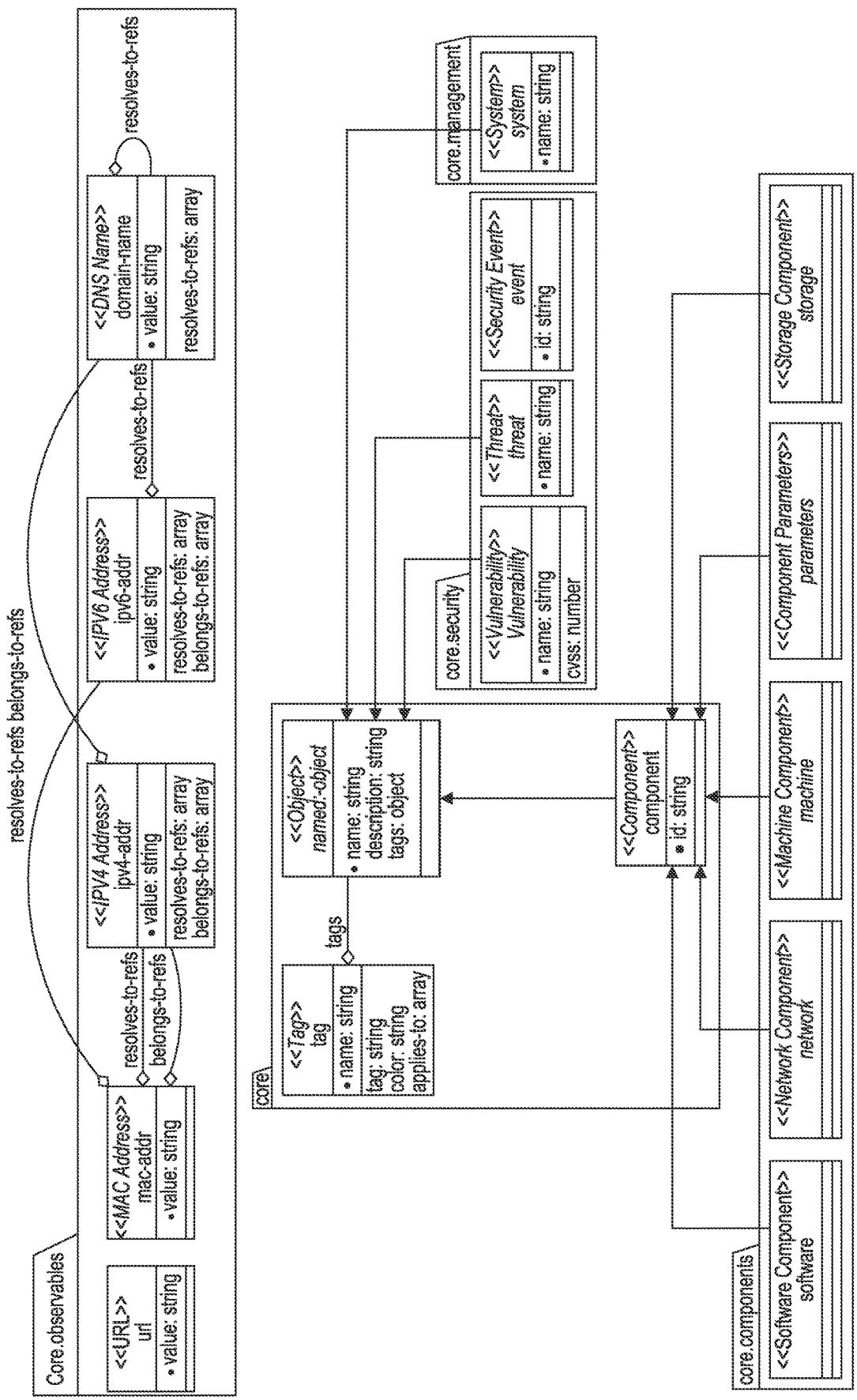
FIG. 13 is an illustration of an exemplary entity type hierarchy.

Similarly, FIG. 13 illustrates an exemplary entity type hierarchy according to an embodiment of the present invention, showing how special entity types specific to particular data sources inherit and/or extend the properties and relationships of other entity types according to the specified entity type hierarchy, with the special entity types specifying additional properties and relationships specific to the particular data sources.

More particularly, the present system and method incorporate a comprehensive hierarchy of default entity types which are appropriate for the general cybersecurity problem domain. This hierarchy of default cybersecurity entity types are included when an instance of the system is initially installed or deployed. However, in many cases there are organization-specific variations in the types of entities which need to be tracked in the system. This can commonly happen as cybersecurity technologies advance and new concepts emerge or when an organization integrates information from a new data source 12 in their environment 5 which provides insights on entities not sufficiently supported by the existing default entity types. For this reason, the present system and method supports the ability for additional types to be defined and imported into the system. This capability includes creating entirely new entity types or extending existing built-in or custom entity types. In this way, the system is easily extensible to support any entity types and use cases the specific organization requires. Once new types are imported into the system the schema definition allows the rest of the system to understand how to interact with entities of that type. This allows them to be supported just like the built-in types in every respect.

As previously mentioned, the schema service 170 is responsible for consuming schema definitions, validating, and storing them. Also, through the schema service the entity type schema can be accessed and used by various other aspects of the present system and method. In one example, when a new entity 8 is discovered the entity event collector 110 interrogates the entity type via the schema service 170 to ensure the entity attributes are collected, valid, and recorded properly. The entity event collector 110 also uses this understanding of the entity type schema to recognize, resolve and validate references to other related entities 8. When an entity 8 or relationship is being added to the graph 162 the system validates that the entity 8 or relationship meets the requirements of the associated entity type to ensure data integrity. Similarly, when the GUI 87 is displaying information about a particular entity 8, it can interrogate the schema service 170 to collect information that is helpful in making decisions regarding how to display the information. When a user is trying to generate a graph pattern query against the graph 162, the GUI uses information about the entity type schema to guide the user through the query generation process by only offering options which are supported by the schema of the types involved. There are many other examples of ways the entity type definitions can be used improve the capabilities of the present system and method.

Graph Querying

The present system and method presents a GUI 87 and API 136 for executing graph queries via the graph query interface 132 against the entity relationship graph 162, among other examples. By organizing the information in a graph and exposing a graph query interface 132 the present system and method provides a convenient and effective way to extract insights based on transitive relationships which would otherwise be difficult to assess. For example, most organizations today attempt to keep track of IT assets in their computer environment 5 and have some way of categorizing them based on criticality, development/test/staging/production status, etc. They also generally have a process for scanning and tracking the vulnerabilities associated with their assets, at least their most critical ones. They can fairly easily answer the question, "Which database servers housing classified data are currently susceptible to critical vulnerabilities?" because they have classified their database servers, and they have vulnerability data indexed by system. This is clearly an important question, as having a production system holding sensitive customer or credit card data that is also susceptible to a known vulnerability represents a significant risk to the business. However, given the complex architecture and interactions of modern software systems, this approach is no longer sufficient. A database server within a computer environment can be completely patched, but if the database server is being accessed by another application that is exposed to the internet and not patched, the resulting vulnerability is just as dangerous, if not more so. Thus, for modern systems, it is important to also be able to answer the question, "Which applications have access to databases containing classified data and are also comprised of components which are currently susceptible to critical vulnerabilities?" Without an understanding of the complex relationships between systems, software, network topology, users, vulnerabilities, etc., this latter question is very difficult or even impossible to answer. However, by capturing all of the entities in question via the collected event data and their associated relationships in graph form, and by exposing a mechanism to issue graph traversal or graph pattern queries, the presently disclosed system and method provides answers to these more complicated relationship-based questions efficiently.

Rules

As previously mentioned, the present system and method comprises the rules engine 120 for configuring and executing a multitude of rules. Each of the rules comprise specified conditions and specified actions.

Figure 14:
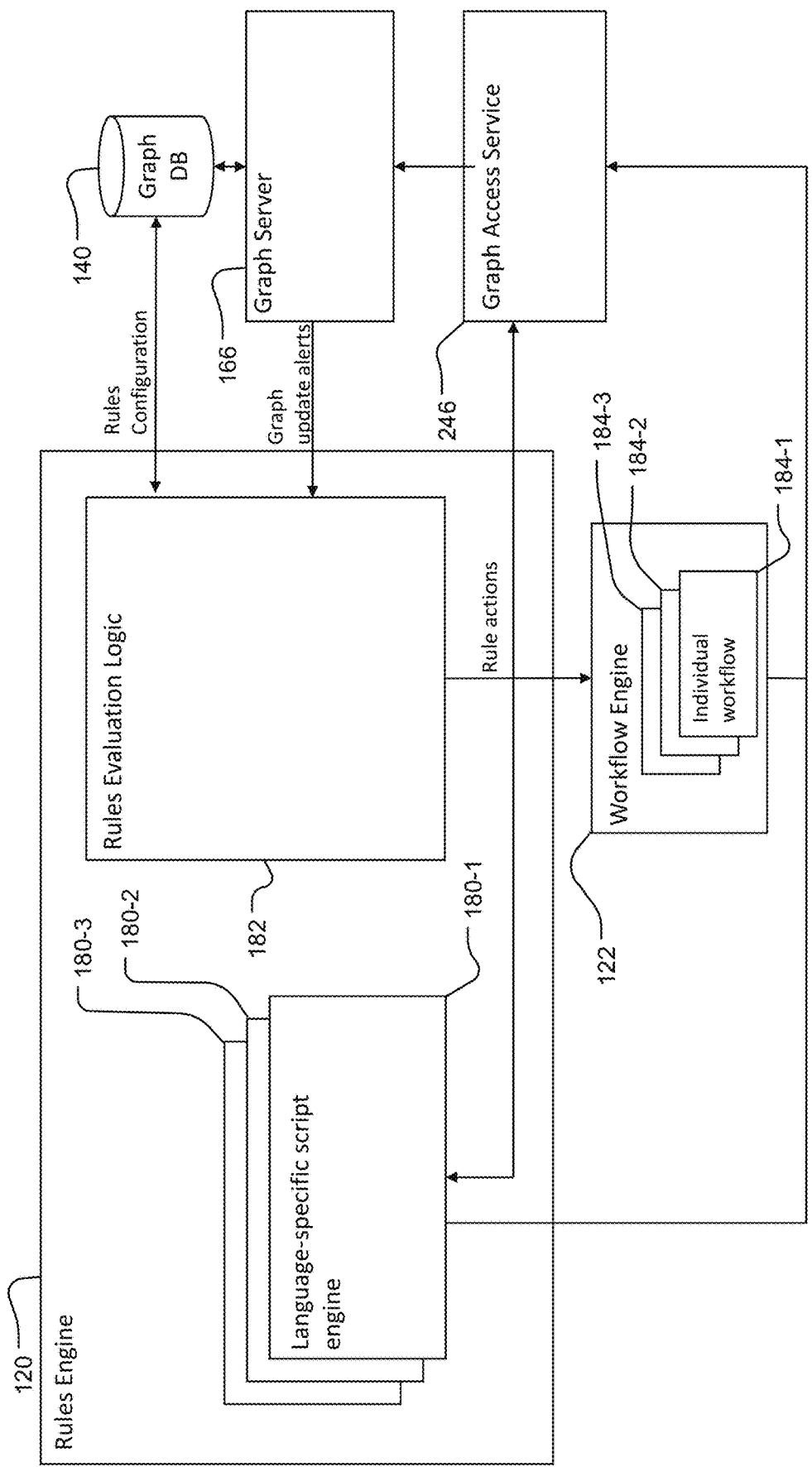
FIG. 14 is a schematic diagram of a rules engine according to an embodiment of the present invention.

FIG. 14 is a schematic diagram of the rules engine 120 according to an embodiment of the present invention, showing how managing the computer environment 5 based on the entity relationship information (e.g., the entity relationship graph 162) according to the presently disclosed system and method comprises configuring the rules engine 120 with user-specified rules for detecting specified conditions of the entities 8, properties of entities, and relationships between entities indicated by the entity relationship information and for performing specified actions in response to detecting the specified conditions.

The specified rule conditions of the rules are graph pattern queries that are predetermined and/or created and/or configured by the user and are intended to detect specified (e.g., by the users) conditions of the entities, properties of entities, and relationships between entities indicated by the entity relationship information or graph 162. Conditions can be responsive to, among other things, changing situations in the graph. Conditions can specify arbitrarily complex logic based on, but not limited to, any combination of the following;

- nodes 10 or edges 11 appearing or disappearing from the graph;
- nodes 10 or edges 11 that have, or fail to have, one or more particular attribute values;
- nodes 10 or edges 11 that have a path to, or fail to have a path to, one or more other nodes 10 of a particular type and/or that have or fail to have a particular attribute value; and
- elapsed time or reaching a particular point in time.

A rule is considered "triggered" whenever the result set returned from the query for its condition graph pattern changes or whenever the attributes on any node or edge returned by the query changes. It is expected that changes will happen frequently in a large graph modeling a large enterprise. Similarly, it is expected that organizations create a large number of rules. For this reason, it is often not practical to query for every rule condition every time there is any change in the graph.

As a result, the present system and method incorporate a mechanism to first determine if a given change in the graph has the potential to change the result of a given rule condition.

Figure 15:
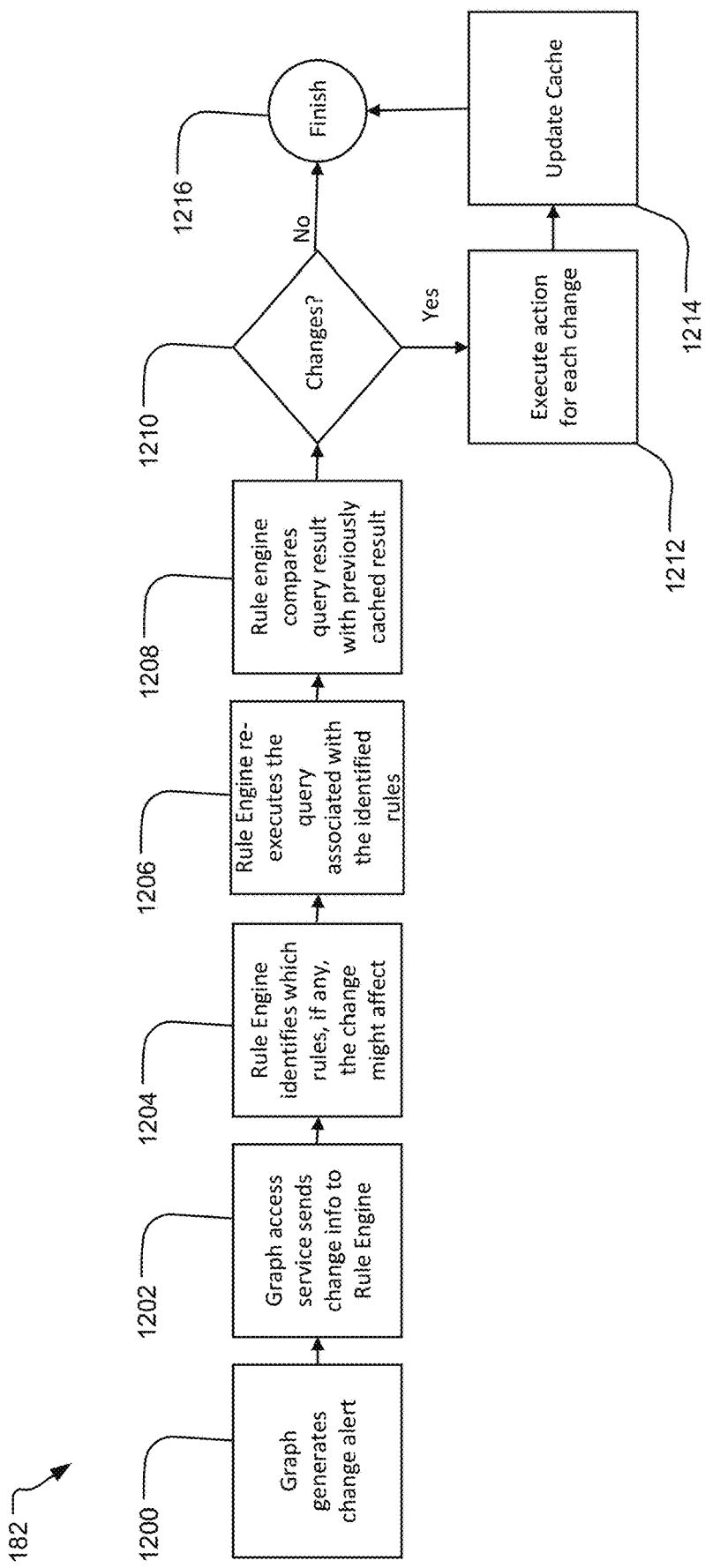
FIG. 15 is a flow diagram illustrating exemplary steps performed according to rule evaluation logic for selectively re-evaluating rules of the rules engine in response to detecting changes in the environment.

FIG. 15 is a flow diagram illustrating exemplary steps performed according to rule evaluation logic for identifying which rules of the rules engine 120 can potentially be triggered by detected changes in conditions indicated by the entity relationship information and selectively evaluating the changed conditions against the specified conditions only with respect to the rules that were identified as potentially being triggered by the detected changes in the conditions.

For example, in step 1200, the entity relationship graph subsystem 126 generates a change alert indicating that one or more changes have been made to the entity relationship graph 162. In step 1202, the graph access service 246 sends information concerning the change to the rules engine 120. In step 1204, the rules engine identifies which rules, if any, the change could potentially affect. In step 1206, the rules engine 120 re-executes the query representing the specified conditions for only the identified rules determined to be potentially affected by the change. In step 1208, the rules engine 120 compares the result of the query for the specified conditions of the rule with a previously cached result generated from the same query. In step 1210, it is determined whether the query result from the re-executed query has changed with respect to the cached query result. If not, the process ends in step 1216. On the other hand, if the re-executed query did change, the rules engine 120 executes the specified actions for each change in step 1212, updates the cache in step 1214, and then the process ends in step 1216. In this way, if a change to the entity relationship graph 162 involves modifying the value of an attribute on a node 10 representing an entity 8, if a rule's condition graph pattern does not explicitly reference that modified attribute, the change is determined to have no impact on the result of the query representing the specified conditions of the rule, and the change can be ignored for that rule.

Actions within a rule are also predetermined and/or configured by the user and are executed in response to detecting the specified conditions of the rule(s), for example, whenever the rule conditions are met by the rules engine. Actions include executing user-defined operations with respect to the computer environment, including, but not limited to, one or more of the following;

- running a program or script (e.g., user-configurable software programs to perform the user-defined operations);
- launching a workflow (e.g., user-configurable workflows provided by the workflow engine 122 executing the user-defined operations, which can be configured to invoke other workflows or software programs, as discussed in further detail later in this document); and
- directly manipulating/modifying entities and their attributes and relationships in the entity relationship graph 162.

The present system and method incorporate a mechanism through which a user of the system can create their own programs, scripts, workflows or graph manipulation logic which meet their specific use cases requirements. When a program, script, workflow or graph manipulation logic is executed as a result of a rule triggering it will be provided with the context of the rule which was triggered, and the details of the specific changes in the query results associated with the rule triggering. They can also independently query the graph for additional information and context as needed.

One of the primary purposes of a program, scripts, workflows or graph manipulation logic executed as the result of a rule being triggered is to perform automated activities to collect additional information to enrich the information indicated in the entity relationship graph 162. In one example, a new compute node being discovered triggers the execution of an nmap scan of the compute node to determine information about what IP ports the node is listening on. Additionally, another specified action might include invoking a vulnerability scan using a third-party vulnerability scanning product or tool to determine which known software vulnerabilities the node is susceptible to or querying a cloud service API to collect additional attributes about the node. Another specified action might include executing a custom program or tool or even launching a workflow which interacts with people via some electronic communication mechanism such as email or chat. Other actions might be intended to employ a program, script or workflow executed as the result of a rule being triggered to perform automated activities to manipulate entities 8 to bring them, or the overall environment 5, into compliance with some desired state.

Figure 16:
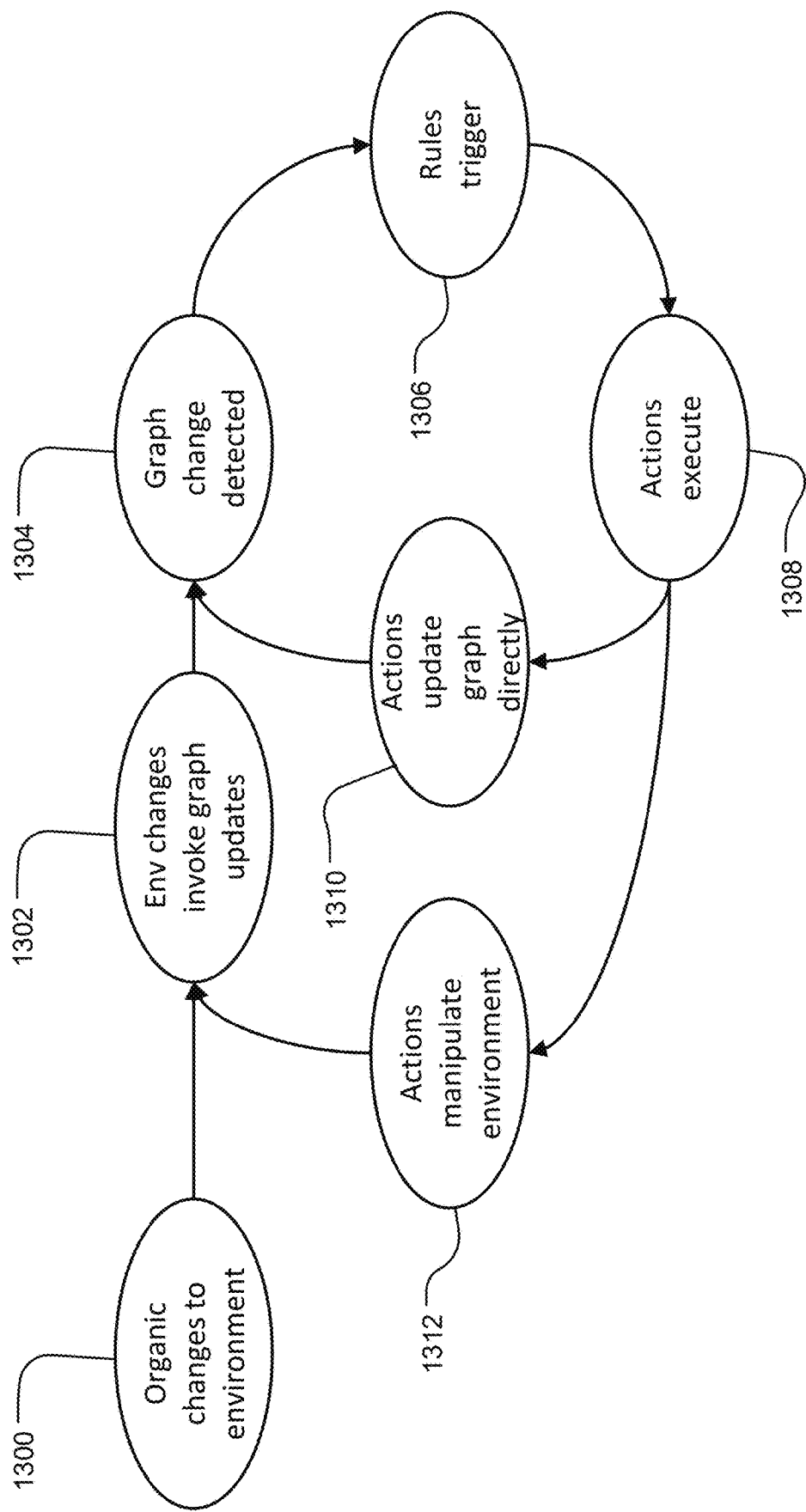
FIG. 16 is a state diagram showing how actions resulting from organic changes to the computer environment result in additional attribute and relationship data being added to the graph.

FIG. 16 is a state diagram showing how actions resulting from organic changes to the computer environment 5 such as those described above could result in additional attribute and relationship data being added to the graph 162 and/or actions performed to manipulate the computer environment 5, which could, in turn, trigger other rules. In step 1300, organic changes to the environment occur and are reflected in the collected event data and the entity relationship graph 162 in step 1302. In step 1304, the changes to the graph 162 are detected, resulting in rules being triggered by the rules engine 120 in step 1306. In step 1308, the triggered rules result in specified actions for the rules being performed by the rules engine 120. These actions might include updating the entity relationship graph in step 1310, in which case the graph change is again detected in step 1304, triggering further rules, and so forth. The actions executed in step 1308 could also effect changes or manipulation in the computer environment 5 in step 1312, in which case these environmental changes causes changes to the entity relationship graph 162, which are then detected, triggering further rules, and so forth.

As an illustrative example, consider the desire to have a particular endpoint security agent installed on all compute nodes on a specific network subnet. A rule could be created where the condition detects any entities of type ComputeNode which have a relationship path to the corresponding entity of type NetworkSubnet representing the specific subnet in question, and where the ComputeNode entity also does not have an attribute (or relationship, depending on how it is modeled) indicating the presence of the desired endpoint security agent. When this condition is triggered the corresponding action could be to execute an Ansible, or some other, script designed to install the desired endpoint agent. Any conceivable fully automated or human involved process could be substituted into this example.

The present system and method can further employ the concept that actions can not only be executed from rules but can also be manually invoked by users of the system. In this mode of operation, the user interacts with the system 100 through a user interface such as the browser user interface 138 and/or the GUI 87. The user interface will present the user with a mechanism (e.g. via some gesture such as a button click) to manually invoke actions including executing a program, script or workflow. The logic to decide when and how a given action should be exposed within the user interface is configurable.

Workflows

The present system and method can further incorporate a subsystem for configuring and executing a multitude of workflows by the workflow engine 122. Workflows allow users to define, typically through the a graphical drag-and-drop interface (e.g., presented as part of the GUI 87 of the user device 80), an arbitrarily complex set of branching logic for executing ordered actions as specified and organized in the workflow. Workflows are stateful, meaning that they accumulate state information as they progress, and each step along a path in a workflow is executed sequentially (e.g., one step must complete before the workflow progresses to execute the next step), with each step having access to the accumulated state from previously executed steps. Each workflow executed starts with the state information related to the rule (or user in the case of manually invoked workflows) and associated entities related to its invocation. In some examples, workflows include steps which invoke actions including scripts, programs, or other workflows. Workflows are particularly useful for combining many individual actions together to implement higher-level functions while remaining responsive to the specific details of each situation. Workflows are also well suited for situations involving asynchronous actions which may take a long time to complete such as emailing a user a question and waiting for them to reply before proceeding.

Figure 17:
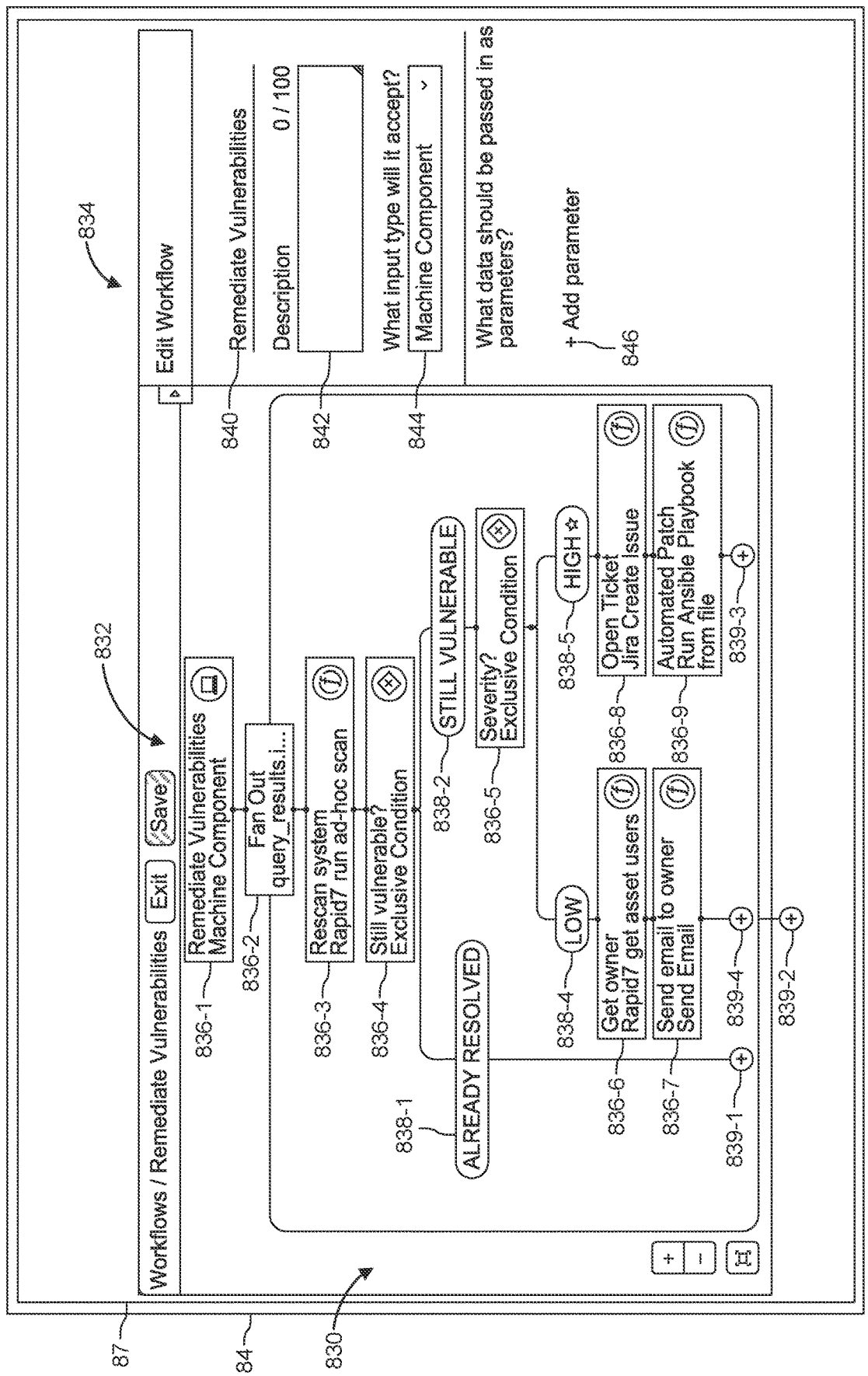
FIG. 17 is an illustration of an exemplary workflow configuration screen of the GUI.

FIG. 17 is an illustration of an exemplary workflow configuration screen 830 of the GUI 87 rendered on the display 84 of the user device 80, showing how custom workflows can be created and configured by the user.

The workflow configuration screen 830 comprises a graphical workflow builder pane 832 and a step details pane 834. In general, the graphical workflow builder pane 832 enables the user to interact with various graphical elements 836, 838 representing portions of the workflow arranged in different positions with respect to each other and the graphical workflow builder pane 832 in such a way as to graphically convey the operation of the workflow.

For example, a series of step elements 836, which are graphical elements representing steps of the workflow are arranged sequentially along a series of workflow paths, indicated by lines connecting the step elements 836 with each other in an ordered sequence corresponding to the ordered sequence of steps to be performed in the actual workflow. Each of the step elements contains textual information providing an indication of what actions are to be performed at each step. For example, step element 836-1 has a label of "Remediate Vulnerabilities" indicating that actions performed at that step are concerned with remediating vulnerabilities within the computer environment 5 step element 836-2 has a label of "Fan Out," step element 836-3 has a label of "Rescan system" indicating that actions performed at that step (e.g., by a third party security product via the workflow engine 122) concern scanning one or more entities 8 of the computer environment 5, step element 836-4 has a label of "Still vulnerable?" indicating an evaluation to confirm whether a vulnerability remains after completion of the preceding steps, and so forth.

As previously pointed out, each of the steps represented by the step elements 836 can correspond to actions such as execution of user-defined scripts, programs, or other workflows, among other examples, with the workflow engine 122 automatically driving execution of each step upon resolution of the previous step.

Additionally, a series of branch evaluation indicators 838, which are graphical elements representing possible evaluation outcomes of certain of the steps represented by the step elements 836, indicate which workflow path to take after completion of a step based on the spatial position of the branch evaluation indicators 838 on one or the other branches of a forking path. For example, branch evaluation indicator 838-1 has a label of "Already resolved?" and is positioned on a branch of the workflow path subsequent to the "Still vulnerable?" step element 836-4, and branch evaluation indicator 838-2 has a label of "Still Vulnerable" and is positioned on the other branch of the workflow path subsequent to the "Still vulnerable?" step element 836-4. Accordingly, upon completion of the step represented by the step element 836-4, the results of the evaluation to confirm whether the vulnerability remains after completion of the preceding steps determine whether the "Already Resolved?" or the "Still Vulnerable" branch is taken in the workflow path, based on the state information accumulated as a result of completion of each step leading up to the two branches.

The workflow builder pane 832 comprises an add button 839 at the end of each branch. In response to user selection of the add button 839, a new step element 836 is added to the workflow builder pane 832, allowing the user to configure the step as desired using the workflow builder pane 832 and/or the step details pane 834.

The workflow builder pane 832 also allows drag and drop interaction with the step elements 836 and/or the branch evaluation indicators 838 (e.g., using an input device 66 of the user device 80 such as a mouse or a touchscreen display). In this way, the user can rearrange the graphical elements 836, 838 as desired and in so doing modify the sequence of steps for the workflow.

The step details pane 834 comprises a series of data entry fields 840, 842, 844, 846 enabling the user to specify details for any of the steps represented by the step elements 836 in the workflow builder pane in response to selection of the step elements 836. The data entry fields include a label field 840 for adding or editing a label assigned to a step, a description field 842 for adding or editing the description assigned to a step, an input type field 844 for selecting an input type for the step, and an add parameter button 846 for adding parameters for data passed to the step upon execution of the step.

User Interface

The present system and method further incorporates a web browser-based user interface 138 displayed as part of the GUI 87 of the user device 80. The browser user interface 138 enables the user of the system 100 to easily interact with the system, for example, to execute queries against the entity relationship graph 162 in order to retrieve entity relationship information. The user interface will include the normal functions of a typical web application including, but not limited to, authentication, authorization and access control, and other general configuration, etc. In particular, the present system and method includes a user interface 138, 87 enabling the users to query and filter on the graph data set. The query mechanism can be either manual (e.g., by typing queries following a particular query language) or graphical using a drag-and-drop user interface metaphor for building queries.

Figure 18:
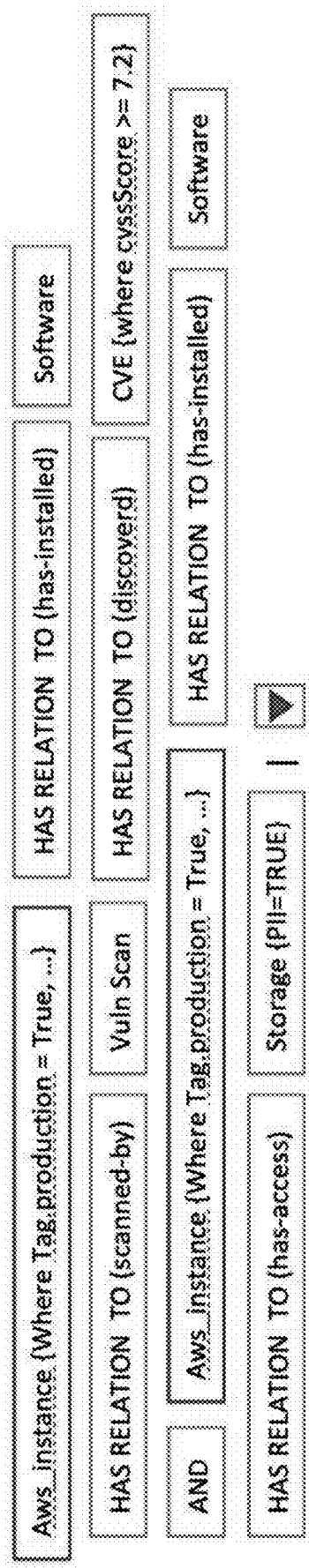
FIG. 18 is an illustration of an exemplary relationship between a query built using a graphical query builder and the underlying raw query.

FIG. 18 is an illustration of an exemplary relationship between a query built using a graphical query builder and the underlying raw query (in this case using a standardized graph query language called OpenCipher). Query results are typically displayed in either a tabular or graph format, as demonstrated by the previously described table display screen 820 and graph display screen 800, respectively. The interface enables the user to sort and filter query results and specify details of how graphical views are displayed (e.g. graph depth, which node types to include). The information is also accessible via the API 136 over a computer network such as the public network 90.

Figure 19:
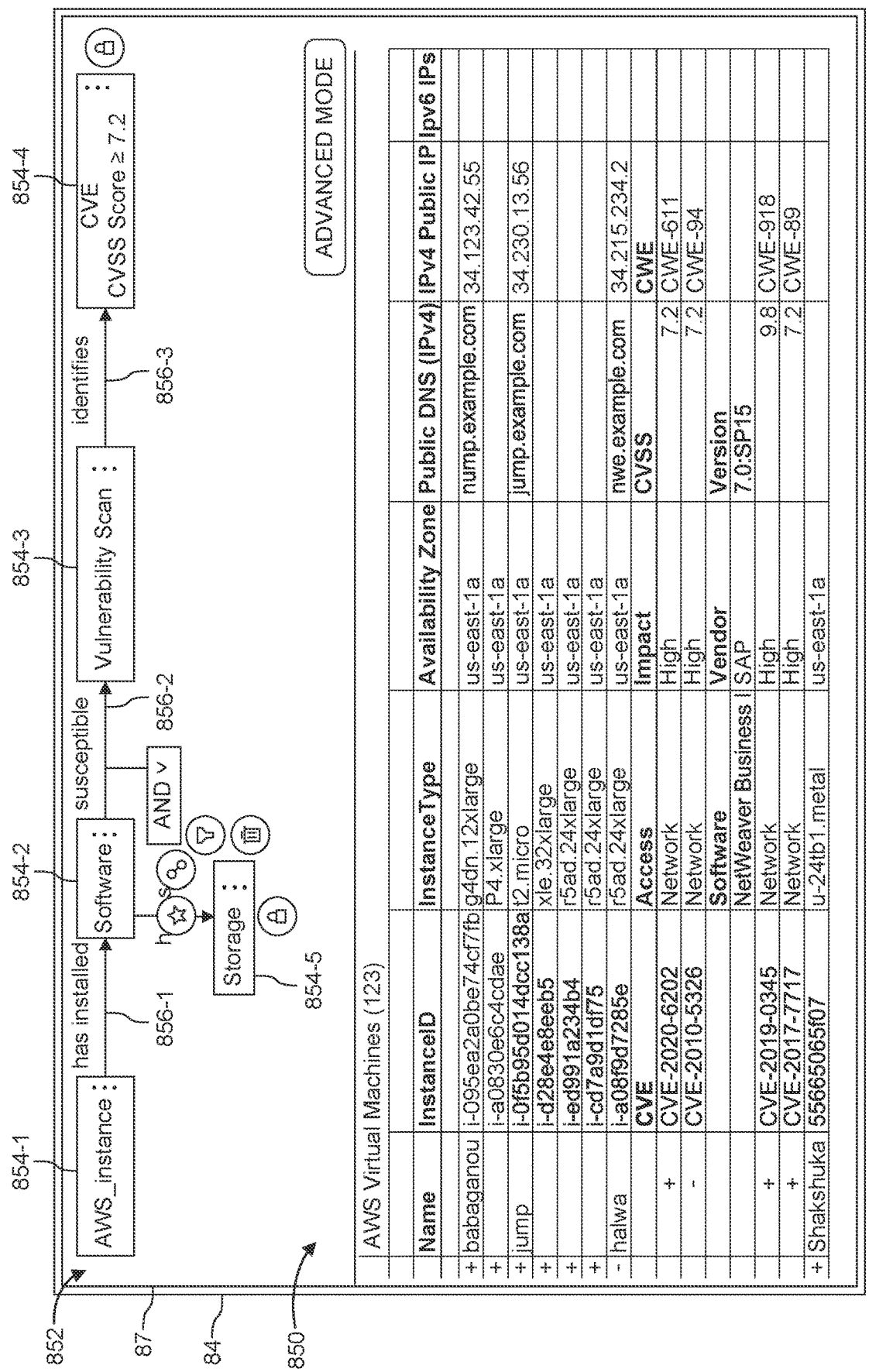
FIG. 19 is an illustration of an exemplary query builder screen of the GUI.

FIG. 19 is an illustration of an exemplary query builder screen 850 of the GUI 87 rendered on the display 84 of the user device 80, how the presently disclosed system 100 includes a query builder that generates graph-based queries based on input from a user via an input mechanism 66 of the user device 80, transmits the graph-based queries for execution against the entity relationship graph 162, and displays results of the graph-based queries.

The query builder screen 850 comprises a query pane 852. In general, the query builder (implemented via the query builder screen 850) generates the graph-based queries based on the input from the user by displaying within a query pane 852 graphical elements 854, 856 representing entity types and relationships in particular arrangements and generating the graph-based queries based on the particular arrangements of the graphical elements displayed in the query pane 852. In one example, the query builder generates the graph-based queries based on the particular arrangements of the graphical elements 854, 856 by translating the arrangements of the graphical elements 854, 856 into a textual query in a graph query language used by the graph database 140 and transmitting the textual query for execution against the entity relationship graph 162.

The query builder displays the graphical elements 854, 856 in the particular arrangements by, based on the input from the user, adding and removing graphical elements 854, 856 to and from the query pane 852, assigning particular entity types and relationships to the graphical elements 854, 856 displayed in the query pane, assigning particular properties to particular entity types represented by the graphical elements 854, 856 displayed in the query pane, setting or changing relative spatial positions of the graphical elements 854, 856 displayed in the query pane with respect to each other, and/or setting or changing connections between pairs of graphical elements 854, 856 displayed as adjacent to each other in the query pane.

In order to generate the graph-based query, the query builder screen 850 interprets the user-specified arrangements of the graphical elements 854, 856 within the query pane 852 in a number of ways. For example, the query builder screen 850 interprets selection by the user of which entity types and relationships are represented by the graphical elements 854, 856 displayed in the query pane 852 as indicating entity types and relationships to be targeted in the graph-based query. In another example, the query builder screen 850 interprets selection by the user of particular properties assigned to the particular entity types represented by the graphical elements 854, 856 displayed in the query pane 852 as indicating that information for entities having the selected properties in the entity relationship graph 162 is to be retrieved via the graph-based query. In yet another example, the query builder interprets selection by the user of spatial positions and connections between pairs of graphical elements 854, 856 displayed in the query pane 852 as indicating logical connections between the entity types and relationships represented by the connected graphical elements 854, 856 to be targeted in the graph-based query.

More specifically, the query builder screen 850 implements the drag-and-drop user interface metaphor for building the queries. To that end, the query builder screen 852, via the input mechanisms 66 of the user device 80, detects gestures input by the user. The gestures indicate selection of entity types and, for example, dragging of the graphical elements 854, 856 representing the selected entity types into the query pane 852.

Additionally, the query builder screen 850 displays the graphical elements 854, 856 in the query pane 852 with visual characteristics indicating whether the graphical elements 854, 856 represent entity types or relationships. Similar to the graph display screen 800, the entity type elements 854, which are graphical elements representing entity types, are displayed as shapes (in this case rectangles) connected to each other by relationship elements 856, which are graphical elements representing relationships and which are displayed as line segments with one end contacting a point on a perimeter of one entity type element 854 and the other end contacting a point on the perimeter of another node element 854.

In one example, the query builder screen 850 displays the graphical elements 854, 856 in the query pane 852 with textual information identifying the entity types and relationships represented by the graphical elements 854, 856 and properties assigned to the entity types and relationships represented by the graphical elements 854, 856.

In another example, the query builder screen 852 automatically determines and displays valid relationship paths between the selected entity type elements 854, receives input from the user indicating selection of which of the displayed valid relationship paths to be referenced in the graph-based query. Similarly, the query builder screen 852 also receives input from the user indicating selection of specific valid properties for each displayed entity type element 854 for selected entity types in order to further quantify or limit graph patterns targeted via the graph-based query.

Similarly, the query builder screen 850 limits selections by the user for the graph-based queries to valid combinations of entity types, relationships, and properties based on the previously described type definitions specifying particular properties and relationships for each entity type in the entity relationship information.

Graph State History

According to one embodiment of the invention, the graph server 248 records the state of the entity relationship graph 162 as it changes over time. As the event data is collected via the various means that have been previously described, and as modifications are made to the graph 162 the system keeps track of the changes and enables a user of the system to query the graph based on its state at a particular point in time in the past. This is extremely useful for certain IT and cybersecurity use cases such as cybersecurity incident response and cyber forensics use cases.

In one embodiment of the graph server 248, a history tracking graph is generated. A time element for node attributes is implemented by separating out the identity aspect of an entity 8 (which is immutable) from the state aspect of the entity 8, which includes all the mutable information about the entity 8 such as its attributes. An example of immutable data could be the unique id of the entity 8 in the system 100 or the entity type, while examples of mutable data that could change over time might be the patch version level of a particular software component or the amount of memory or disk space of a computer entity 8. The identity and state aspects are stored in the entity relationship graph 162 as two separate nodes with an edge between them. We will refer to the edge between the identity and state nodes as a "state edge". Each state edge will have an attribute named "From" for a start time when the edge became valid and an attribute named "To" for end time indicating end time when the state node was replace by a new state node with updated information. A From attribute set to 0 indicates that it is still the valid edge connecting the id node to the current state node. Each time mutable information on the state node is being updated, a new copy of the latest state node will be created and updated to reflect the changes. A new state edge is created from the identity node to the new state node whose From time is set to the current time and To time is set to zero. The To time on the previously active state edge is changed from 0 to the current time indicating when it was superseded by the new edge and state node.

Figure 20:
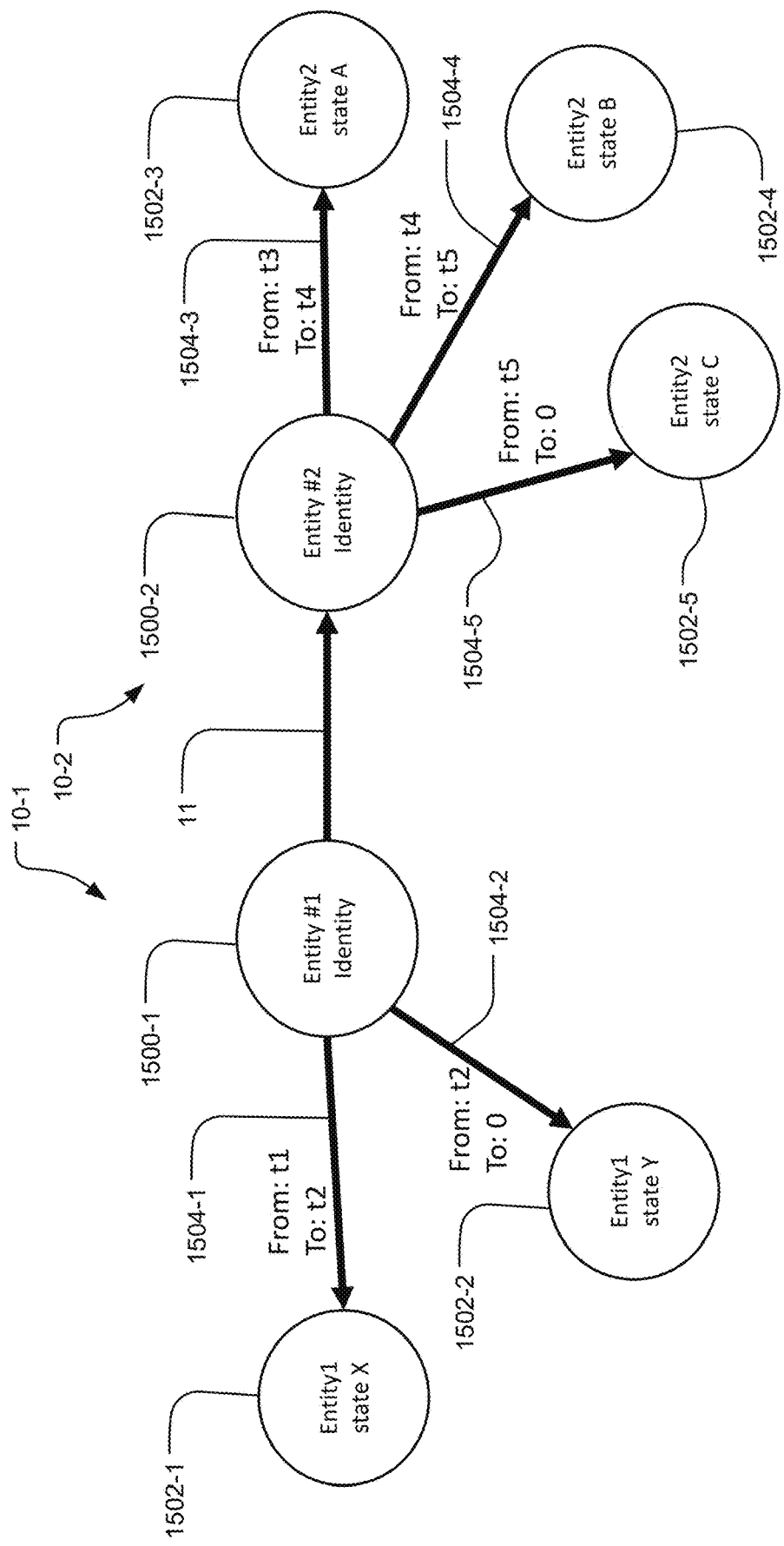
FIG. 20 is an illustration of an exemplary segment of the entity relationship graph according to an embodiment of the present invention.

FIG. 20 is an illustration of an exemplary segment of the entity relationship graph according to an embodiment of the present invention, showing how the entity relationship graph subsystem 126 represents each entity 8 in the entity relationship graph 126 as a plurality of nodes 1500, 1502, including an identity node 1500 representing an immutable identity for the entity 8, one or more state nodes 1502 representing mutable properties of the entity 8, and state edges 1504 connecting the identity node 1500 and each of the one or more state nodes 1502 associated with the identity node 1500. The state edges 1504 are each configured with start and end timestamp properties defining a period of time between the start and end timestamps during which the state node 1502 is considered to represent a valid property for the identity node 1500. The values assigned to the properties of the entities 8 in the entity relationship graph 162 are then updated by creating new state nodes 1502 with the updated values for the properties and new state edges 1504 between the identity nodes 1500 and the new state nodes 1502, assigning to each new state edge 1504 a start timestamp value indicating a creation time for the new state node 1502 and an end timestamp value indicating that the new state node 1502 is currently valid, and assigning to each state edge 1504 for the state nodes 1502 representing the previous values of the property being updated an updated end timestamp value indicating the creation time for the new state node.

More specifically, in the illustrated example, assuming the times t1-t6 are sequential, a scenario is depicted where at time t1 entity #1 (represented by the plurality of nodes 10-1) was discovered and added to the graph. At time t2, a change to some mutable attribute of entity #1 was discovered and recorded in the graph as node 1502-2. At time t3, entity #2 (represented by the plurality of nodes 10-2) was discovered and determined to have some relationship with entity #t1 (the exact nature of the relationship is not indicated in the figure nor material to this description). At time t4, a change to some mutable attribute of entity #2 was discovered and recorded in the graph as node 1502-4. At time t5, another change to some mutable attribute of entity #2 was discovered and recorded in the graph as node 1502-5.

When looking for the state of an entity 8 at the current moment the present system and method will filter out all state edges with a "To" time attribute set to anything other than 0 and all mutable data, such as entity attributes, will be collected from the related state node with the remaining edge with a To value of 0. If looking for information from a particular time in the past the present system and method filters all state edges 1504 except for edges having a "From" time that is before the target time and having a "To" time that is after the target time. If there is no state node edge having a "To" time that is after the target time, then it will use the state node with a "To" time of 0.

While this approach enables the user of the present system and method to have a view of the state of the graph at any instant in the past, it can also have limitations in terms of rapid growth in the size of the graph and, as a result, the performance and resource costs required to run it. This is because every time there is a change to an entity 8 it will cause a new node 1502 and edge 1504 to be added to the graph. In order to mitigate this issue, the present system and method deploys two techniques that can be used independently or in combination.

Figure 21:
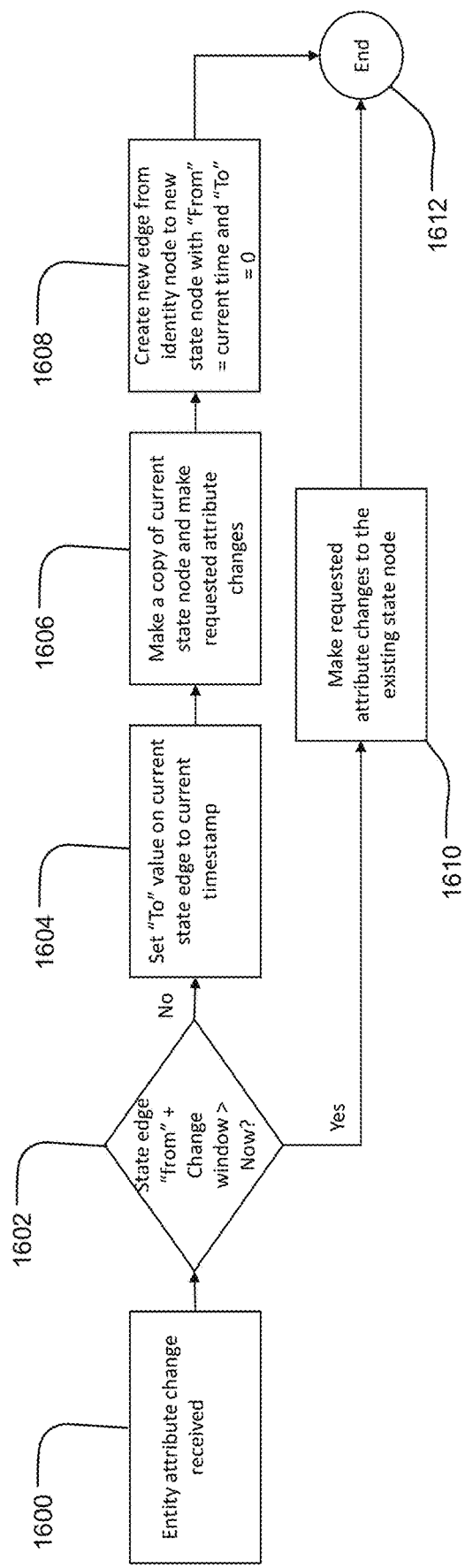
FIG. 21 is a flow diagram illustrating a growth mitigation process deployed according to one embodiment of the present invention.

FIG. 21 is a flow diagram illustrating an exemplary process by which the entity relationship graph subsystem 126 mitigates rapid growth of the entity relationship graph 162 according to an embodiment of the present invention. Generally, this technique involves batching multiple changes together onto a single state node in the graph. According to the preferred embodiment, this technique batches changes based on time interval. In step 1600, an entity attribute change is received (e.g., in the form of new event data indicating relevant changes to the entity relationship graph 162). A "change window" is also specified. Each time a change is made to an entity the graph server 248 will examine the time since a new state node was created for that entity 8 in step 1602. If that time is less than the change window, then it simply updates the existing state node in step 1610. If that time is greater than the change window, then a new state node is first created, similar to the process described above. Specifically, in step 1604 the graph server 248 sets the "To" value on the current state edge to indicate the current time and in step 1606 makes a copy of the current state node before making the requested attribute changes. In 1608, the graph server 248 creates a new edge from the identity node to the new state node with a "From" value equal to the current time and a "To" value equal to zero. Finally, the process ends in step 1612.

In general, by increasing the change window, the user reduces the rate at which the graph will grow. This comes at the cost of losing granularity in terms of being able to determine when a specific change was made or the sequence of changes within the same change window.

Another technique involves taking periodic snapshots of the graph 162, storing the snapshots to persistent storage, and then pruning old state nodes and edges out of the current copy of the graph.

Figure 22:
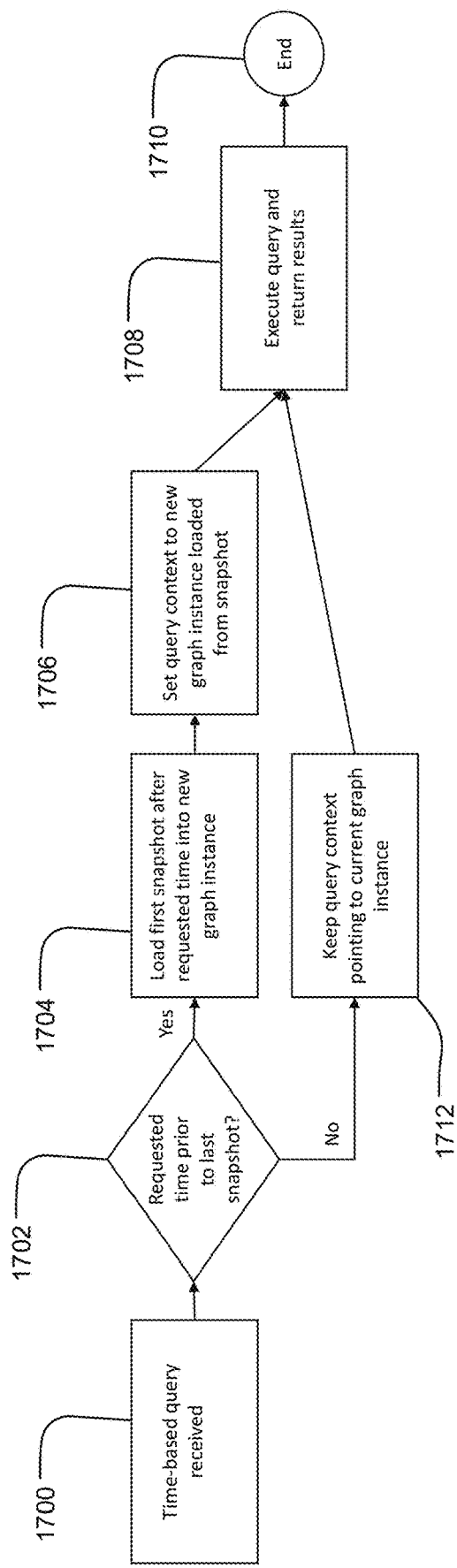
FIG. 22 is a flow diagram illustrating a growth mitigation process deployed according to another embodiment of the present invention.

FIG. 22 is a flow diagram illustrating an exemplary process by which the entity relationship graph subsystem 126 mitigates rapid growth of the entity relationship graph 162 according to another embodiment of the present invention, showing how the graph server 248 periodically generates a snapshot of a current version of an existing entity relationship graph 162 before modifying the current version by removing edges considered to be expired based on validity durations for the edges and a configurable expiration time and recording the snapshot in a graph state history for the entity relationship graph 162. In step 1700, the graph server 248 receives a time-based query, and, in step 1702, the graph server 248 determines whether the requested time for the query is before the last saved snapshot of the entity relationship graph 162. If so, in step 1704, the graph server 248 loads the first snapshot after the time requested for the query into a new instance of the graph 162 in step 1704 and then sets the query context to the new graph instance that was loaded from the snapshot 1706. On the other hand, if the requested time was not prior to the last snapshot, in step 1712, the graph server 248 keeps the query context pointing to the current graph instance. Either way, in step 1708, the query is executed and the results returned, and the process ends in step 1710.

In the preferred embodiment of this technique a "snapshot frequency" and a "retention window" are specified. On an interval specified by the snapshot frequency the system will automatically take a snapshot of the current graph and store it off to persistent storage. The system and method will then delete all state edges and associated state nodes where the state edge "To" time is prior to the current time minus retention window. If a user of the system is interested in information related to the state of the graph prior to the last snapshot then the system must read in the first snapshot after the desired time, re-establish it in an active system and run the query against it.

Figure 23:
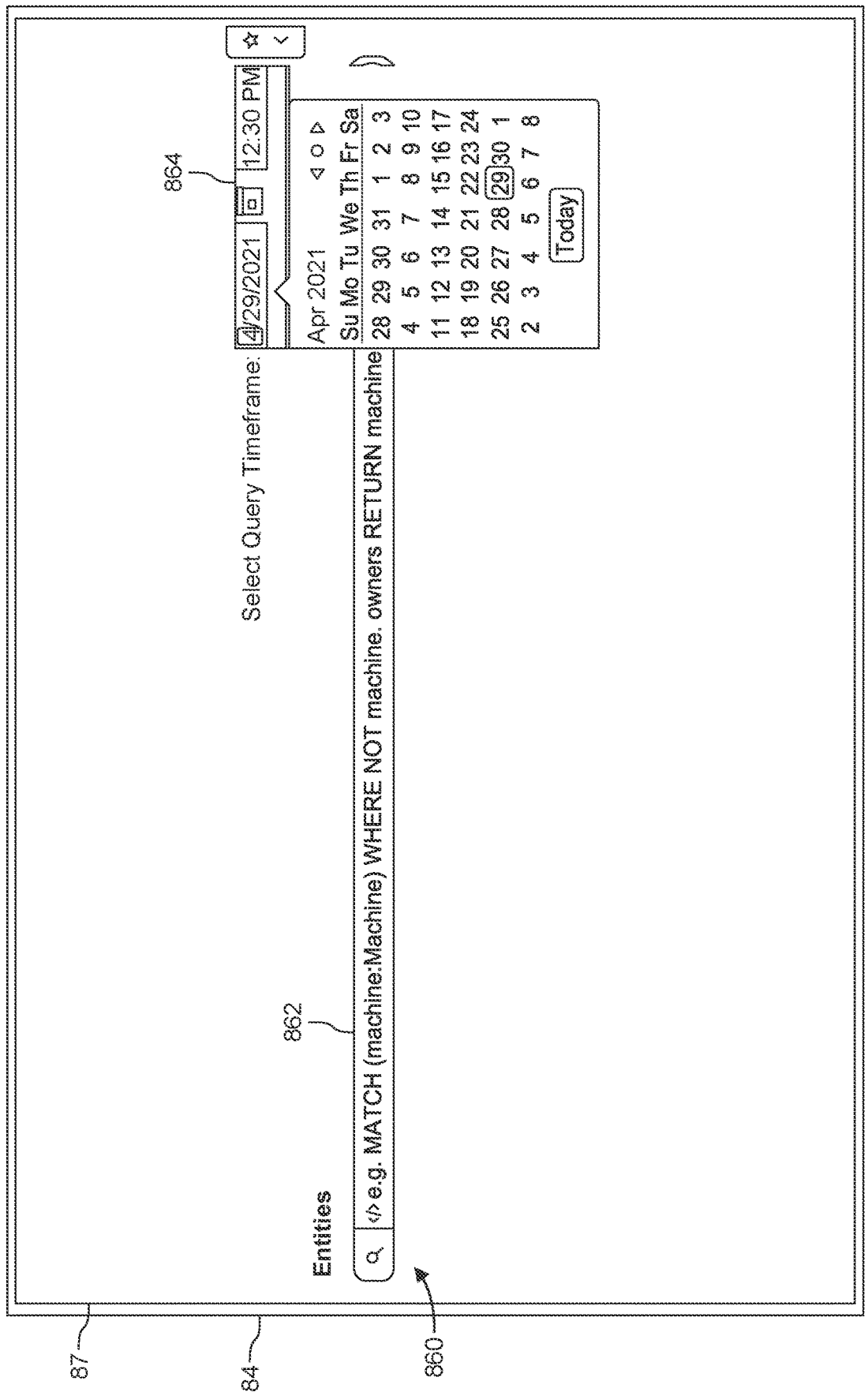
FIG. 23 is an illustration of an exemplary query submission screen of the GUI.

FIG. 23 is an illustration of an exemplary query submission screen 860 of the GUI 87 rendered on the display 84 of the user device 80, according to an embodiment of the present invention, showing how the GUI 87 via the query submission screen 860 receives input from the user via the input mechanism 66 of the user device 80 indicating time values associated with queries. In the illustrated example, the query submission screen 860 comprises a query input field 862, and a date selector 864. The query submission screen 860 receives the input from the user indicating a selection of a textual query to execute via the query input field 862 and receives input from the user indicating a selection of a time value (e.g., the desired point in time that is the subject of the query) via the date selector 864. When the textual query is submitted for execution against the entity relationship graph 162, the graph server 248 (for example) modifies the submitted query based on the time value associated with the query such that results of the modified query includes only state nodes with start timestamp values indicating start times before the specified times for the queries and end timestamp values either of zero or indicating end times after the specified times for the queries.

For the purposes of simplifying descriptions and figures in the rest of this disclosure, the identity node and all related state nodes will be discussed and shown as if they were a single node in the graph.

Mapping Dependencies of a Business Application or Other Entity

In modern software application architectures, there is often a complex web of interdependencies between software components. Due to scale, complexity, the rate of change, and the transition of individual developers on and off of projects, it is often difficult for organizations to maintain an accurate understanding of these interdependencies. One significant side effect can be that changes and updates to a given component can have unexpected impact to other components, systems and applications causing failures and significant impact to a business. It is imperative to devise an effective way to automatically determine and monitor the dependencies between the various components entities 8 which constitute, or support, a given computer environment 5 such as a business application.

Figure 24:
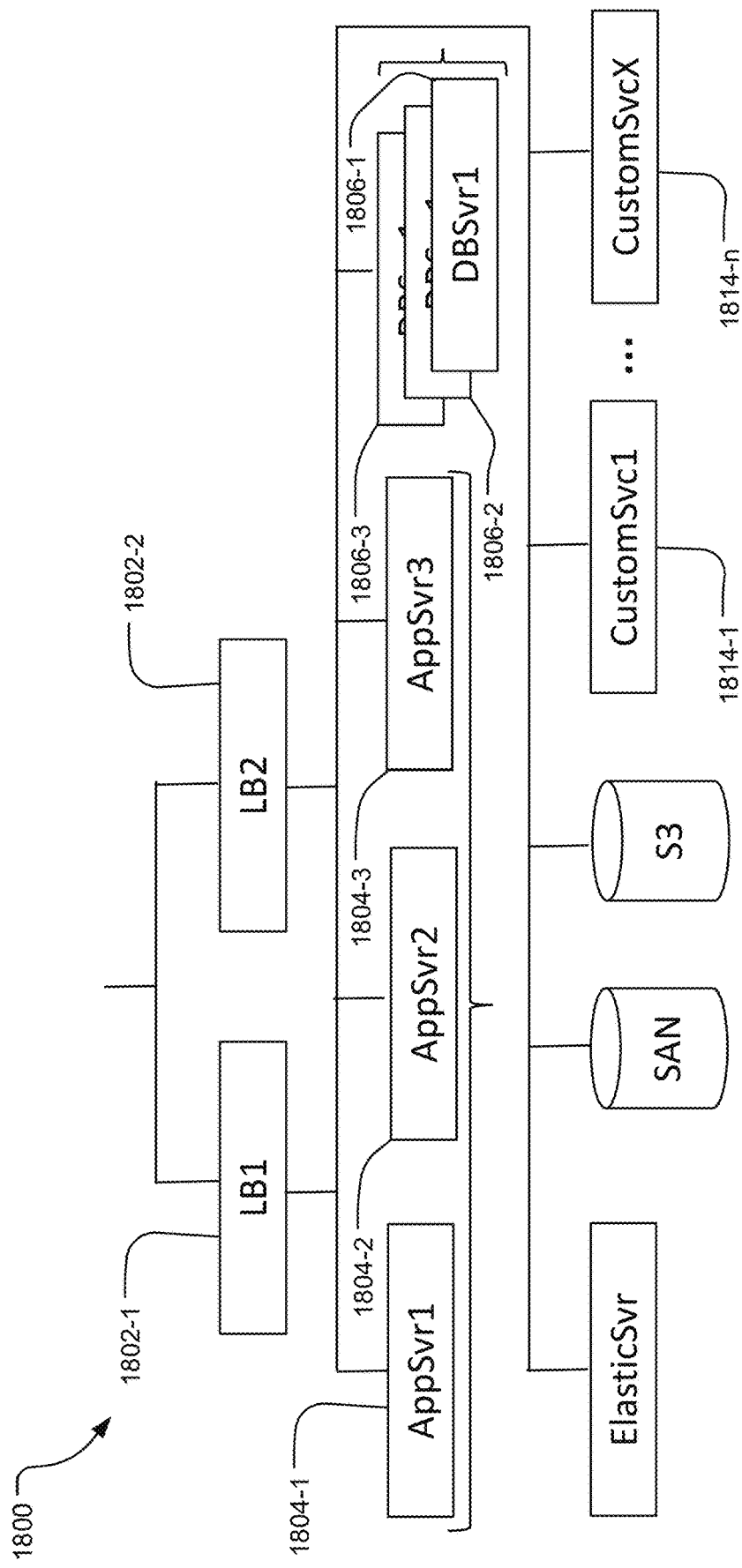
FIG. 24 is a schematic diagram depicting a computing architecture to which the present invention is applicable.

To further illustrate this point, consider a common modern architecture of an exemplary E-Commerce web application as generalized in FIG. 24.

An application 1800 such as the one depicted in the illustrated example generally comprises multiple logical components such as the web application server 1804, the database server 1806, firewall or other security components, a load balancer 1802, a search index component, and many different "microservices" 1814 fulfilling various functional capabilities. Each of these logical components, in turn, comprises one or more instances of the software for fulfilling its purpose. This allows for automatic elastic scalability and fault tolerance. When load increases and certain logical components become overloaded, or if instances of the software supporting that component fail for some reason, the system can automatically instantiate more instances of the software supporting that logical component. When load subsides, the system can automatically turn off unneeded instances to release resource utilization and save cost. This can happen rapidly and frequently making it hard for an application operator or a security professional to keep track of which, and how many, instances of each software program are active at any point in time. This can also be extended to consider underlying physical hardware supporting the software instances. Each of the software instances and hardware components can have dependencies on many other logical components, whose software instances and underlying hardware have further dependencies, and so on.

In the context of this discussion, it will be understood that if one software program requires information provided by another software program in order to perform its function then the first program has a dependency on the second program. Similarly, if a software program is running on a virtual or physical computer then the software program has a dependency on the virtual or physical computer.

In the present system and method dependency relationships between entities 8 are modeled as edges 11 in the entity relationship graph 162 by the graph server 248. Many of these relationships will be naturally discovered and modeled through the mechanisms already discussed. For example, a particular instance of software is running on a specific computer. However, one form of dependency is recognized by network connections and data flows between running software programs. We will refer to these types of dependencies as "dataflow dependencies". By tapping into systems which are monitoring network connections or data flows over the computer network these can be detected and then represented as relationships between the entities 8 involved. This monitoring can be accomplished in many ways and at many levels, including monitoring application logfiles for entries indicating a network connection or tapping into network devices and analyzing network flows. The present system and method do not specify or limit the mechanism for detecting a connection or data flow between entities and can be adjusted to work with any mechanism.

Dataflow dependencies are unique in that they tend to be very transient, repetitive and frequent. This is as opposed to other relationships such as that of a software program running on a virtual or physical computer, or the relationship of a particular vulnerability to a particular software program. While a software program may start and eventually terminate, the entire time it is active it will typically run on the same computer. Whereas an entity 8 such as a "consuming" software program may establish a connection, request and/or post information and then disconnect from another entity 8 such as a "providing" software program hundreds or even thousands of times per second. Conversely this may happen only once per week or month for a very limited period of time. Similarly, the occurrence of a user logging into a system or software component is typically transient and repetitive. In the computer security domain, situations like this are often referred to as "events". A connection between two software programs on a particular destination TCP/IP port would be considered a "connection event". A user logging into an application would be considered a "login event". These events represent dependencies and can be tracked in the graph 162 as well.

Given the frequency and transient nature of this type of dependency it may not be practical or helpful to represent each interaction or event as a unique relationship, or edge 11, between the corresponding nodes 10 in the graph 162. This could overwhelm the graph 162. However, it is useful to be able to distinguish the frequency and timing of connections over time. For example, it is only partially interesting to know that one software program connected to another software program at least once in the history of time. It may be far more interesting to know if such a connection has happened in the last day or week and, if so, how many times. This is particularly true for understanding dependencies that change over time. To that point, it might be appropriate to consider that certain types of events, such as a network connection and data flow between two software programs, should indicate a dependency between the software programs only if it has occurred within a certain period of time. In other words, some event-based dependencies should fade or timeout if not repeated within a certain period of time. That period of time may vary based on the nature of the software programs involved, the network protocol used, or some other attribute of the interaction.

To accommodate the creation of accurate dependency graphs, including dependencies related to events and dataflows, the integration subsystem 168 represents these event-based dependencies in the entity relationship graph 162 as edges of a special type or label (for example an edge of type "ConnectsTo", "DependsOn", or "LoggedInto"). These edges will be referred to as "event-based edges". Event-based edges will have an attribute indicating when the dependency edge was created (Start attribute) and when it is valid until (End attribute). The validity duration of these edges can vary based on the characteristics of the event. For example, dependency edges related to a user login may be valid for a day while a dependency edge related to a network connection on a particular port may be valid for a month. As these events are detected a specialized entity data collection integration managed by the integration subsystem 168 passes information about the events to the graph access service 246, which updates the graph 162 by adding an event-based edge to reflect the dependency implied by the event. The logic determining the duration of the event-based dependency edges can be implemented by the entity data collection integration or by rule logic implemented in the graph access service 246 or rules engine 120. For network connection driven events an edge will be created for each unique source IP address, destination IP address and destination port combination.

Figure 25:
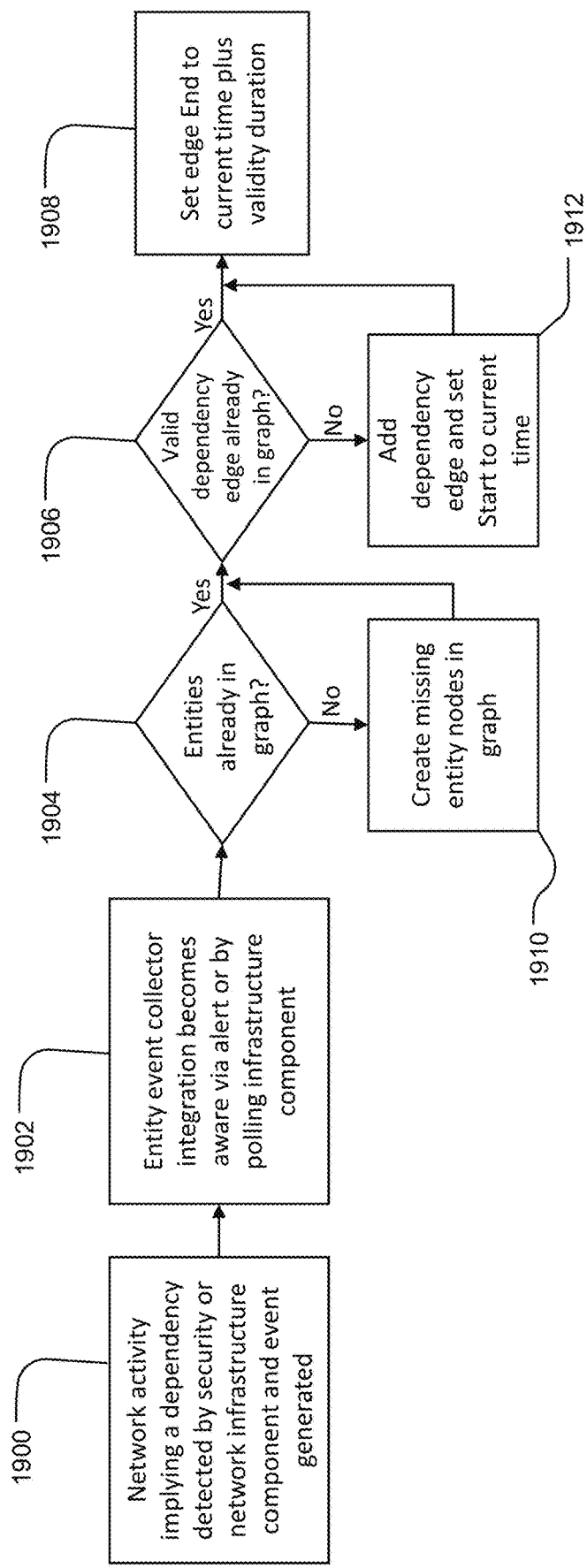
FIG. 25 is a flow diagram illustrating an exemplary process for creating or updating event-trigged dependencies in an entity relationship graph.

FIG. 25 is a flow diagram illustrating an exemplary process executed by the graph access service 246 and/or the rules engine 120 for creating or updating event-trigged dependencies in the entity relationship graph 162, according to an embodiment of the present invention. In step 1900, security or network infrastructure within the computer environment 5 detect network activity that implies a dependency between entities 8 in the computer environment 5. In step 1902, the entity event collector 110 discovers the event data via the polling or alert infrastructure that has been previously described. Then, in step 1904, it is determined whether the entities 8 pertaining to the event data are already in the graph 162. If not, in step 1910, nodes 10 representing the missing entities 8 are created and added to the graph. Each time an event is identified indicating a particular dependency if either entity does not already exist in the graph the graph access service 246 creates a new node 10 representing that entity 8. If a currently valid dependency edge does not already exist between the corresponding entity nodes in step 1906, then a dependency edge is also created, the start time is set to the current time, and the validity end time is set to the current time plus the validity duration for that type of event in step 1912. In step 1906, if a valid dependency edge already exists between the corresponding nodes, then its validity end time is updated to the current time plus the validity duration in step 1908.

FIG. 26 is an illustration of an exemplary portion of the entity relationship graph 162 according to an embodiment of the present invention, demonstrating changes to the entity relationship graph 162 as events are captured and the corresponding dependencies are recorded in the graph over time. In the illustrated sequence, a user, UserA, logs into software program Prog1 at time T1, followed by Prog1 making a network connection to Prog2 on port 1433/tcp at time T2, followed by Prog1 making a second subsequent network connection to Prog2 on the same TCP/IP port at time T3.

As with the concept of using identity and state nodes 1500, 1502 for tracking entity changes over time as discussed above, event-based edges could accumulate without bounds and impact performance and the cost of operating the system. Like in that situation, the present system and method teach a technique for deleting expired event-based edges in conjunction with periodic snapshots of the graph. An "edge retention" period is defined. After each snapshots all event-based edges which have an end time which is before the current time minus the edge retention period are deleted from the graph.

FIG. 27 is an illustration of an exemplary type definition screen of the GUI 87 rendered on the display 84 of the user device 80 showing an exemplary type definition for an entity type according to one embodiment of the present invention. The type definition is similar to that described with respect to FIG. 8. Now, however, certain properties of the type definition are depicted in more detail. In particular, a property having a label of "x-samos-dependency" has a value of "true," indicating the definition of a relationship to be considered a dependency relationship. Additionally, a property having a label of "x-samos-dependency-duration" has an assigned value of "10 days," indicating that the validity duration (e.g., to be used to determine the end time attribute for nodes 10 of this entity type) is set to 10 days, after which the dependency will expire or no longer be considered valid.

With the graph constructed as described, a user of the system can issue specialized graph queries which will return segments of the graph representing a tree of dependencies from a given starting entity. To do so the system will need to be configured to, or the user will have to, specify which edge types to be considered to represent dependencies. In the preferred embodiment the indication of whether a relationship type constitutes a dependency is specified as part of the schema discussed above. The graph segment returned will start from the specified starting entity and include all edges and nodes encountered by recursively traversing every edge of a type considered to represent dependencies. To generate a dependency tree for the current time the query will exclude any edges which have an End time which is in the past. To generate a dependency tree for a time in the past the system will first determine if that time is prior to the last snapshot. If so, the system will first need to load the first snapshot saved after the desired time. In either case the query is then issued such that it excludes all event-based edges except those whose Start attribute is before the desired time and End attribute is after the desired time.

Figure 28:
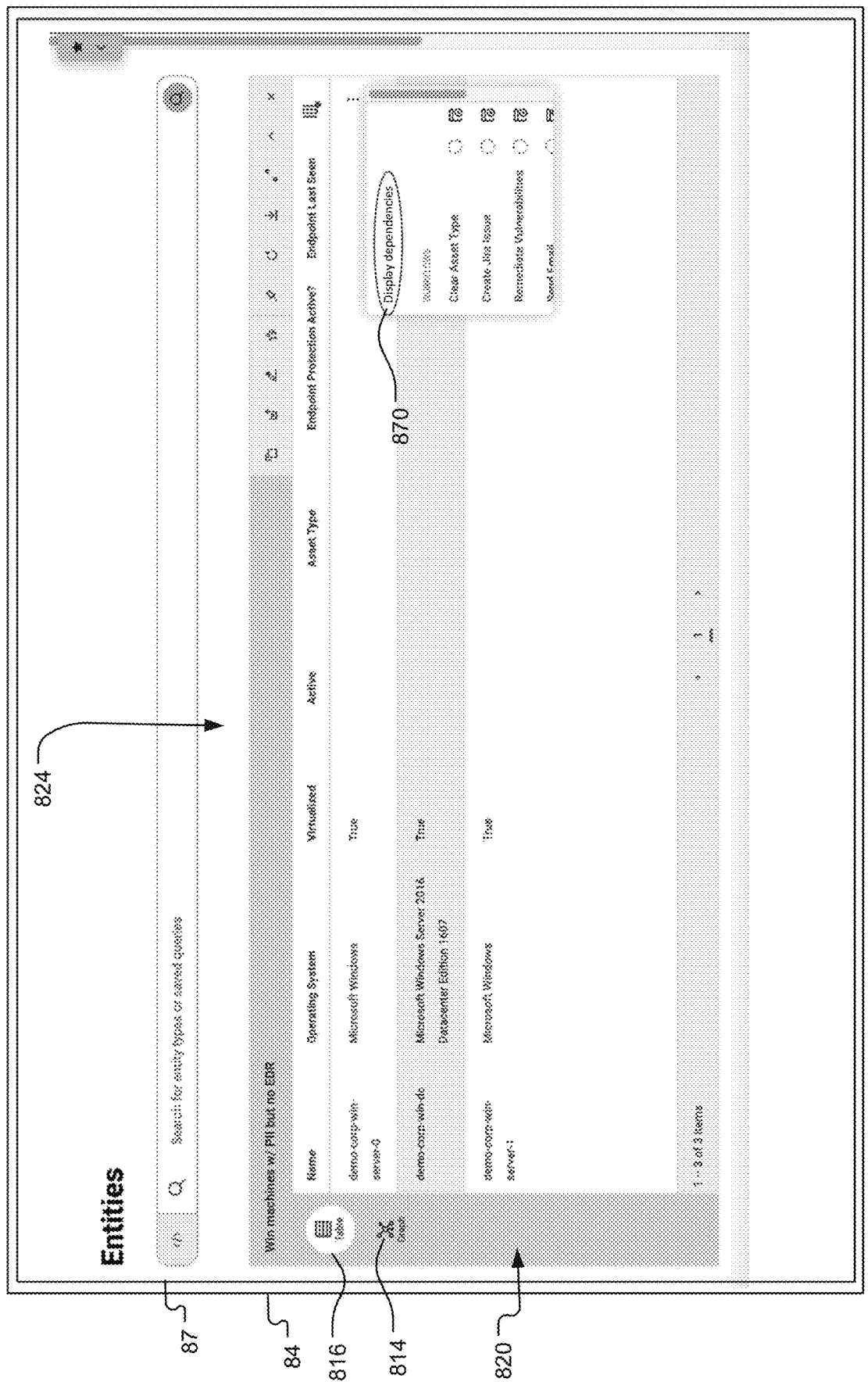
FIG. 28 is an illustration of the table display screen displayed on a user device showing how specialized graph queries are handled.

FIG. 28 is an illustration of the table display screen 820 previously described with respect to FIG. 12, showing how the presently disclosed system and method enables generating the specialized graph queries for managing the computer environment 5, specifically via a dependency graph generator 870. As before, the table display screen 820 comprises the table pane 824 with selectable graphical elements representing each line of a table, the table button 816, and the graph button 814. Selection of one of the entities 8 indicated in the table pane 824 enables selection of the dependency graph generator button 870, which, when selected, generates a dependency query targeting the inferred dependencies for the selected entity 8 indicated in the table pane 824, transmits the dependency query for execution against the entity relationship graph 162

Figure 29:
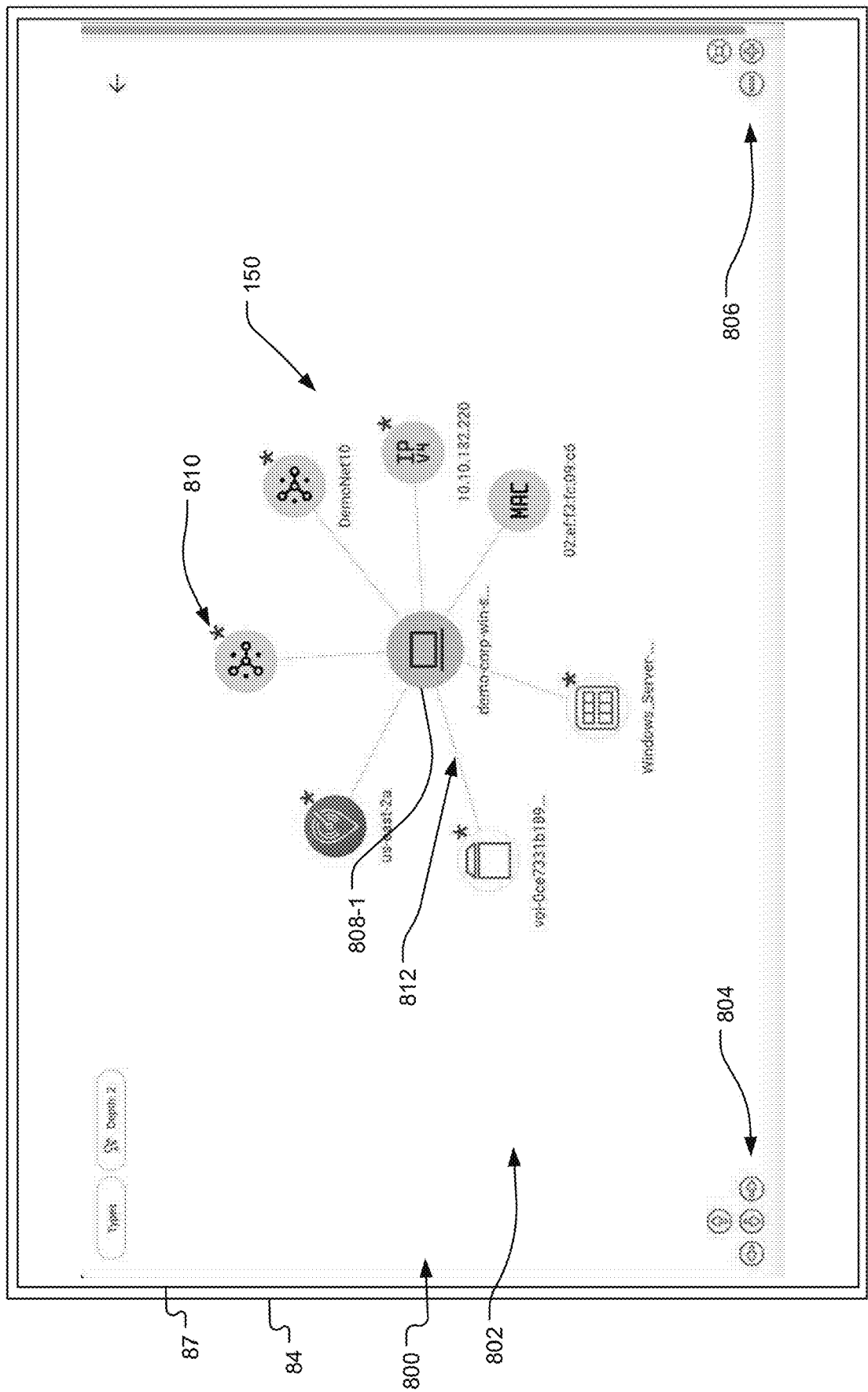
FIG. 29 is an illustration of the graph display screen displayed on a user device showing an example of how dependency query results are displayed.

FIG. 29 is an illustration of the graph display screen 800 previously described with respect to FIG. 9, showing how the GUI 87, via the dependency graph generator button 870, displays results of the dependency query described with respect to FIG. 28. In this example, the graph display screen 800 would be displayed in response to user selection of the dependency graph generator button 870 of the table display screen 820 depicted in FIG. 28.

As before, the graph display screen 800 comprises the directional buttons 804, the zoom buttons 806, and the graph display pane 802 displaying a graph segment 150.

Now, however, the graph segment 150 displayed in the graph display pane 802 is specifically one resulting from an executed dependency query. A primary node element 808 representing a selected entity 8 (e.g., selected for dependency graph generation via the dependency graph generator 870) is shown with a series of edge elements 812 representing the dependencies and a series of secondary node elements 810 representing the entities 8 with which the selected entity 8 has a dependency relationship. More specifically, in the illustrated example, the selected entity 8 is a computer "demo-corp-win-s," and the dependencies include its subnets, IP address, MAC address, AWS image, storage volume, and AWS availability zone.

Figure 30:
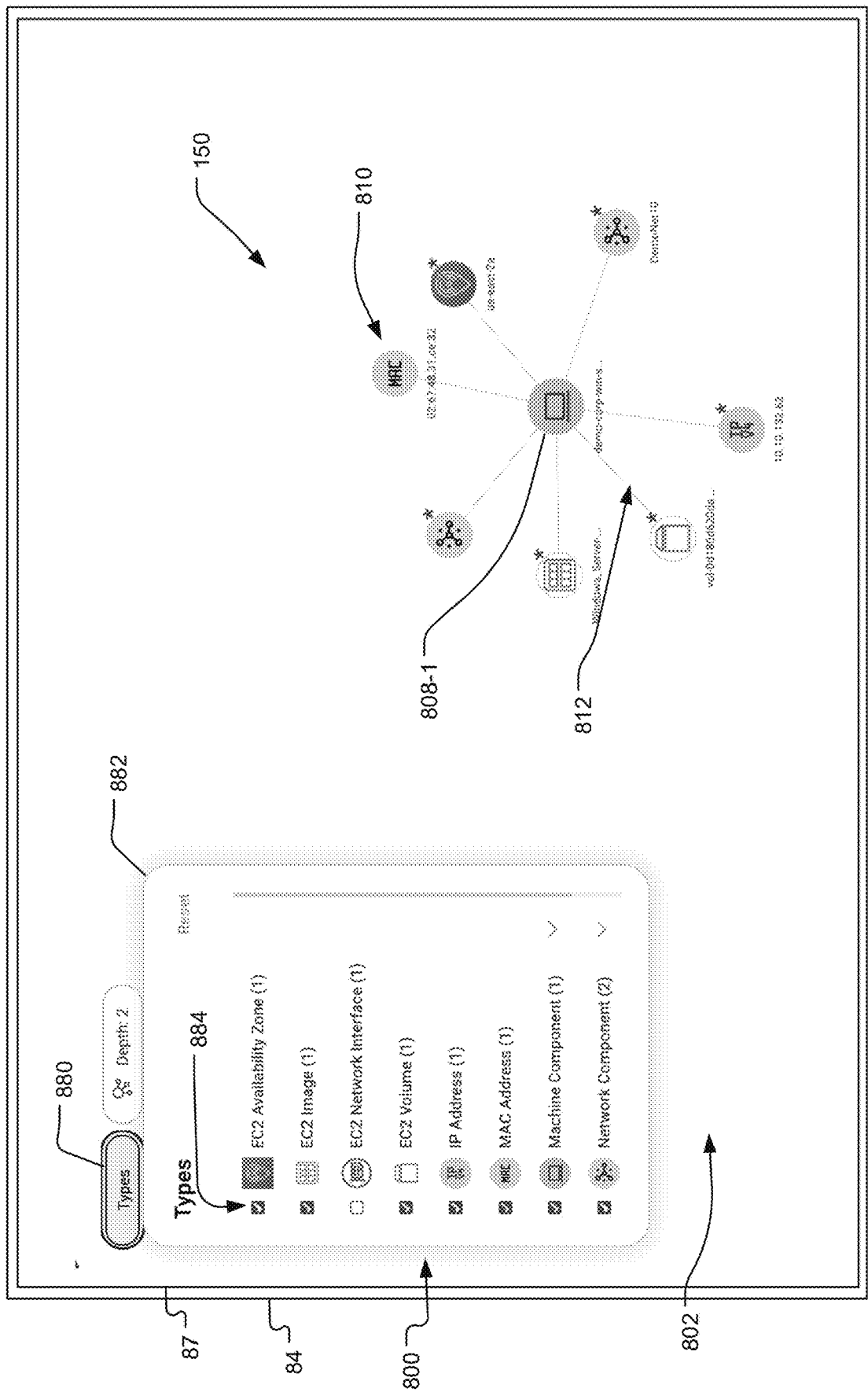
FIG. 30 is an illustration of the graph display screen displayed on a user device showing another example of how dependency query results are displayed.

FIG. 30 is an illustration of the graph display screen 800 previously described with respect to FIG. 29 showing how the graph display screen 800 displays results of the dependency query specifically based on requested dependency type information input by the user indicating which types of edges of the entity relationship graph 162 should be considered as representing dependencies for the purpose of the dependency query.

As before, the dependency query results are displayed as a graph segment 150 in the graph display pane 802.

Now, however, in response to user selection of a types button 860, a types selection menu 882 has been revealed. The types selection menu 882 comprises a series of type selectors 884, which are selectable graphical elements representing different edge and node types that can be toggled on and off (e.g., by clicking on the type selectors 884 when they are in an off state to toggle them on and clicking on the type selectors 884 when they are in an on state to toggle them off). In the illustrated example, the type selectors 884 are displayed as check boxes, all of which are toggled on, or checked, with the exception of one labeled "EC2 Network Interface. Textual information ("(1)") indicates that the query results for the dependency query would have included a node element 810 representing an entity 8 of the type "EC2 Network Interface," but such a node element 810 is not displayed, because the type selector 884 for that type is toggled off. In the same way, the type selectors 884 allow the user input the requested dependency type information indicating the selection of which types of edges should be considered as representing dependencies, resulting in the results only indicating the dependencies represented by edges of the types indicated by the requested dependency type information (e.g., the dependencies or edges having type selectors 884 that are toggled on in the type selection menu 882).

Figure 31:
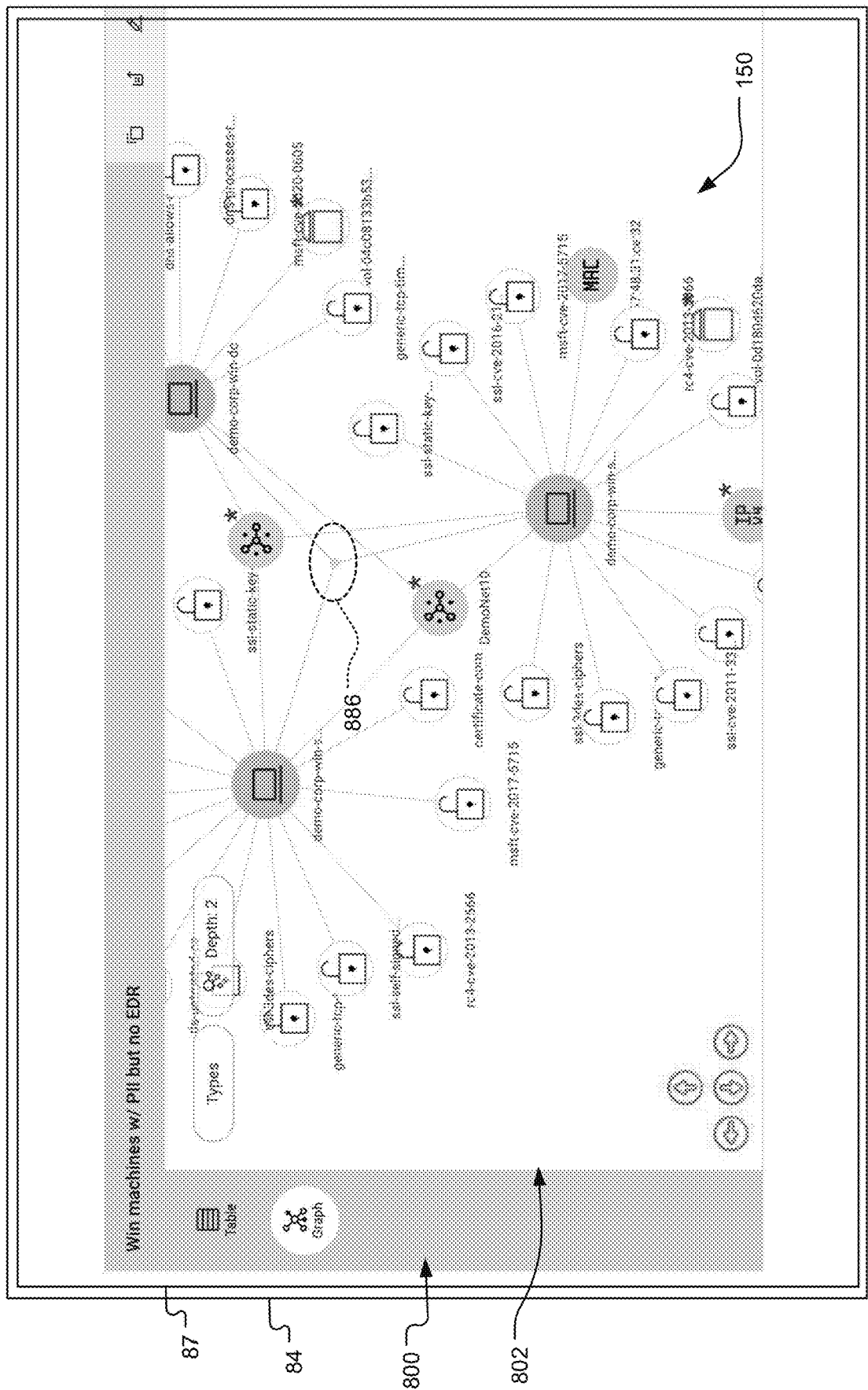
FIG. 31 is an illustration of the graph display screen displayed on a user device showing another example of how dependency query results are displayed.

FIG. 31 is an illustration of the graph display screen 800 previously described with respect to FIGS. 29 and 30 showing how the graph display screen 800 displays results of the dependency query specifically based on requested entity type information input by the user indicating which types of nodes 10 of the entity relationship graph 162 should be targeted for the purpose of the query.

As before, the dependency query results are displayed as a graph segment 150 in the graph display pane 802.

Now, however, among the graphical elements representing the nodes and edges is an indication of a hidden node 886. In the illustrated example, the hidden node 886 is indicated by the dashed-line oval defining a region where several graphical elements representing edges intersect suggestive of a node element that is missing or hidden. Here, the requested entity type information (e.g., input by the user via the type selectors 884 of the type selection menu 882, which is now hidden) indicates that the hidden node 886 did not have an entity type that was selected by the user as one of the types to target for the purpose of the query. As a result, the graph display pane 802, in displaying the results of the query, graphically depicts the dependency relationships between the selected entity and entities omitted from the results via the requested entity type information as edges traversing through a hidden node.

Figure 32:
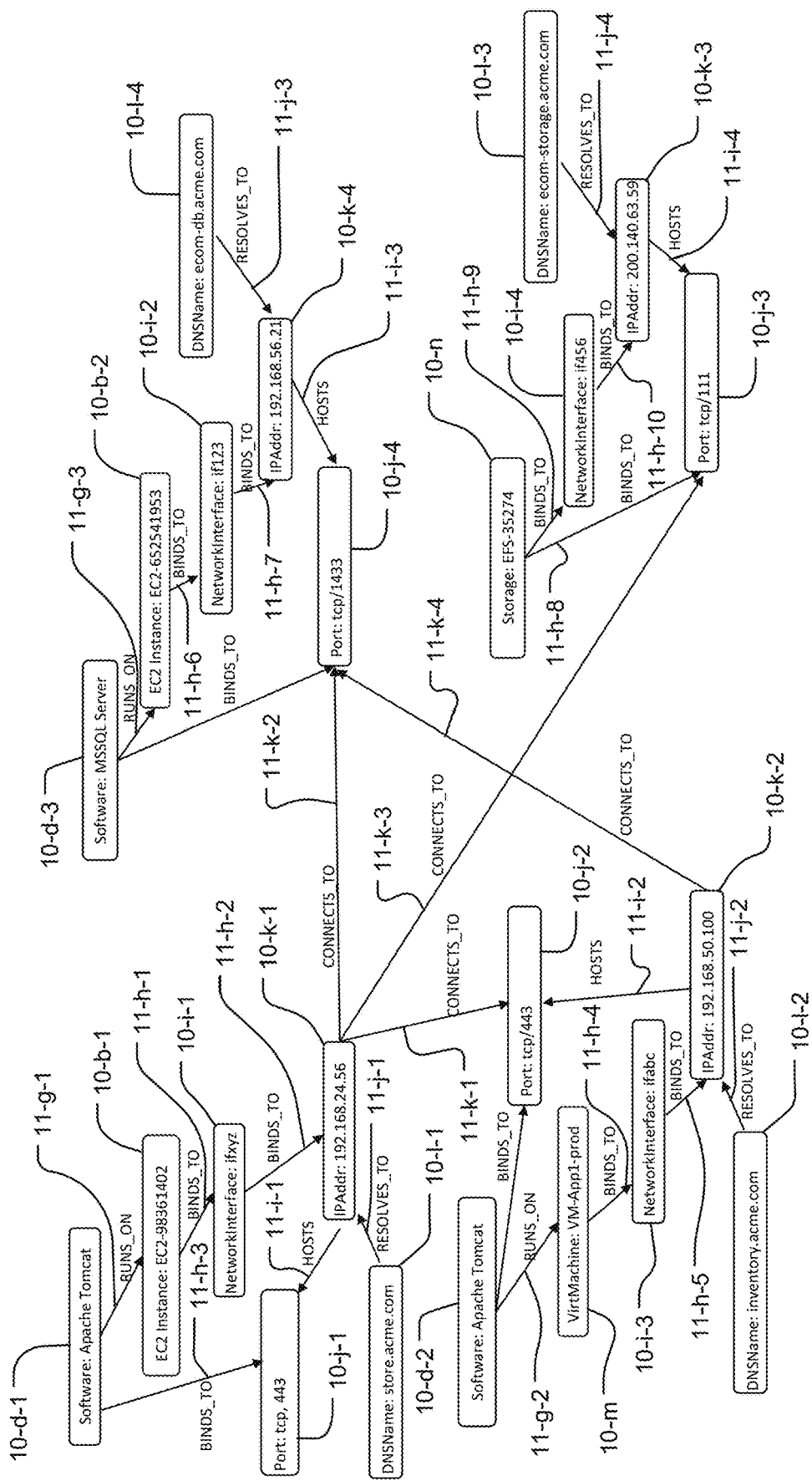
FIG. 32 is an illustration of an exemplary portion of the entity relationship graph according to an embodiment of the present invention.

FIG. 32 is an illustration of an exemplary portion of the entity relationship graph 162 according to an embodiment of the present invention, demonstrating a scenario in which the presently disclosed system enables a user to understand the dependency tree for an organization's eCommerce application, which is accessed at https://store.acme.com. In this scenario, a graph segment also exists in the graph server 248 related to the application that looks like the graph segment illustrated in FIG. 32, meaning the organization of nodes 10 and entities 11 as depicted in the illustrated example is both reflected in the graph segments displayed to the user via the user device 80 and reflected in how the organization is organized and/or stored by the entity relationship graph subsystem 126.

As in the previous graph segment example depicted in FIG. 2, different types of nodes 10 and edges 11 are depicted. Specifically, the nodes 10 include EC2_Instance nodes 10-*b*, Software nodes 10-*d*, network interface nodes 10-*i*, port nodes 10-*j*, IP address nodes 10-*k*, DNSName nodes 10-1, VirtMachine nodes 10-*m*, and Storage nodes 10-*n*. The edges include RUNS_ON edges 11-*g*, BINDS_TO edges 11-*h*, HOSTS edges 11-*i*, RESOLVES_TO edges 11-*j*, and CONNECTS_TO edges 11-*k*.

A dependency mapping function takes a starting point such as a specific entity 8 represented in the graph server 248 or an ingress point of a web application indicated by a user of the system 100. In the illustrated example, the ingress is represented as "store.acme.com:443." The dependency mapping function starts by issuing a query to the graph access service for the ingress of the eCommerce app which is the software component entity which is bound to TCP/IP port 443 on the IP address associated with the DNS name store.acme.com. Using the popular Cypher graph query language an appropriate query would be:

```
MATCH (sw:Software)-[:BINDS_TO]-(p:Port {portNmbr: '443'})-[:HOSTS]-
(:IPAddr)-[:RESOLVES_TO]-(dns:DNSName {fqdn: 'store.acme.com'}) Return id(sw) AS
rootID
```

Then, using the returned software component as the starting point, the dependency mapping function submits a query to the graph access service 246 to recursively traverse all edges 11 of a type considered to represent a dependency, for example, the RUNS_ON edges 11-*g*, BINDS_TO edges 11-*h*, HOSTS edges 11-*i*, and CONNECTS_TO edges 11-*k*:

```
MATCH (sw:Software)-[:BINDS_TO]-(p:Port {portNmbr: '443'})-[:HOSTS]-
(:IPAddr)-[:RESOLVES_TO]-(dns:DNSName {fqdn: 'store.acme.com'}) match path=(root)-
[:RUNS_ON|:BINDS_TO|:HOSTS|:CONNECTS_TO*1..20]-(1) where id(root) = id(sw)
return path
```

Figure 33:
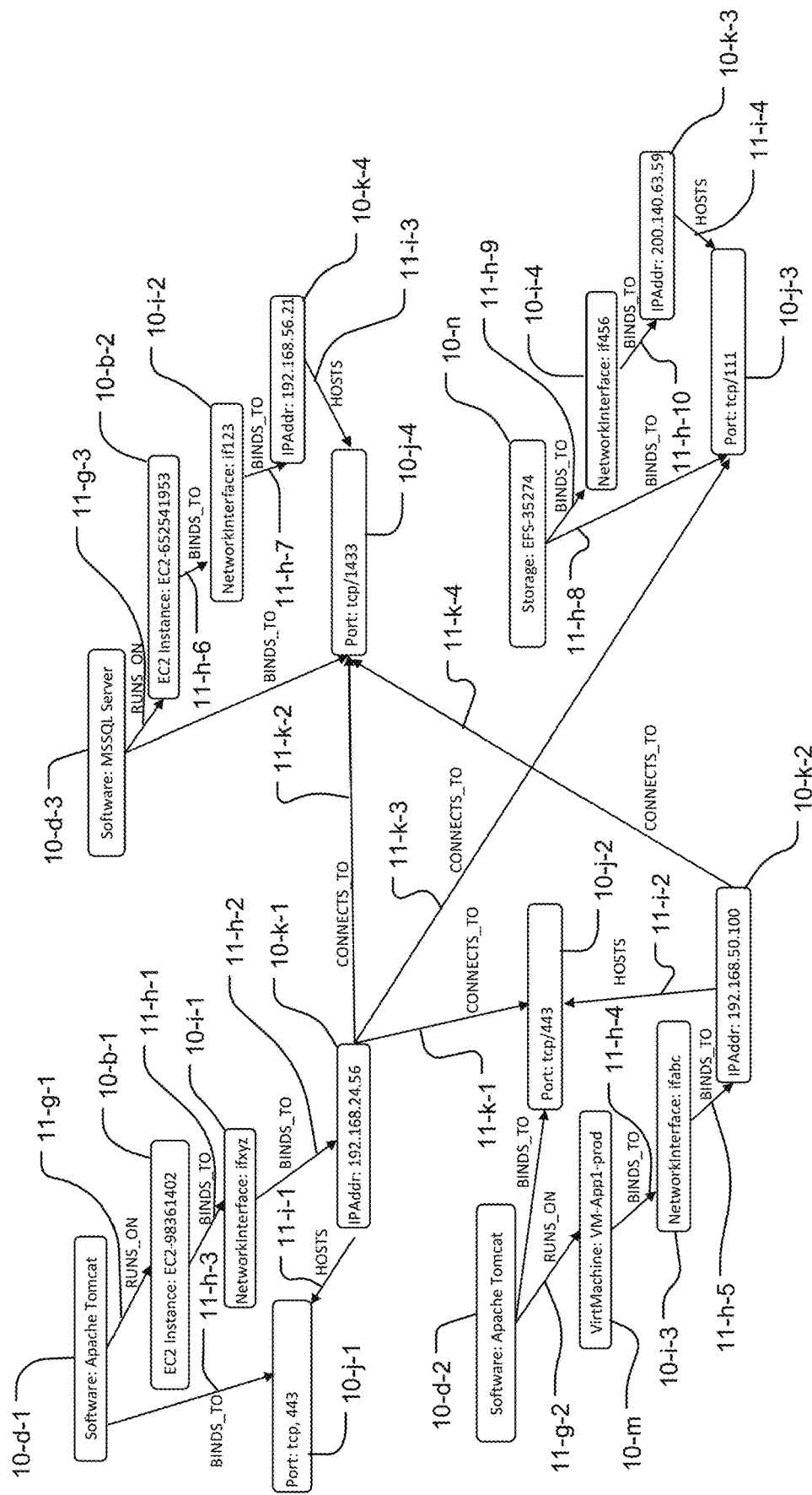
FIG. 33 is an illustration of an exemplary graph segment that would be returned in response to an exemplary query.

FIG. 33 is an illustration of an exemplary graph segment that would be returned in response to the above query.

Now, the RESOLVES_TO edges 11-*j* and DNSName nodes 10-1 are omitted from the query results, because they are not considered to represent hard dependencies.

The resulting graph segment may include a significant number of intermediate nodes which are not of interest to the user. For example, the user might be interested in entities of type Software, EC2_Instance, VirtMachine and Storage.

Figure 34:
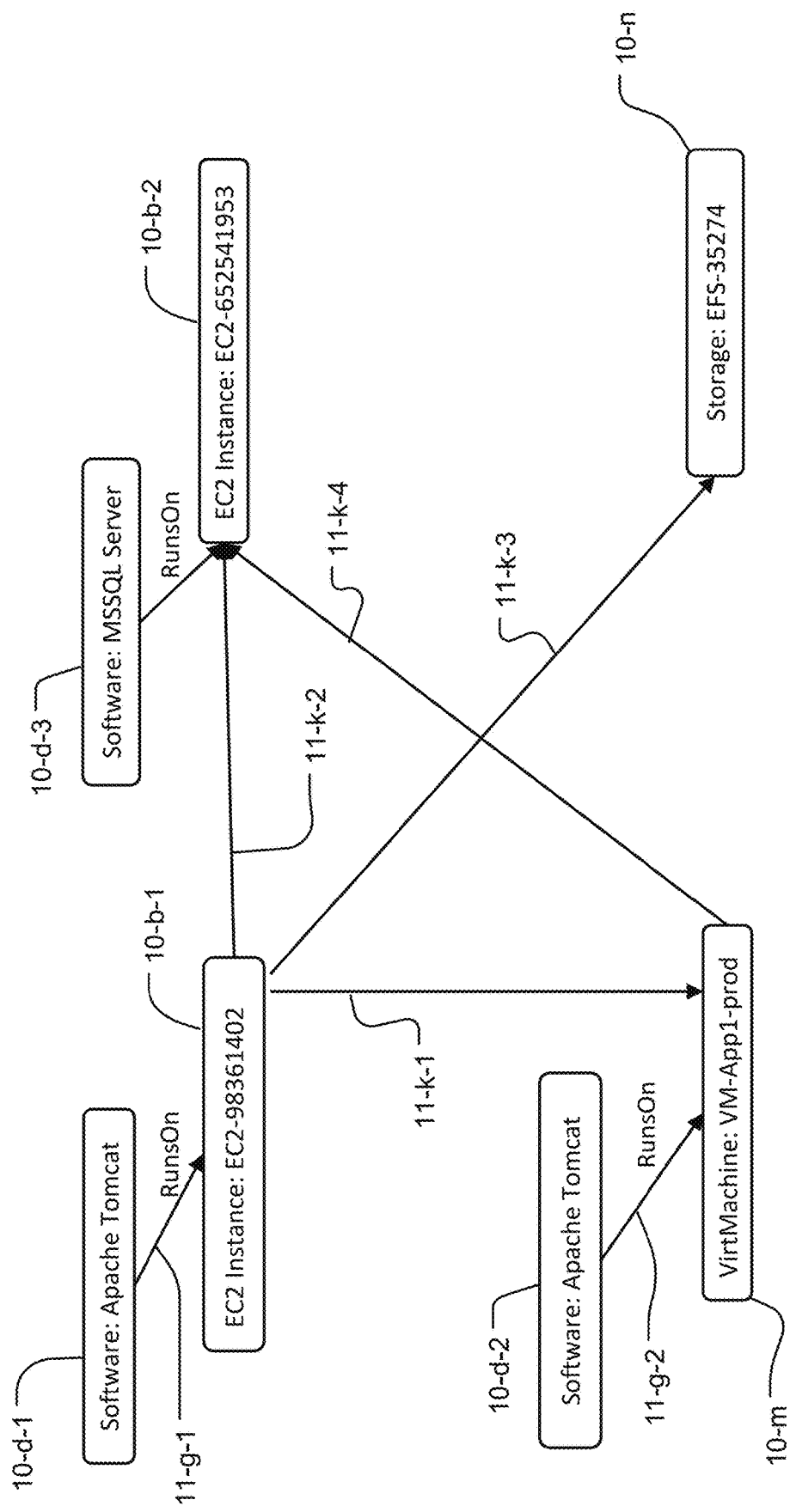
FIG. 34 is an illustration of an exemplary graph segment showing how results are filtered according to one embodiment of the invention.

FIG. 34 is an illustration of an exemplary graph segment that would be presented to the user via the GUI 87 upon filtering of the results by the browser user interface 138, including collapsing or hiding node types that are not of interest.

Now, only the Software nodes 10-*d*, EC2 Instance nodes 10-*b*, VirtMachine nodes 10-*m*, Storage nodes 10-*n*, RUNS_ON edges 11-*g*, and CONNECTS_TO edges 11-*k* would be displayed.

Other variations of graph queries to display dependency relationships are possible, including, but not limited to, the following:
  showing all entities on which a given entity depends;
  showing all entities of type SoftwareComponent, DatabaseServer or Computer on which a particular entity depends;
  showing all entities which somehow depend on a particular database server entity; and
  showing all apache application server instances that have a dependency on entities of type DatabaseServer which are tagged as containing personally identifiable information (PII).

Mapping of Entities into Logical Components of a Business Application

The presently disclosed system and method further provides automatic grouping of entities 8 into meaningful related collections. This categorization functionality enables users to work with and assess entities 8 as groups of like items, for example, entities 8 with a common function or purpose, or entities 8 with a common configuration. In many use cases, this grouping is far more efficient than dealing with entities 8 individually. In fact, in many cases the number of entities 8 will be so large that it would be infeasible for users to work with individual entities 8.

Returning to the example of typical modern web applications depicted in FIG. 24, generally speaking, each instance of software running in support of a given logical component will be expected to have the same configuration, comply with the same policy, be susceptible to the same vulnerabilities, to operate and interact with other entities in the same way, be managed in the same way, etc. As soon as a new entity 8 is discovered on the network it is important to quickly determine which, if any, of the logical components of an application it is supporting so that it can be determined what policy should be applied or what configuration should be in place or even if it is operating as expected for entities 8 of that logical component. That said, keeping track of which logical component a given entity 8 is supporting can not be feasibly done by relying on humans alone to classify entities 8.

The presently disclosed system and method include automated categorization of entities 8 into collections of like entities making up a common logical component of a business application. This categorization can be based on a combination of many things such as the network segment it is present on, the combination of software installed and operating on it, the TCP/IP ports it is listening on, the business or technical owner, the network connections it is participating in, and/or direct feedback from the business or technical owner, among other examples. These and other characteristics are processed in several ways to come to a categorization decision. Such processing might include, but is not limited to, a) rules configured by users of the system and managed and executed by the rules engine 120 responsive to the parameters discussed above, and b) machine learning models trained based on these parameters. In one embodiment, the machine learning engine 124 is implemented as an integration managed by the integrations subsystem 168 and driven by rules in the rules engine 120 and workflows managed by the workflow engine 122. Once a categorization is determined through one of these methods it is recorded, for example, as an attribute of, or as a tag attributed to, the corresponding entity as represented by the graph server 248.

Figure 35:
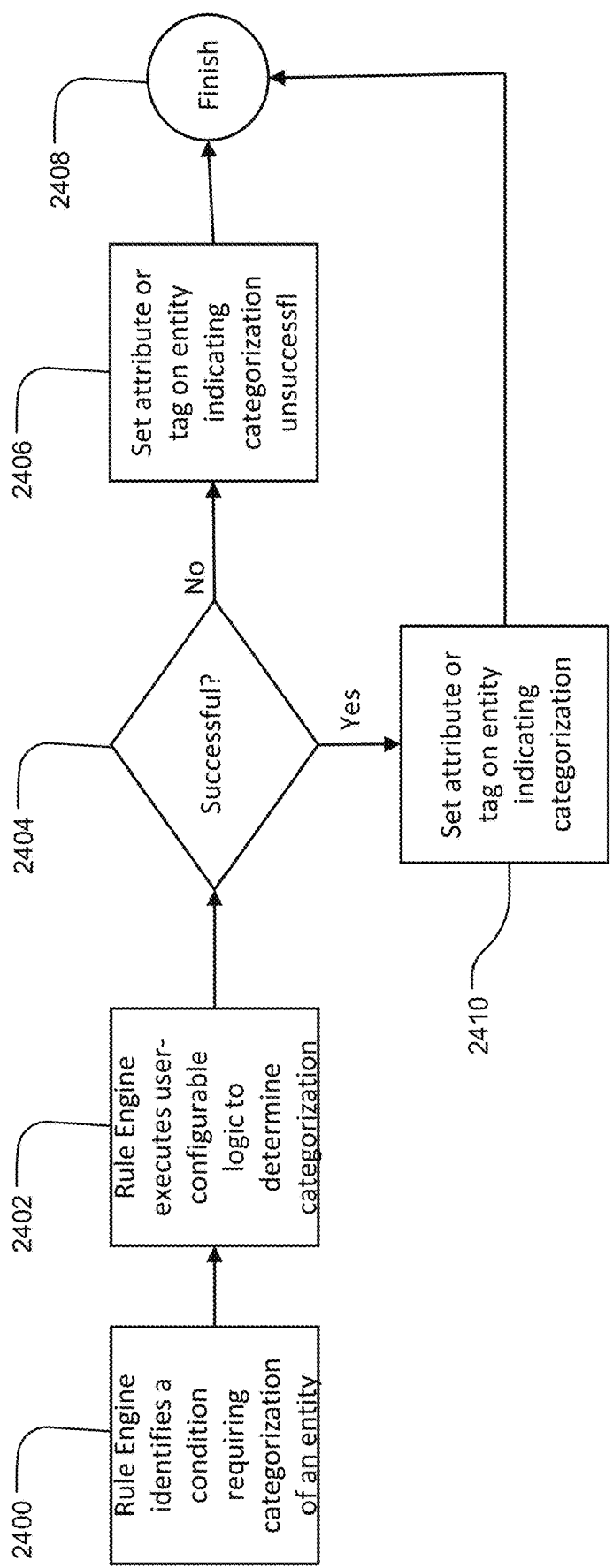
FIG. 35 is a flow diagram illustrating an exemplary rules-based categorization method according to an embodiment of the invention.
Figure 36:
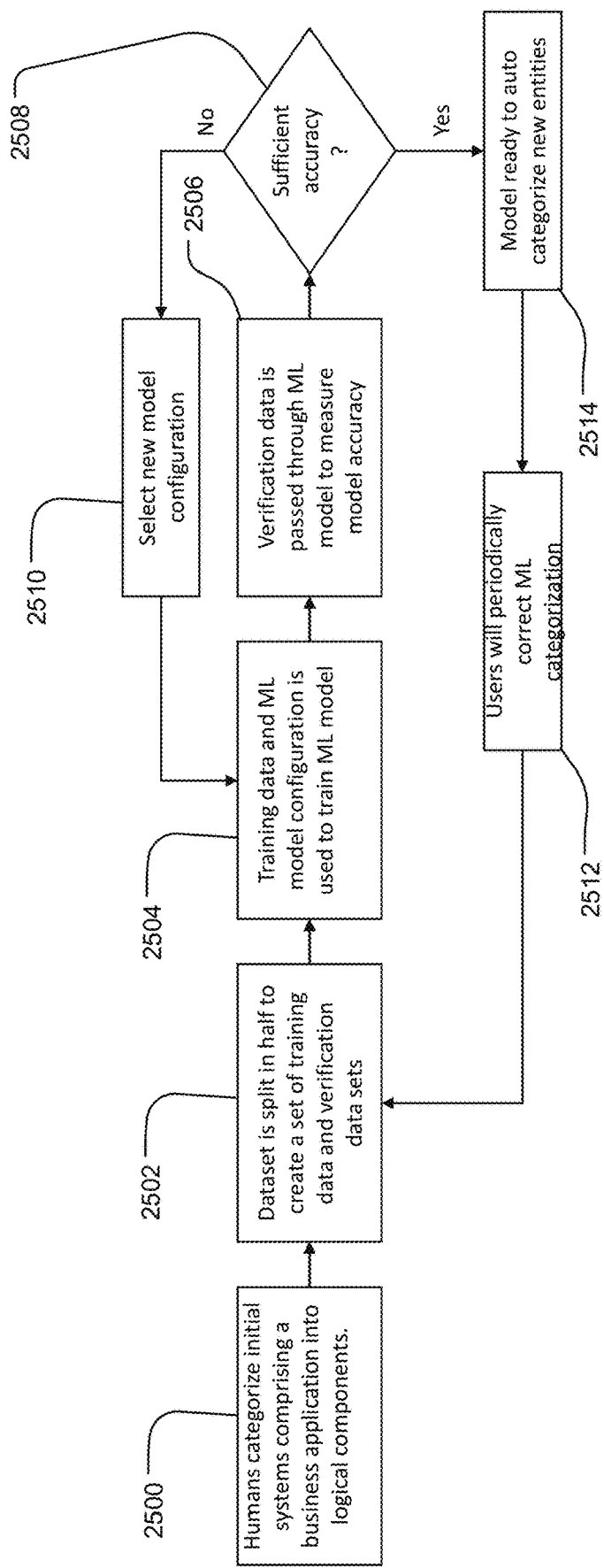
FIG. 36 is a flow diagram illustrating an exemplary machine learning based categorization method according to an embodiment of the invention.

In general, FIGS. 35 and 36 are flow diagrams illustrating exemplary automatic categorization processes according to certain embodiments of the present invention. The depicted examples show how the rules engine 120 and/or the machine learning engine 124 are used to automatically categorize entities 8 based on the nodes, properties of nodes, and relationships between the nodes, as indicated in the entity relationship graph 162.

FIG. 35 specifically concerns rules-based categorization of the entities 8 using the rules engine 120. In step 2400, the rules engine 120 identifies a condition requiring categorization of an entity 8. In step 2402, the rules engine 120 then executes user-configurable logic for determining the categorization. In step 2404 it is determined whether the categorization was successful. If it was, the attribute or tag on a node 10 representing the entity 8 is set indicating the categorization of that node 10 in step 2406, and the process terminates in step 2408. On the other hand, if the categorization was not successful, in step 2406, the attribute or tag is set on the node 10 representing the entity 8 indicating as much, and the process ends in step 2408.

In one example, the rules-based categorization includes the GUI 87 presenting a categorization tool for generating (e.g., based on input from the user received via the input mechanism 66 of the user device 80) configuration information for the rules indicating a selection of which nodes 10 representing the entities in the entity relationship graph 162 should be assessed for a particular categorization analysis. The categorization tool sends the configuration information to the rules engine 120, which monitors the entity relationship graph 162 for the selected conditions and automatically invokes the analysis according to the selected logic in response to detecting the selected conditions.

The concept of a rules engine 120 and associated configured rules coupled with the entity relationship graph 162 has been previously described. Using that capability, a user of the presently disclosed system 100 can define conditions based on combinations of entity relationships, attributes or tags to determine when categorization is appropriate or required, as referred to in step 2400 in the process previously described with respect to FIG. 24. The user can also define logic which can be executed when the conditions arise (e.g. an entity is discovered on a particular network segment which doesn't have any categorization tag associated with it) and which will then derive a categorization logic and set an attribute or apply a tag to the entity accordingly, as referred to in step 2402. An example would be a rule which triggers whenever a compute entity is discovered on a specific network segment. The logic which is executed is designed such that if the system has SMTP software installed and the entity is listening on TCP/IP port 25 then it should be categorized as the application's SMTP relay. But if it has Apache Tomcat installed and running and is listening on TCP/IP port 443 then it should be categorized as one of the application's app servers. If the logic can come to a definitive conclusion it could then set an attribute or tag on the entity recording that categorization decision as referred to in steps 2404 and 2410. However, if it fails to come to a definitive conclusion, it can add a tag of "Uncategorized" indicating that the entity could not be categorized but the presence of this tag will prevent the rule from re-executing the categorization logic in the future, as referred to in steps 2404 and 2406. This is just meant to be a demonstrative example and not meant to limit the disclosure in any way in terms of the nature of the rules or categorization logic which can be defined or the method by which categorizations are recorded or tracked.

The following is an exemplary query that is continuously monitored (e.g., with respect to the entity relationship graph 162) by the rules engine 120 according to the preferred embodiment of the present invention:

Match (e:EC2Instance {componentGrp: null})-[ ]->(:NetworkInterface)-[ ]->(:IPAddr)-[ ]->(:Subnet {cidr: '128.224.200.0/24'}) Return e This query searches the graph 162 for any nodes of type EC2Instance with the attribute componentGrp as 'null' and having a relationship with a NetworkInterface node that, in turn, has a relationship with an IPAddr node that, in turn, has a relationship with a Subnet node with an attribute 'cidr' set to the value '128.224.200.0/24'. In other words, any EC2 instance on the 128.224.200.0/24 subnet and with the componentGrp attribute not set.

In another embodiment, the rules engine 120 is configured to run a script implementing the logic expressed in the following pseudocode on each returned EC2 instance (denoted as "$input"):

If( GraphQuery("Match (e:EC2Instance {ec2ID: '$input.ec2ID'})-[ ]->(:Software-[ ]->(:Port {portNmbr '1433'}) Return Count(e)") > 0) then SetAttribute($input, 'componentGrp', "DBTier")
Else if ( GraphQuery("Match (e:EC2Instance {ec2ID: '$input.ec2ID'})-[ ]->(:Software-[ ]->(:Port {portNmbr '111'}) Return Count(e)") > 0) then SetAttribute($input, 'componentGrp', "StorageTier")
Else If ( GraphQuery("Match (e:EC2Instance {ec2ID: '$input.ec2ID'})-[ ]->(:Software-[ ]->(:Port {portNmbr '25'}) Return Count(e)") > 0) then SetAttribute($input, 'componentGrp', "SMTPTier")

-continued

```
Else if ( GraphQuery("Match (e:EC2Instance {ec2ID: '$input.ec2ID'})-[ ]-
>(:Software-[ ]->(:Port {portNmbr '443'}) Return Count(e)") > 0) then SetAttribute($input,
'componentGrp', "AppSrvrTier")
Else SetAttribute($input, 'componentGrp', "Unknown")
```

Machine Learning

Given the scale in number of entities 8 in modern computer environments 5, and given the nature of some types of entities 8 being regularly and dynamically created and destroyed or regularly joining and leaving the environment 5, manually assigning and maintaining the logical grouping of entities may not be feasible. Also, the appropriate logic for determining proper categorization may be complex to a human trying to create it. The present system and method employs the concept of incorporating a machine learning (ML) engine 124. In one example, the ML engine 124 is implemented as an integration managed by the integration subsystem 168. In another example, the ML engine 124 is implemented as a completely separate subsystem. The ML engine 124 is responsible for applying machine learning and pattern matching techniques to automatically assign entities 8 to appropriate groups of "similar" entities 8. By grouping a multitude of entities 8 and tracking the attributes and relationships of each entity in the entity relationship graph 162, and by building machine learning models which are responsive to these attributes and relationships, the present system and method can, with a high degree of accuracy, automatically allocate entities 8 to the appropriate groups or categories.

Using publicly available machine learning programs and best practices embedded into the present system and method, the system 100 enables user to build and train machine learning models to achieve the automatic grouping or categorization of entities 8 in the graph 162. The system and method can accommodate many different machine learning models designed for different groupings or categorizations. For example, a given business application may comprise multiple logical components including redundant firewalls, load balancers, application servers, database servers, a multitude of custom-built services, etc. Each of those logical components can be implemented as many physical or virtual systems for the purposes of scalability or redundancy. Each of the physical or virtual systems would be represented in the graph as separate node. As each system is identified and added to the graph 162 the present system and method, according to one embodiment, proactively collects a multitude of attributes about each system and record the system's interaction pattern with other systems. The interaction patterns between systems will be modeled as edges between nodes in the entity relationship graph 162. Certain of those attributes and edges will demonstrate common patterns among systems comprising the same logical component of the business application. By allowing users to manually identify some subset of the systems as being associated with their particular logical components the present system and method effectively trains the machine learning models to identify those common patterns and automatically categorize new systems which are later added to the computer environment 5 to their associated logical component based on these attributes and relationships.

FIG. 36 concerns the machine learning based categorization of the entities 8 using the machine learning engine 124. In step 2500, humans categorize initial entities 8 that are systems comprising a business application into logical components. Then, in step 2502, the dataset is split in half, with one portion being designated as training data and the other portion being designated as verification data. In step 2504, the training data and the machine learning model configuration is used to train the machine learning model, and in step 2506, the verification data is passed through the machine learning model to measure the model's accuracy. In step 2508, if the accuracy is sufficient, the model is determined to be ready to automatically categorize new entities 8. In this case, the users periodically correct the machine learning categorization in step 2512, and the process returns to step 2502. On the other hand, if the model does not have sufficient accuracy, in step 2510, a new configuration for the machine learning model is selected, and the process returns to step 2504.

According to one embodiment, the machine learning engine 124 categorizes the entities 8 based on configuration information received from a categorization tool of the GUI 87. The configuration information, which is generated based on user input received via input mechanisms 66 of the user device 80, indicates which nodes representing the entities 8 in the entity relationship graph 162 should be assessed for a particular categorization analysis and which machine learning model(s) to be used to perform the categorization analysis. The machine learning engine 124 monitors the entity relationship graph 162 for the selected conditions indicated by the configuration information and automatically invokes an analysis using the selected machine learning model(s) in response to detecting the selected conditions.

Figure 37:
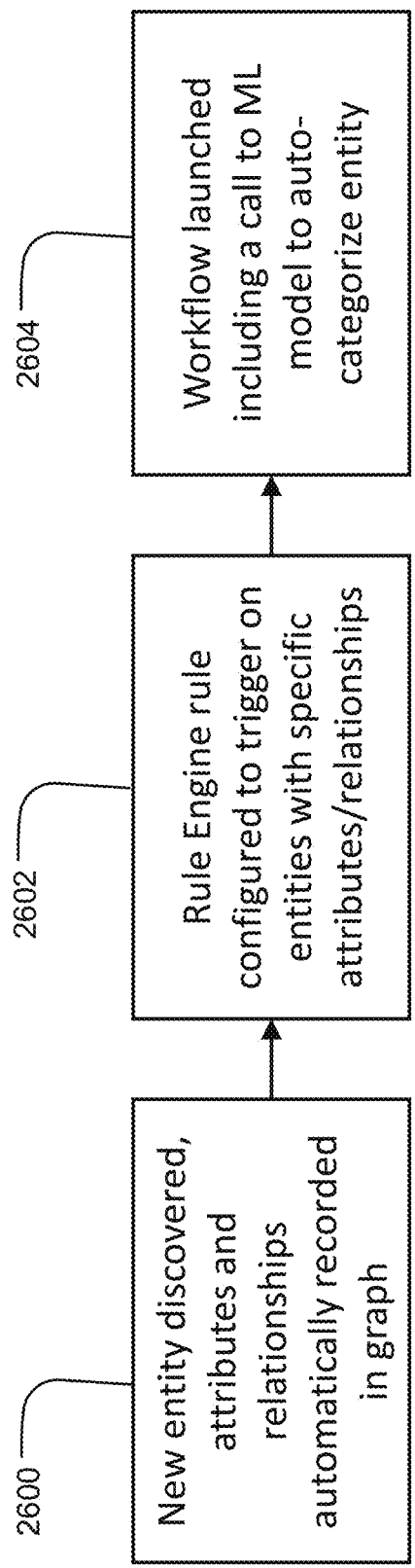
FIG. 37 is a flow diagram illustrating an exemplary process for machine learning categorization, according to an embodiment of the present invention.

FIG. 37 is a flow diagram illustrating an exemplary process by which the rules engine 120 and the workflow engine 122 are used to invoke the machine learning categorization, according to one embodiment of the present invention.

In step 2600, a new entity 8 is discovered in the computer environment 5, and its attributes and relationships are automatically recorded in the entity relationship graph 162, as has been previously described. In step 2602, a rule is configured (e.g., based on user input received via the GUI 87 of the user device 80) for the rules engine 120 to trigger on entities 8 with specific attributes and/or relationships. Then, in step 2604, a workflow is launched (e.g., via the rules engine 120 and/or the workflow engine 122), including a call for the machine learning engine 124 to automatically categorize the entity 8 using a specified machine learning model.

Given the vast number of business applications and entities existing in a medium to large enterprise and given the possible rate of change of attributes related to each entity 8 and relationships between each entity 8, it is not feasible to simply pass any new or changing entity 8 through the various ML models. The system needs to be more intelligent and targeted about the use of ML and take advantage of additional context. This can be uniquely accomplished using the rules and workflow capabilities which are core to the current system and method and are discussed above (e.g., with respect to the functionality of the rules engine 120 and the workflow engine 122). For example, the IP address subnet might be a strong indication of which business application a given entity 8 is associated with. A rule could be created (e.g., via the configuration tool on the user device 80) which would trigger whenever a new entity 8 is discovered on the subnet in question with an action (directly or via an invocation of a workflow) to categorize the entity 8 into a logical business application component using an ML model tuned specifically to the business application known to use that subnet.

This capability will dramatically increase the usefulness in modern environments by automatically keeping the grouping of like entities far more accurate as the environment changes than would otherwise be possible.

One of the many factors which is expected to be considered in many target use cases is whether entities are behaving in a "normal" or "abnormal" way. The machine learning subsystem discussed above is further capable of applying machine learning and pattern matching techniques to automatically detect abnormal behavior of an entity. By tracking the attributes and relationships of each entity in the graph, and by building machine learning models which are responsive to these attributes and relationships, the present system and method can employ ML models to automatically determine if an entity is behaving in an abnormal way. An illustrative example would be that a machine learning model is built to categorize compute node entities based on the operating system and software packages running on them, the network segment they are running on, the ports they have open for receiving network connections and the other systems they interact with over the network. A second machine learning model can be created to assess the "normal" behavior of compute nodes of a particular category. With these machine learning models in place the present system and method can automatically categorize entities in the graph, detect abnormal behavior for that category, and tag the entities accordingly. This abnormal behavior tag can then be used to trigger rules and corresponding actions or otherwise draw the attention of IT or cybersecurity professionals.

Accordingly, in one embodiment, the GUI 87 of the user device 80 comprises a machine learning model training screen, which detects selection by the user of pre-classified data elements from the entity relationship graph 162 based on input received from the user via an input mechanism 66 of the user device 80. The selected pre-classified data elements are used to train the machine learning models. In addition to classifying or existing unclassified data elements such as entities 8, the machine learning engine 124 also identifies patterns in the entity relationship graph 162 indicating abnormal conditions of the computer environment 5 using the trained machine learning models. Additionally, the machine learning engine 124 determines whether detected changes in the entity relationship graph indicate abnormal conditions of the computer environment 5 based on the processing by the particular machine learning models to which detected changes are determined to pertain.

As described above, given the vast size and rate of change of a typical medium to large organization, this can only be feasibly accomplished if executed in conjunction with the other capabilities of the present system and methods such as entity event collectors, relationship graphs, rules and workflows.

Figure 38:
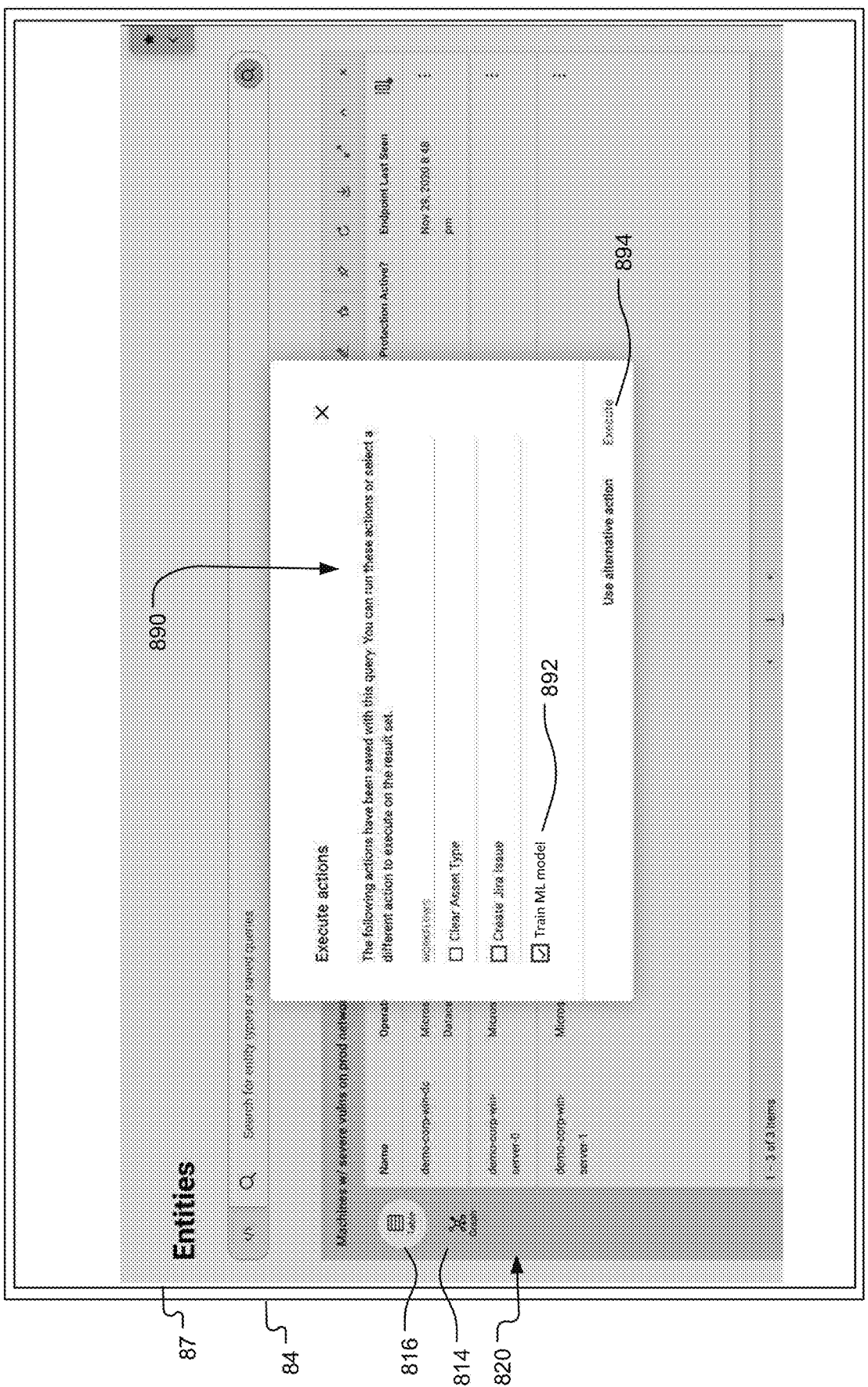
FIG. 38 is an illustration of an exemplary execute actions screen of the GUI.

FIG. 38 is an illustration of an exemplary execute actions screen 890 of the GUI 87 rendered on the display 84 of the user device 80, showing an exemplary implementation of a configuration tool for the machine learning engine 124 according to an embodiment of the present invention.

In the illustrated example, the execute actions screen 890 is displayed as a window that is overlaid on the table display screen 820, for example, in response to selection of one or more menu options presented on the table display screen 820 for producing the execute actions screen 890.

The execute actions screen 890 comprises a train model selector 892 and an execute button 894. The train model selector 892 is similar to the type selectors 884 provided on the previously described types selection menu 882. More specifically, the train model selector 892 is a selectable graphical element displayed as a checkbox that can be toggled on and off. In response to a user toggling on the train model selector 892 and selecting the execute button 894, the machine learning engine 124 executes the functionality of training the machine learning model(s) as previously described.

Transitive Risk Analysis

Given the overwhelming volume and diversity of cyber-attacks facing a typical organization, along with the large numbers of assets and related vulnerabilities in the organization, addressing every single cybersecurity concern is infeasible. Organizations are forced to prioritize the most significant cybersecurity threats and related remediation activities. The challenge then becomes deciding which situations represent the greatest risk to the organization given their current security posture and imminent threats. To answer that question, organization have devised methods for quantifying the magnitude of their various current cybersecurity risks.

Risk quantification generally involves a calculation based on the expected loss magnitude (LM) of a given loss scenario, the probability or expected frequency (known as Loss Frequency, or LF) of the loss scenario being attempted by a threat attacker, and the effectiveness of mitigating controls, or mitigation strength (MS), which have been put into place to prevent the loss scenario from occurring. In the most simplistic terms, the current system and method proposes that the risk associated with a particular loss scenario could be defined by the following equation:

$$Risk = LM * LF * (1-MS)$$

Where:

Loss magnitude is measured in some relative scale, such as 0-100, or in some monetary value, such as US dollars.

Expected loss frequency is either the number of times an attempt is expected, or the probability (scale of 0-1.0) of an attempt in a given time window (typically annually).

Mitigation strength is a measure on a scale of 0-1.0, where 0 means that the mitigation in place has no impact on preventing the loss scenario, and a value of 1 means that it completely mitigates the loss scenario.

This is just one example of a cyber risk quantification calculation and not meant to limit the scope of the present system and method.

Organizations typically look across their cyber estate, identify the loss scenarios they think are most significant and try to formulate a risk score based on an equation similar to the one above, using estimates, or probability distributions, for the input values. This can be largely inaccurate and ineffective due to the fact that it neglects the fact that each of the input values is not a static value but rather a value that is reactive to the rapid and dynamic changes in the computer environment 5 and the relationships between the entities 8 involved. Furthermore, the statuses of mitigating controls are frequently changing. For example, one mitigating control against cyber-attacks may be that all computer systems with access to a sensitive dataset are patched for vulnerabilities weekly. At any given time, the patching window may elapse for any number of systems, or new systems may be spun up which are not properly patched to support bursts in demand.

The present system and method addresses these limitations by leveraging a current and accurate graph (e.g., the previously described entity relationship graph 162) of all entities 8 interacting in the computer network to drive a more precise and dynamic quantification of risk. The objective is to enable each of the parameters of some risk equation, such as the one discussed above, or others, to be specified as a function of attributes and relationships of the entities held in the graph. For example, the loss magnitude associated with a loss scenario could be varied based on attributes of the dataset involved, such as whether it has been determined that it contains sensitive information and the number of sensitive records held. Similarly, the expected frequency or probability of attack could be based on the number of relationships to "threat" entities 8 and the specific attributes of those related threat entities 8. Finally, there could be numerous mitigating controls in place that can be verified to be correctly implemented and functioning, or not, based on queries into the graph in real-time. When those mitigations are determined to not be functioning properly (consider the example regarding entities are not being patched weekly) the mitigating effect is reduced or zeroed out.

In one preferred embodiment, the system and method include the concept of a risk object which is meant to represent the risk of loss associated with a particular loss scenario. In operation, the risk objects as well as the sub-objects for risk scenarios and mitigation controls are stored in the graph database 140 like any other type in the system. So just like there are machines, vulnerabilities, storage and software entities with relationships between them, there are also risk objects, risk scenarios and mitigation control objects with relationships between them. In general, there is a specific functionality of the system which operates on those specific types to implement the algorithm described to calculate a risk score.

Accordingly, in one embodiment of the present invention, the GUI 87 rendered on the display 84 of the user device 80 receives input from a user (e.g., via the input mechanisms 66 of the user device 80). The input indicates definitions of risk objects, risk scenarios, and mitigating controls relevant to the computer environment 5. Risk information is generated based on the user input, and the entity relationship graph subsystem 126 generates a risk hierachy indicating associations between the risk objects and the risk scenarios as well as associations between the risk scenarios and the mitigating controls. Risk scores or quantifications for the computer environment 5 are then calculated based on the risk hierarchy.

Figure 39:
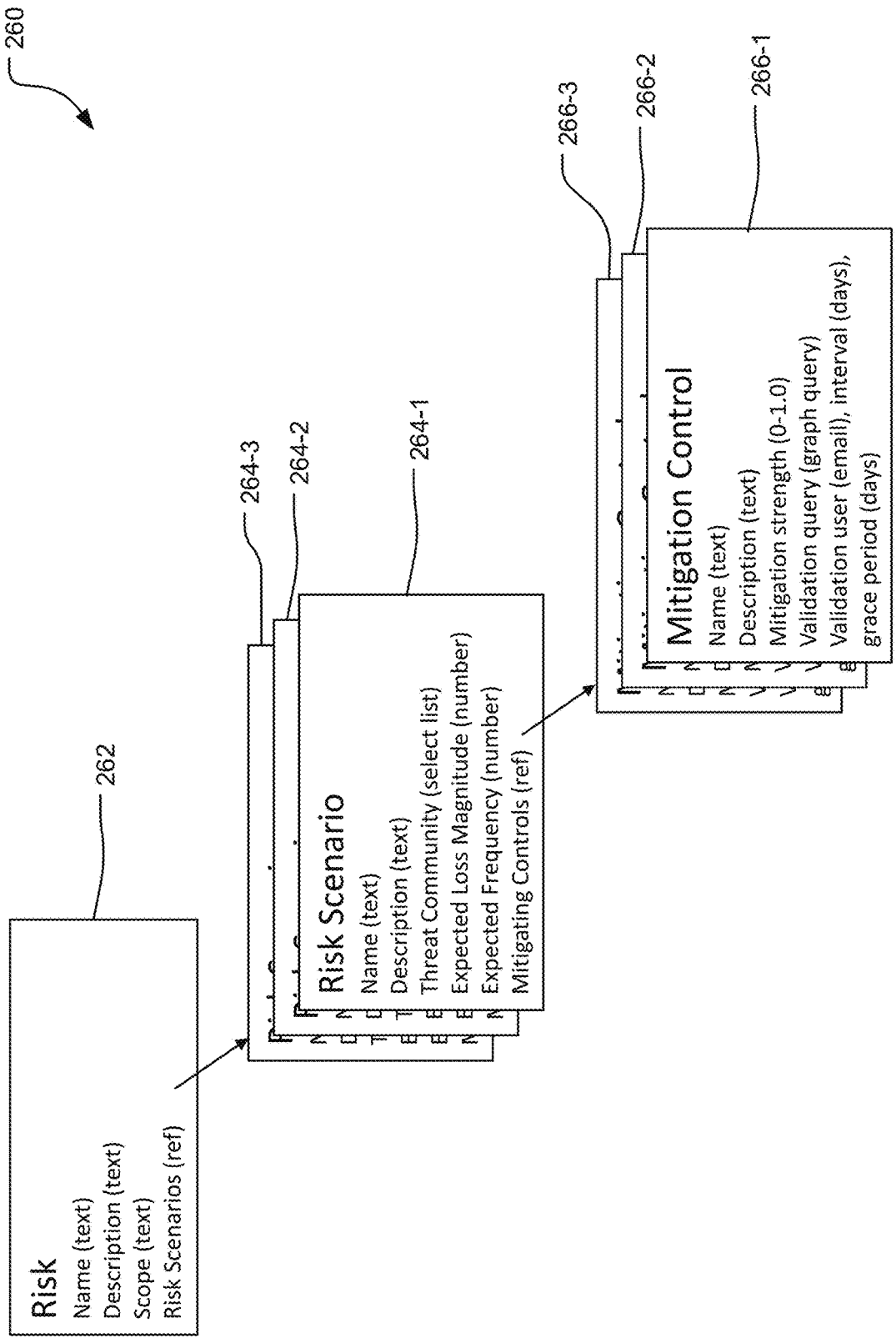
FIG. 39 is an illustration of an exemplary risk hierarchy graph segment according to an embodiment of the invention.

FIG. 39 is an illustration of a risk hierarchy graph segment 260, showing how the risk hierarchy organizes risk objects 262, risk scenarios 264, and mitigation controls 266 according to an embodiment of the present invention.

In general, the risk object 262 comprises property information for identifying the risk objects 262 and providing useful information to users tasked with managing the computer environment 5 using the risk hierarchy 260 and related functionality and/or configuring the risk hierarchy 260. In one example, the risk object 262 comprises property information specifying name, description, and a description of the scope for the risk being considered (e.g., in the form of free-form text fields). Additionally, each risk object 262 is associated with one or more Risk Scenarios (RS) 264 for the risk object 260.

The risk scenarios 264 represent various situations in which an associated loss could occur. In examples, the risk scenarios 264 concern an authorized insider stealing credit card data, or a malicious criminal compromising an authorized account and using it to steal credit card data, to name just a few. In one embodiment, each risk scenario 264 includes properties or attributes such as a name, description, threat community (indicating the type of attacker being considered, e.g. Privileged insider, Non-privileged insider, Cybercriminal, Nation state, Other), an Expected Loss Magnitude (ELM), and an Expected Loss Frequency (ELF) expressed as expected times per year. Each risk scenario 264 also has relationships to zero or more scenario mitigation controls (MC) 266.

The mitigation controls 266, generally, are measures that are or can be put in place with respect to the computer environment 5 to decrease the likelihood that the risk scenario 264 with which the mitigation control 266 is associated will actually occur in the computer environment 5. In one embodiment, the mitigation controls 266 might refer to monitoring user behavior using UBA technology, or requiring multi-factor authentication for access to all component systems, to name just a few examples. Each mitigating control 266 includes a name, description, mitigation control strength (MCS), which is a value between 0 and 1.0, and evaluation criteria, which is a method by which to validate if that mitigating control 266 is in place in the computer environment 5 and functioning correctly. In examples, the method of validation indicated by the evaluation criteria is a query into the entity relationship graph 162 (e.g., to assess whether the mitigating control 266 is in place based on detected conditions in the computer environment 5) or a periodic manual user attestation. For query-validated mitigations a graph query is specified as the evaluation criteria, which will be used to identify the existence of any control failures or gaps indicating that the control is not properly implemented. For user attestation-validated mitigations an electronic communication mechanism is specified in the evaluation criteria, such as an email or chat address, of an individual or group expected to attest to the mitigation's proper implementation. For user attestation-validated mitigations a recurrence interval, and the grace period for attestation are also specified. For user attestation-validated mitigations the system and method invoke an automated workflow which will interact with users via the specified electronic communication mechanism according to the specified recurrence interval to collect their attestation that the mitigating control 264 is properly implemented and in effect.

In one example, validating whether the mitigating control 266 is properly implemented in the computer environment 5 is performed by presenting a user interface via a user device 80 associated with the individual or group identified in the evaluation criteria. The user interface generates confirmation information concerning implementation of the mitigating control 266 based on user input received via the user interface.

Figure 40:
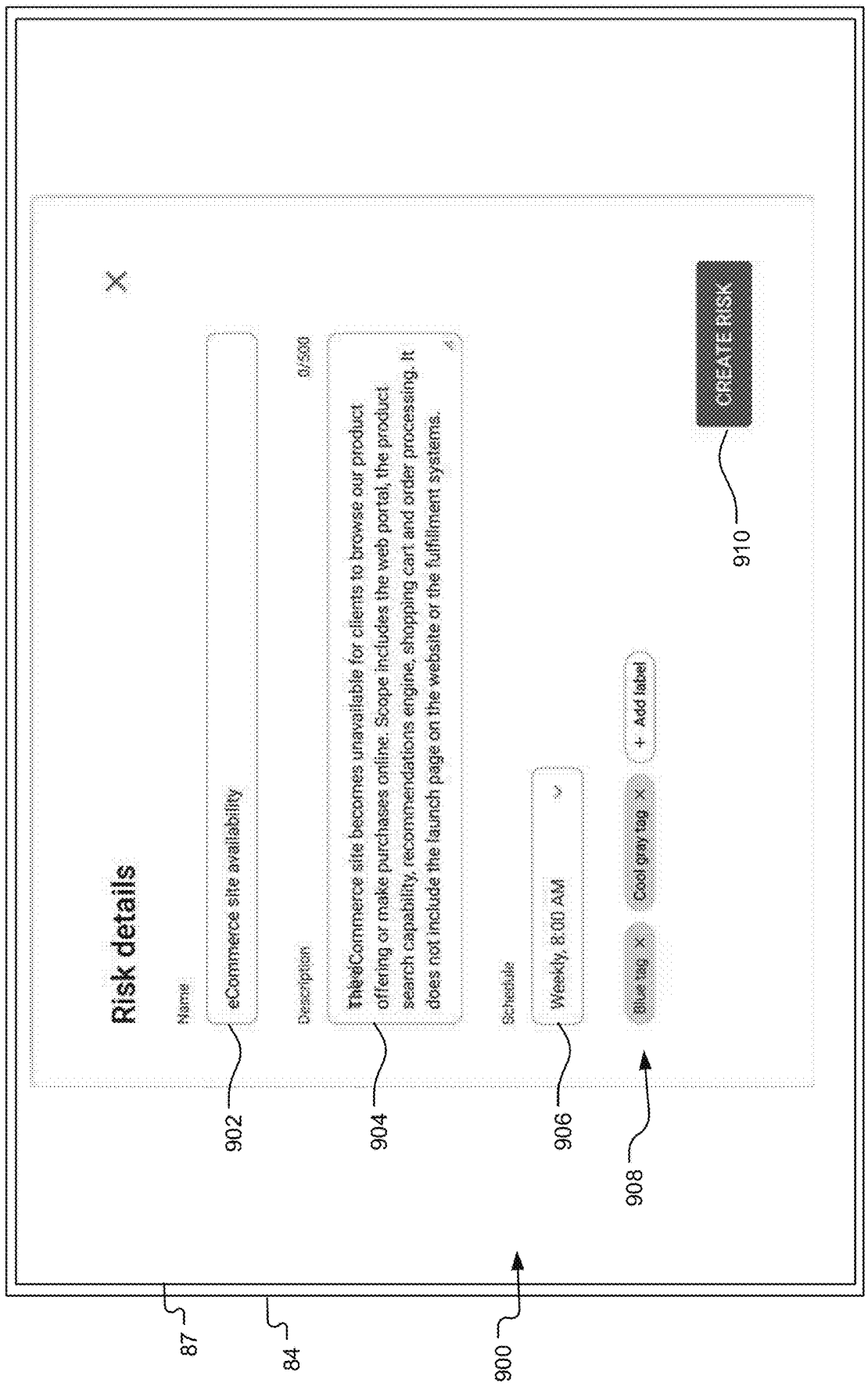
FIG. 40 is an illustration of an exemplary new risk screen of the GUI.

FIG. 40 is an illustration of an exemplary new risk screen 900 of the GUI 87 rendered on the display 84 of the user device 80, showing how user input for new risk objects 262 is collected for generating the risk information on which the risk hierarchy 260 is based. The new risk screen 900 has a name input field 902 and a description input field 904, which are graphical elements for receiving textual input from a user (e.g., via an input mechanism 66 of the user device 80). The name field assigns the input text to a name attribute for the risk object 262, and the description input field assigns the input text to a description attribute for the risk object 262. The new risk screen 900 also comprises a schedule time selector 906, which is a graphical element for enabling a user to select a time (e.g., to calculate the risk scores for the risk object 262). Additionally, the new risk screen 900 comprises a label selector 908, which is a graphical element enabling a user to associate existing or new labels with the risk object 262 to facilitate useful user interaction with the risk hierarchy 260 and other processes involved in managing the computer environment 5 that are related to the risk hierarchy 260. Finally, the new risk screen 900 comprises a create risk button 910, which is a graphical element, selection of which causes the new risk object 262 to be created.

Figure 41:
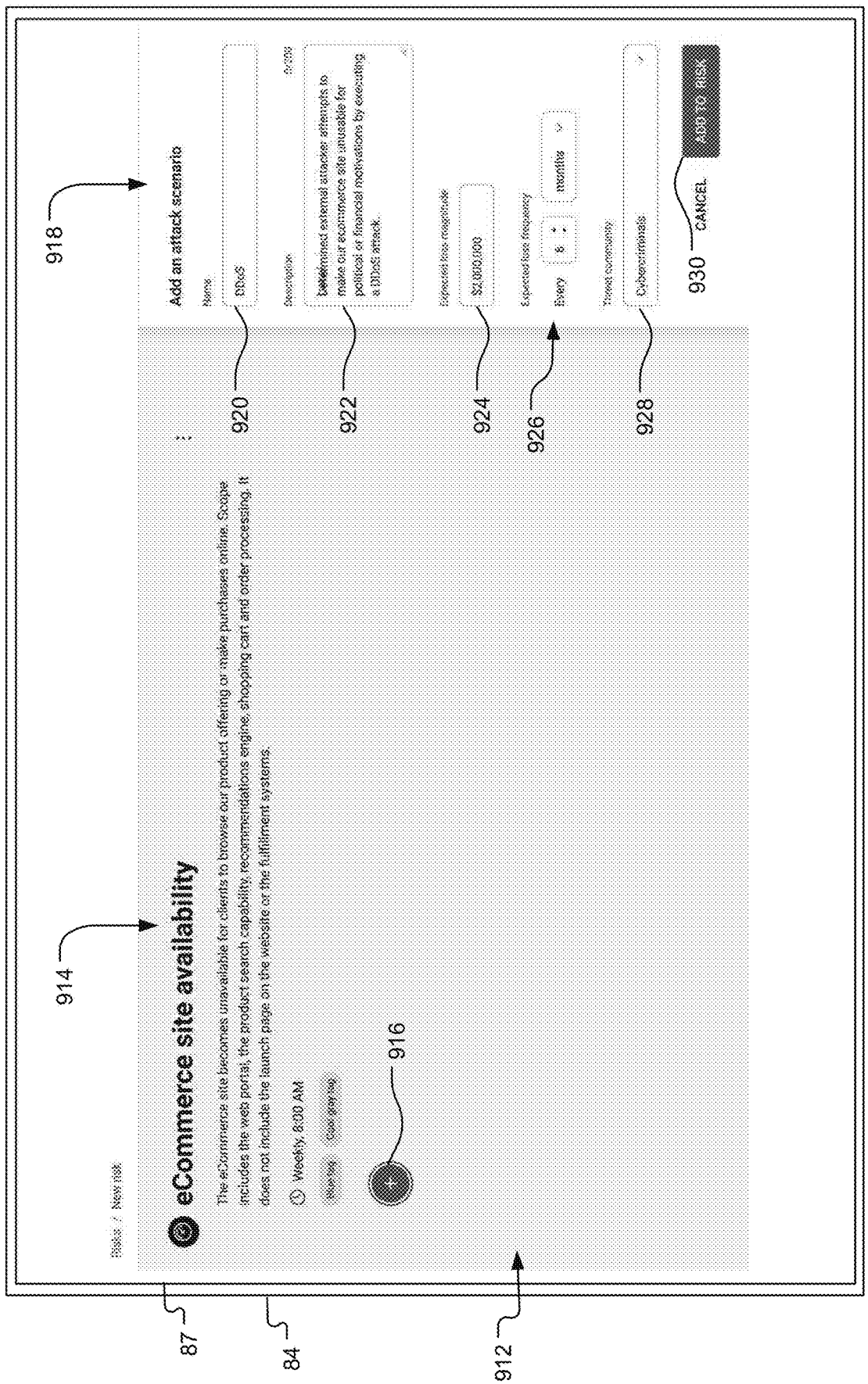
FIG. 41 is an illustration of an exemplary new risk scenario screen of the GUI.

FIG. 41 is an illustration of an exemplary new risk scenario screen 912 of the GUI 87 rendered on the display 84 of the user device 80, showing how user input for new risk scenarios 264 is collected for generating the risk information on which the risk hierarchy 260 is based. The new risk scenario screen 912 comprises a risk object pane 914 and a risk scenario configuration pane 918. The risk object pane 914 provides information concerning the risk object 262 to which the risk scenario 264 is associated. The risk object pane 914 also comprises a new risk scenario button 916. In response to user selection of the new risk scenario button 916, the risk scenario configuration pane 918 is displayed for collecting the risk information pertaining to the new risk scenario 264. The new risk scenario pane 918 comprises input fields similar in functionality to those described with respect to the new risk screen 900, including a name input field 920 pertaining to a name attribute for the risk scenario 264, a description input field 922 pertaining to a description attribute of the risk scenario 264, an expected loss magnitude input field 924 pertaining to the expected loss magnitude attribute of the risk scenario 264, an expected loss frequency number and unit selector 926 pertaining to the expected frequency attribute of the risk scenario 264, and a threat community selector 928 pertaining to the threat community attribute of the risk scenario 264. Finally, the risk scenario configuration pane 918 comprises an add to risk button 930, which is a graphical element, selection of which causes a new risk scenario 264 to be created, and association of the newly created risk scenario 264 with the risk object indicated in the risk object pane 914.

Figure 42:
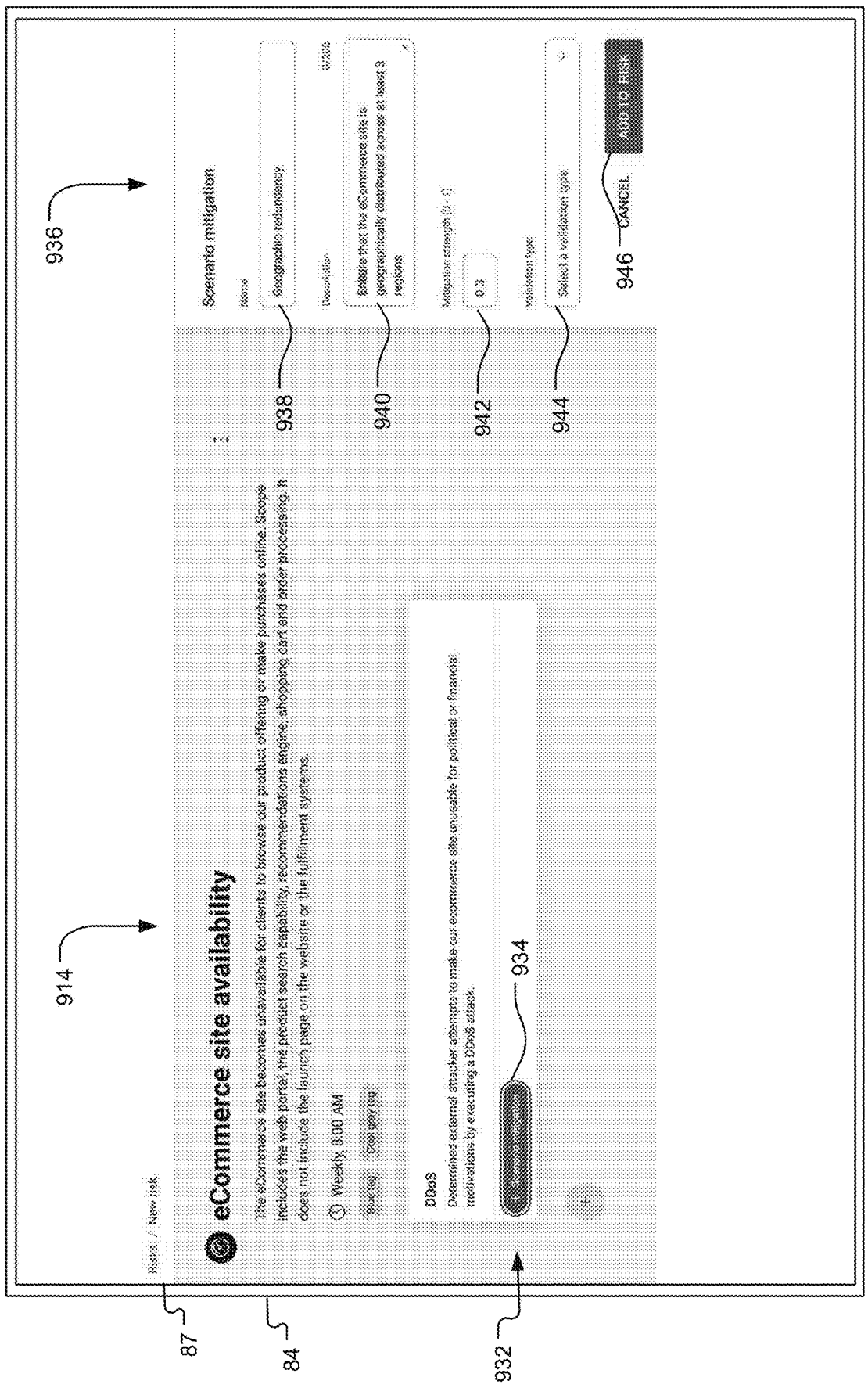
FIG. 42 is an illustration of an exemplary new mitigating control screen of the GUI.

FIG. 42 is an illustration of an exemplary new mitigating control screen 932 of the GUI 87 rendered on the display 84 of the user device 80, showing how user input for new mitigating controls 266 is collected for generating the risk information on which the risk hierarchy 260 is based. Like the new risk scenario screen 912, the new mitigating control screen 932 comprises the risk object pane 914 and a mitigating control configuration pane 936. The risk object pane 914 is similar to that described with respect to the new risk scenario screen 912. Now, however, the risk object pane 914 also comprises a new mitigating control button 934. In response to user selection of the new mitigating control button 934, the mitigating control configuration pane 936 is displayed for collecting the risk information pertaining to the new mitigating control 266. The new mitigating control pane 936 comprises input fields similar in functionality to those described with respect to the new risk screen 900, and the new risk scenario screen 912, including a name input field 938 pertaining to a name attribute for the mitigating control 266, a description input field 940 pertaining to a description attribute of the mitigating control 266, a mitigation strength input field 942 pertaining to the mitigation strength attribute of the mitigating control 266, and a validation type selector 944 pertaining to either the validation query or the valuation user attributes of the mitigating control 266. The validation type selector 944 enables entry by the user of text indicating the validation query or the validation user by, for example, in response to selection of one of the validation types presenting a subsequent input field pertaining to the attribute indicated by that user's validation type selection (not illustrated). Finally, mitigating control configuration pane 936 comprises an add to risk button 946, which is a graphical element, selection of which causes the new mitigating control 266 to be created, and association of the newly created mitigating control with a particular risk scenario indicated in the risk object pane 914.

Figure 43:
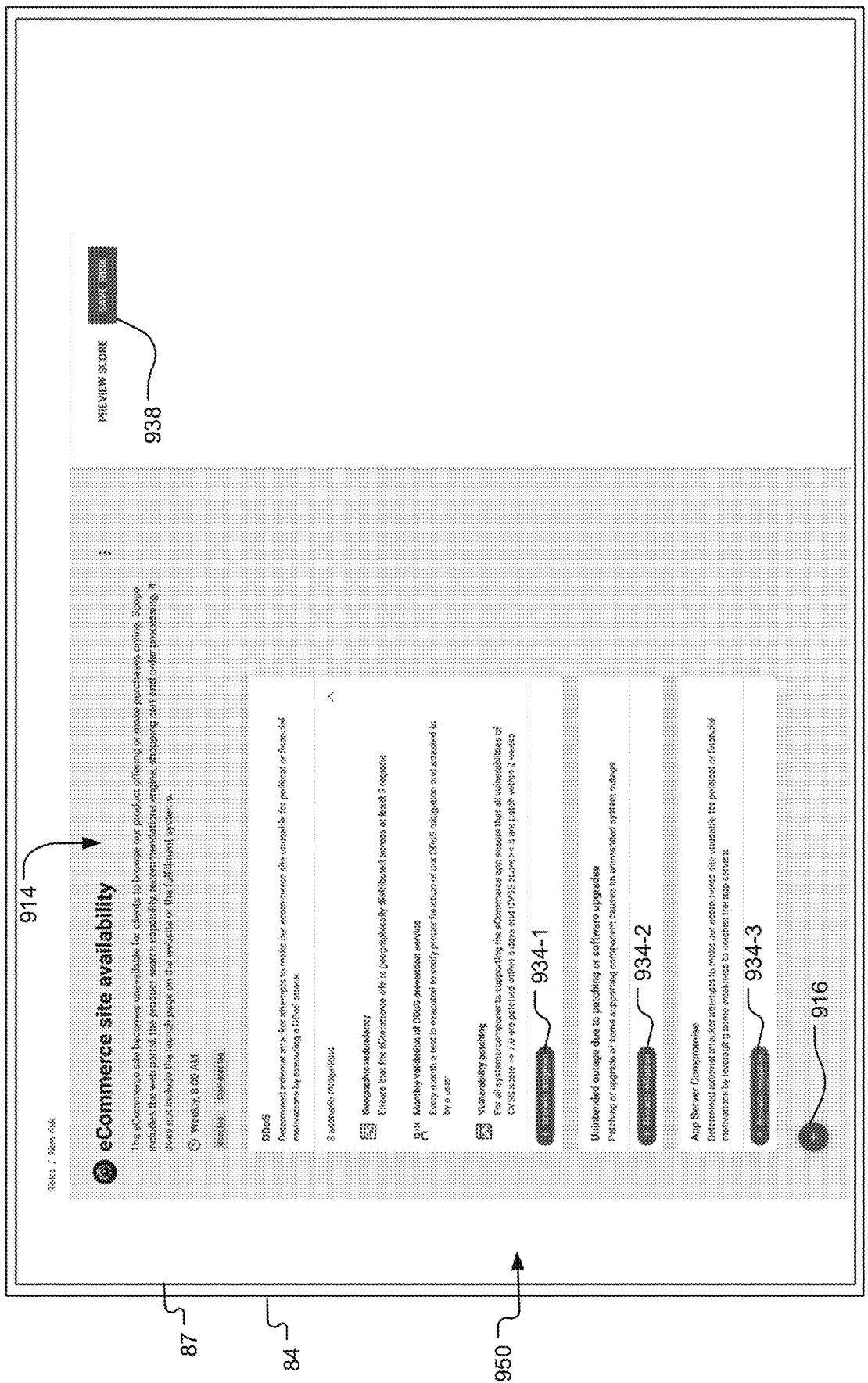
FIG. 43 is an illustration of an exemplary risk status screen of the GUI.

FIG. 43 is an illustration of an exemplary risk status screen 950 of the GUI 87 rendered on the display 84 of the user device 80, showing status information and options for configuring a risk object 262 are presented to the user. As before, the risk status screen 950 comprises the risk object pane 914, which is similar to that described with respect to the other screens for configuring the various risk entities. Now, however, the risk object pane 914 comprises a summary view of multiple risk scenarios, each associated with a different new mitigating control button 934, which functions similarly to that described with respect to the new mitigating control screen 932. Similarly, the risk object pane 914 also comprises the new risk scenario button, which functions similarly to that described with respect to the new risk scenario screen 912. Finally, the risk status screen 950 comprises a save risk button 938, which, when selected by the user, causes the new risk object 262, risk scenario(s) 264, and mitigating control 266 to be saved (e.g., via transmission of the risk information for the new objects to the entity relationship graph database subsystem 126 to be added to a new or existing risk hierarchy).

In one example, a user of the presently disclosed system and method manually invokes a risk calculation for a risk object 262 through a gesture or other input indicating such a selection via an exposed user interface such as the GUI 87. Periodic automated invocation of risk calculation can also be scheduled. In either case this will execute a process which will calculate the risk value at that moment. The total risk value for the Risk is the sum of the risk values for each of the associated risk scenarios, also referred to as the Scenario Risk Contribution (SRC). The SRC of each risk scenario 264 is calculated as follows:

$$SRC=(ELM)*(ELF)*(1-MCS\#1)*(1-MCS\#2)* \ldots *(1-MCS\#n)$$

Where the Mitigation Control Strength, MCS, of any mitigation which failed validation is considered to be zero.

In the preferred embodiment, each risk object 262, risk scenario 264, and mitigation control is stored as a node in a graph such as the entity relationship graph 162 with attributes for recording the specific parameters for the corresponding types. For example, a node type for representing a risk scenario would include attributes for recording the name, description, threat community, expected loss magnitude, and expected loss frequency. Relationships between the risk components are represented as edges between the corresponding nodes in the graph. Each risk object node has a relationship edge to each risk scenario node related to it, and each risk scenario node has a relationship edge to each mitigating control node related to it.

Figure 44:
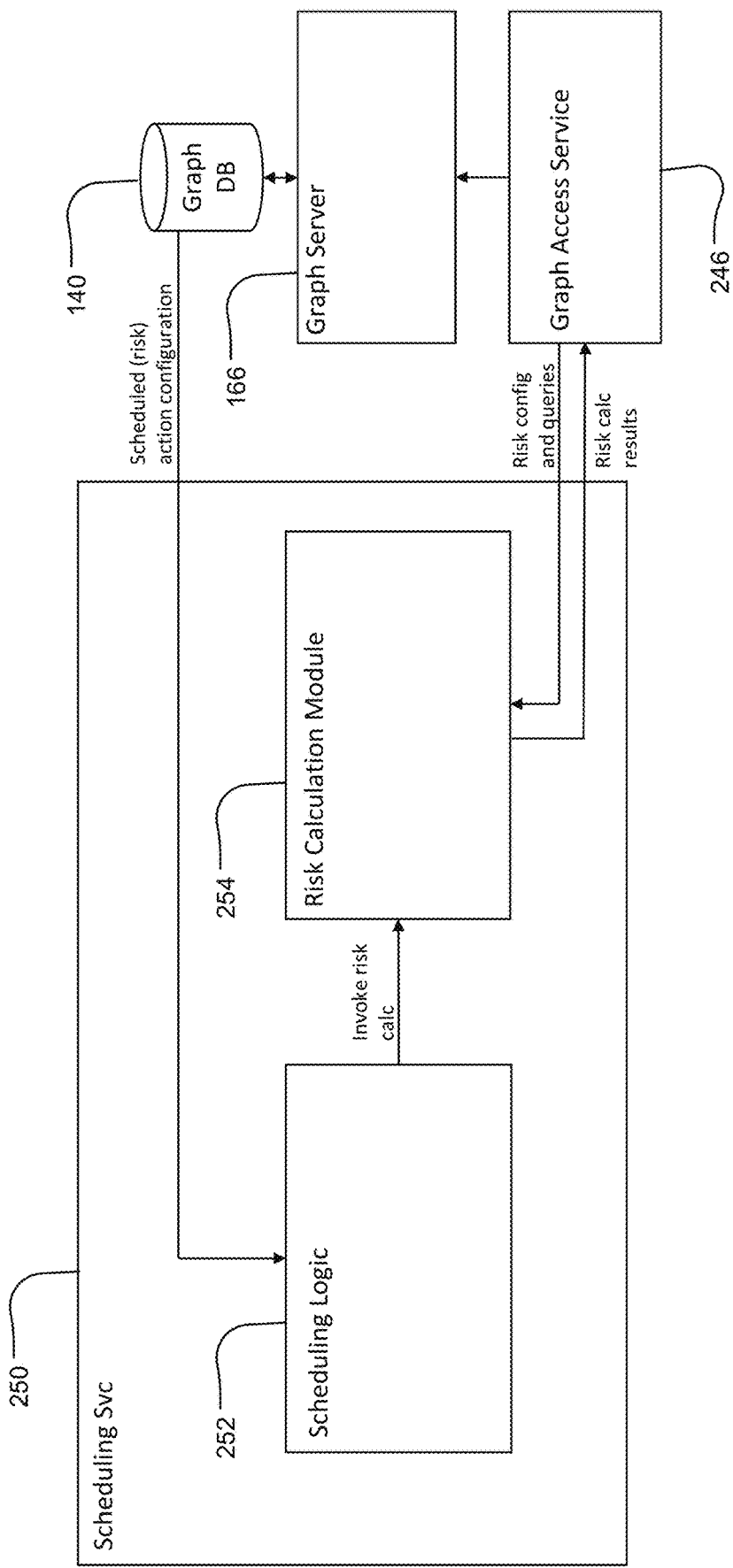
FIG. 44 is a schematic diagram of a scheduling service according to an embodiment of the present invention.

FIG. 44 is a schematic diagram of the scheduling service 250 according to an embodiment of the present invention, depicting the subsystems involved in the reoccurring scheduled assessment of the magnitude of the defined risk objects 262. The process is driven by the scheduling service 250. Scheduling Logic 252 incorporated into the scheduling service 250 acquires its configuration data from the graph database 140, which, among other things, specifies the assessment schedule associated with each risk object 262. When a risk assessment is due, the scheduling logic 252 signals a risk calculation module 254 indicating the specific risk object 262 to assess. The risk calculation module 254 acquires the details associated with the specified risk object 262, each of its related risk scenarios 264, and each risk scenario's related mitigating controls 266. With this information, the calculation of the current risk score for a given risk object 262 would be implemented as represented by the following pseudo-code;

```
Given a Risk r
r.riskScore = 0;
For each Risk Scenario rs related to r
{
    scenarioRiskContrib = rs.ELM*rs.ELF;
    For each Mitigating Control mc related to rs
    {
        If (mc.AssessValidity == TRUE)
scenarioRiskContrib = scenarioRiskConrib*(1-mc.mcs)
    }
    r.riskScore = r.riskScore + scenarioRiskContrib;
}
```

In this pseudo-code example mc.AssessValidity is meant to represent a function which determines whether the mitigating control 266 in question is considered valid. If the mitigating control 266 is validated by a query, then the function executes the query to determine if existence of any non-conforming entities 8 is indicated in the entity relationship graph 162. If one or more non-conforming entities 8 are identified, then the mitigating control 266 is considered to not be validated, in which case the function returns FALSE. Otherwise, it returns TRUE. If the mitigating control 266 is validated by user attestation, then the function determines if a valid user attestation has been recorded within the required timeframe and grace period. If not, then the mitigating control 266 is considered to not be validated, and the function returns FALSE. Otherwise, it returns TRUE.

The presently disclosed system 100 records each risk scenario contribution as well as the validation status of each mitigating control 266 at the time of the calculation. Specifically, the risk calculation results are passed to the graph access service 246 which passes them to the graph server 248 for storage in the graph relational database 140.

As a result, a user of the system and method can drill into risk objects 262, related risk scenarios 264, and related mitigating controls 266 to determine the most significant aspects contributing to the overall risk score. The user can examine the results of any past calculations. The user can tag risk objects and then create dashboard elements to display the results of various risk objects 262 individually or aggregated by tag or some other characteristic. They can also display changes of individual or aggregated risk calculations across different times.

Figure 45:
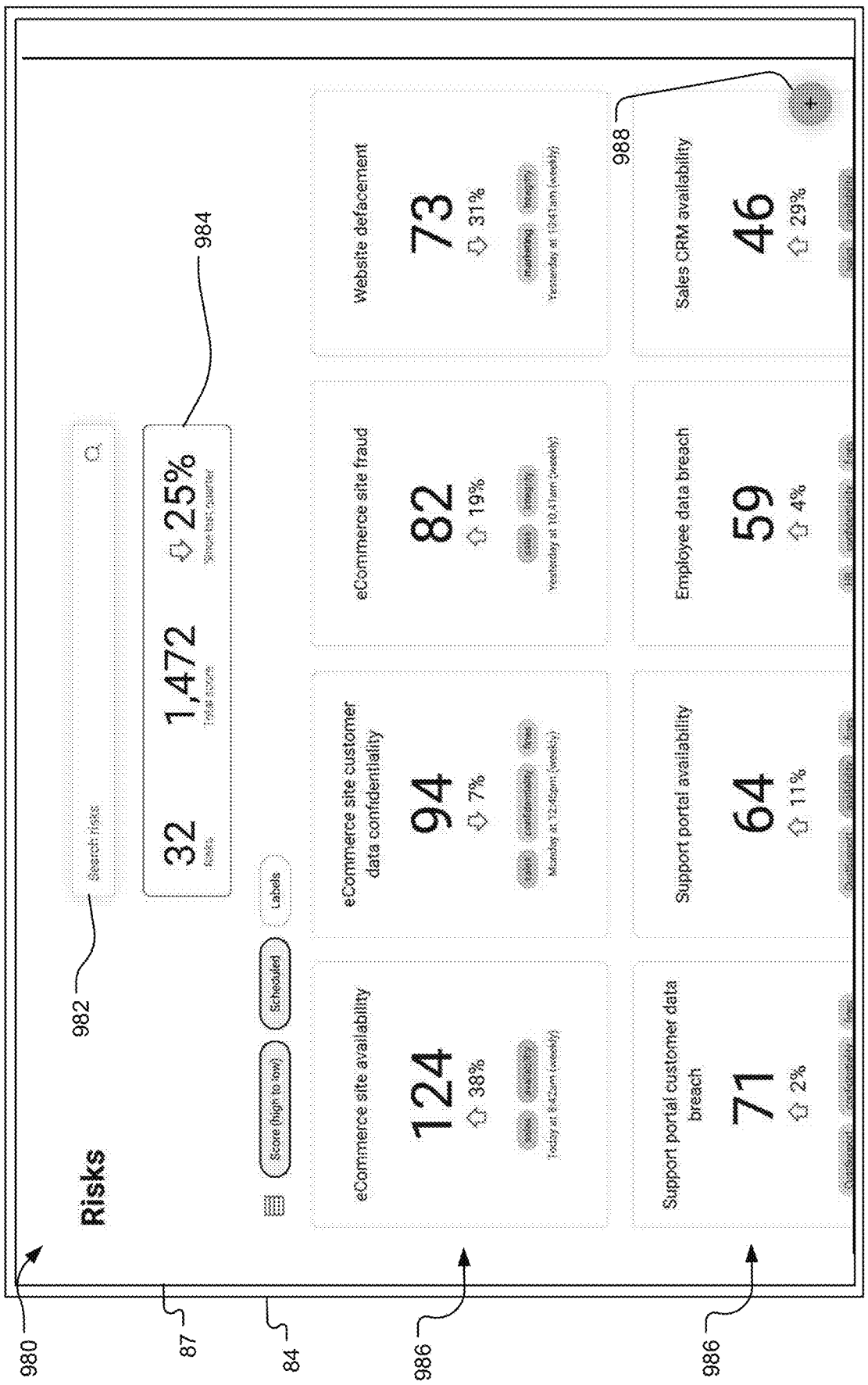
FIG. 45 is an illustration of a risk dashboard screen of the GUI.

FIG. 45 is an illustration of a risk dashboard screen 980 of the GUI 87 rendered on the display 84 of the user device 80, showing how individual and/or aggregated risk information is displayed based on the risk hierarchy and risk scores. The risk dashboard screen 980 is one example of how the functionality in the paragraph above is implemented in the presently disclosed system and method and generally provides a user-customizable information display to facilitate management of the computer environment 5.

More specifically, the risk dashboard screen 980 comprises a search bar 982, a global summary pane 984, and one or more dashboard elements 986. The search bar 982 enables the user to input textual search queries with respect to the risk information in the risk hierarchy and/or the entity relationship information in the entity relationship graph 162. In one example, in response to submission of a search query via the search bar 982, a results screen is displayed (not illustrated) providing more detailed individual and/or aggregated risk information, particularly pertaining to risk objects 262, risk scenarios 264, and/or mitigating controls 266 having attributes or metadata matching the search query. The global summary pane 984 provides statistical information concerning the global status of all risk objects 162 and associated entities for the entire computer environment. In the illustrated example, the global summary pane 984 indicates a quantity of active risk objects 262, cumulative risk score across all active risk objects 262, and a percentage change in the cumulative risk score since a previous business quarter. Each of the dashboard elements 986 provides at-a-glance statistics for an individual risk object 262 or a group of risk objects 262, including a risk score associated with the individual risk object 262 or the group of risk objects in aggregate, a percentage change associated specifically with the risk score for that dashboard element, an indication of tags assigned to the individual risk object 262 or group of risk objects 262 associated with the dashboard element, an indication of when the most recent update to the data pertaining to the dashboard element was completed, and identifying textual information. In one example, the labels or tags indicated for each of the dashboard elements are also used by the risk dashboard screen 980 and possibly other components of the present system to organize the risk objects into groups. Additionally, the risk dashboard screen 980 comprises an add dashboard element button 988, which, in response to selection by the user presents additional configuration screens (not illustrated) for adding a new dashboard elements 986 to persistently appear on the risk dashboard screen 980.

In one variation of the preferred embodiment described above, the risk scenario's 264 expected loss magnitude can be specified as an equation based on attributes and relationships of entities 8 in the graph. The loss magnitude is dynamically recalculated each time a risk calculation is computed. One demonstrable example expressed in pseudo-code could be the following:

LM=(#records in dataset containing PII)*$50+(#records in dataset containing credit card data)*$25

In another variation of the preferred embodiment described above, the risk scenario's 264 expected frequency can be specified as an equation based on attributes and relationships of entities in the graph. The loss frequency is dynamically recalculated each time a risk calculation is computed. One demonstrable example expressed in pseudo-code which assumes the presence of entities 8 of type "Threat" in the entity relationship graph 162, which record the attributes of cyber threats thought to be immanent for the organization, and, according to one embodiment including an expected frequency, is determined as follows:

LF=0.1+SUM(Threat.frequency); across all Threat entities tagged as "eCommerce Apps"

In yet another variation of the preferred embodiment described above the values for a risk scenario's 264 expected loss magnitudes, risk scenario's 264 expected frequencies, or mitigating control's 266 mitigation strengths can be specified as minimum, most likely, and maximum values which can be used to generate probability distributions for those values. These distributions are then used to feed Monte Carlo simulations of the risk calculations with the output being a Risk probability distribution instead of a discrete value.

The specific equations described above are meant to be demonstrative and not limit the scope of the present system and method. The novel aspect is a means to establish risk quantification mechanisms based on a current and accurate model of entities interacting in a computer environment, their attributes, and their relationships and interactions with other entities.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for managing a computer environment, the method comprising:
    collecting event data for the computer environment from a plurality of different data sources by connecting to each data source and retrieving the event data available from that data source;
    generating entity relationship information indicating entities and relationships between entities that are relevant to security of the computer environment based on the collected event data from the plurality of different data sources;
    managing the computer environment based on the entity relationship information by configuring a rules engine with user-specified rules for detecting specified conditions of the entities, properties of entities, and the relationships between entities indicated by the entity relationship information and for performing specified actions in response to detecting the specified conditions; and
    identifying which rules of the rules engine can potentially be triggered by detected changes in conditions indicated by the entity relationship information and selectively evaluating the changed conditions against the specified conditions only with respect to the rules that were identified as potentially being triggered by the detected changes in the conditions.

2. The method of claim 1, further comprising detecting relevant changes to the computer environment in the event data from the plurality of different data sources, the relevant changes including a presence in the computer environment of new entities that were previously unknown, changes to properties of entities that were previously identified as being present in the computer environment, or disappearances from the computer environment of entities that were previously identified as being present in the computer environment.

3. The method of claim 2, wherein generating the entity relationship information comprises only modifying existing entity relationship information to reflect the relevant changes in the computer environment in response to determining that the relevant changes are not already represented in the existing entity relationship information.

4. The method of claim 2, wherein collecting the event data from the plurality of different data sources comprises selectively retrieving only event data indicating the relevant changes to the computer environment by periodically polling a data source for new event data reflecting the relevant changes.

5. The method of claim 2, wherein collecting the event data from the plurality of different data sources comprises selectively retrieving only event data indicating the relevant changes to the computer environment in response to alerts transmitted by a data source.

6. The method of claim 1, wherein the specified actions include executing user-defined operations with respect to the computer environment.

7. The method of claim 6, further comprising user-configurable software programs executing the user-defined operations.

8. The method of claim 6, further comprising user-configurable workflows provided by a workflow engine executing the user-defined operations, wherein the user-configurable workflows are configurable to invoke other workflows or software programs.

9. The method of claim 1, further comprising generating the entity relationship information based on type definitions formatted according to a declarative schema definition language, the type definitions including markup specifying particular properties and relationships for different entity types.

10. The method of claim 9, further comprising special entity types specific to particular data sources inheriting and/or extending the properties and relationships of other entity types according to a specified entity type hierarchy, the special entity types specifying additional properties and relationships specific to the particular data sources.

11. The method of claim 1, wherein generating the entity relationship information comprises generating an entity relationship graph, which represents the entities, the properties of the entities, and the relationships between the entities, and storing the entity relationship graph in a graph database.

12. The method of claim 11, wherein managing the computer environment based on the entity relationship information comprises rendering a graphical user interface on a display of a user device, the graphical user interface comprising a query builder that generates graph-based queries based on input from a user via an input mechanism of the user device, transmits the graph-based queries for execution against the entity relationship graph, and displays results of the graph-based queries.

13. The method of claim 12, further comprising the query builder limiting selections by the user for the graph-based queries to valid combinations of entity types, relationships, and properties based on type definitions specifying particular properties and relationships for each entity type in the entity relationship information.

14. The method of claim 13, further comprising the query builder detecting gestures input by the user via the input mechanism indicating selection of entity types and dragging of graphical elements representing the selected entity types into a query pane, the query builder automatically determining and displaying valid relationship paths between the graphical elements representing the selected entity types, the query builder receiving input from the user indicating selection of which of the displayed valid relationship paths to be referenced in a graph-based query, and the query builder receiving input from the user indicating selection of specific valid properties for each displayed graphical element representing the selected entity types to further quantify or limit graph patterns targeted via the graph-based query.

15. The method of claim 11, wherein generating the entity relationship graph further comprises representing each of the entities in the entity relationship graph as a plurality of nodes, including an identity node representing an immutable identity for the entity, one or more state nodes representing mutable properties of the entity, and state edges connecting the identity node and each of the one or more state nodes associated with the identity node.

16. The method of claim 15, further comprising the state edges being configured with start and end timestamp properties defining a period of time between start and end timestamps during which the state node is considered to represent a valid property for the identity node.

17. The method of claim 15, further comprising updating values assigned to the properties of the entities in the entity relationship graph by creating new state nodes with the updated values for the properties and new state edges between the identity nodes and the new state nodes, assigning to each new state edge a start timestamp value indicating a creation time for a new state node and an end timestamp value indicating that the new state node is currently valid, and assigning to each state edge for the state nodes representing previous values of the property being updated an updated end timestamp value indicating the creation time for the new state node.

18. The method of claim 17, further comprising receiving input from a user via an input mechanism of a user device indicating time values associated with queries submitted for execution against the entity relationship graph and modifying the submitted queries based on the time values associated with the queries such that results of the modified queries include only state nodes with start timestamp values indicating start times before the time values for the queries and end timestamp values either of zero or indicating end times after the time values for the queries.

19. The method of claim 11, wherein managing the computer environment based on the entity relationship information comprises developing machine learning models for identifying patterns in the entity relationship graph.

20. The method of claim 19, further comprising rendering a graphical user interface on a display of a user device, the graphical user interface comprising a machine learning model training screen that detects selection by a user of pre-classified data elements from the entity relationship graph based on input received from the user via an input mechanism of the user device, training the machine learning models using the selected pre-classified data elements, and classifying future or existing unclassified data elements from the entity relationship graph and/or identifying the patterns in the entity relationship graph indicating abnormal conditions of the computer environment using the trained machine learning models.

21. The method of claim 20, further comprising detecting changes in the entity relationship graph and submitting the changes in the entity relationship graph to be processed by particular machine learning models in response to determining that the detected changes pertain to the particular machine learning models.

22. The method of claim 21, further comprising determining whether the detected changes in the entity relationship graph indicate abnormal conditions of the computer environment based on the processing by the particular machine learning models to which the detected changes were determined to pertain.

23. A system for managing a computer environment, the system comprising:
 a workstation system for executing one or more entity event collectors for collecting event data for the computer environment from a plurality of different data sources by connecting to each data source and retrieving the event data available from that data source;
 a server system for executing a database system, which generates entity relationship information indicating entities and the relationships between entities that are relevant to security of the computer environment based on the collected event data from the plurality of different data sources, wherein the server system manages the computer environment based on the entity relationship information by:
  configuring a rules engine with user-specified rules for detecting specified conditions of the entities, properties of entities, and the relationships between entities indicated by the entity relationship information and for performing specified actions in response to detecting the specified conditions; and by
  identifying which rules of the rules engine can potentially be triggered by detected changes in conditions indicated by the entity relationship information and selectively evaluating the changed conditions against the specified conditions only with respect to the rules that were identified as potentially being triggered by the detected changes in the conditions.

* * * * *